US007298851B1

(12) United States Patent
Hendricks et al.

(10) Patent No.: US 7,298,851 B1
(45) Date of Patent: *Nov. 20, 2007

(54) ELECTRONIC BOOK SECURITY AND COPYRIGHT PROTECTION SYSTEM

(75) Inventors: John S. Hendricks, Potomac, MD (US); Michael L. Asmussen, Herndon, VA (US); John S. McCoskey, Castle Rock, CO (US)

(73) Assignee: Discovery Communications, Inc., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/400,296

(22) Filed: Sep. 21, 1999

Related U.S. Application Data

(63) Continuation-in-part of application No. 09/191,520, filed on Nov. 13, 1998, and a continuation-in-part of application No. 08/906,469, filed on Aug. 5, 1997, now Pat. No. 6,408,437, and a continuation-in-part of application No. 08/336,247, filed on Nov. 7, 1994, now Pat. No. 5,986,690, and a continuation-in-part of application No. 08/160,194, filed on Dec. 2, 1993, now Pat. No. 5,990,927, and a continuation-in-part of application No. 07/991,074, filed on Dec. 9, 1992.

(51) Int. Cl.
*H04L 9/00* (2006.01)
(52) U.S. Cl. ............... 380/282; 380/277; 380/278; 380/279; 713/156; 713/164; 713/165; 713/167; 713/168; 726/21; 726/26; 726/27
(58) Field of Classification Search ........ 380/277–279, 380/282; 713/156, 200, 164, 165, 167, 168; 726/21, 26–27
See application file for complete search history.

(56) References Cited

U.S. PATENT DOCUMENTS 4,023,408 A  5/1977  Ryan et al.
(Continued)

FOREIGN PATENT DOCUMENTS

EP     140302     5/1985
(Continued)

OTHER PUBLICATIONS

Herron T.L., "Teaching with the Internet" Internet and Higher Education, US, JAI Press, Stamford, CT, vol. 1, No. 3, 1998, pp. 217-222, XP002118719, ISSN: 1096-7516.
(Continued)

*Primary Examiner*—Kim Vu
*Assistant Examiner*—Beemnet W Dada
(74) *Attorney, Agent, or Firm*—Arent Fox LLP

(57) ABSTRACT

The invention, electronic book security and copyright protection system, provides for secure distribution of electronic text and graphics to subscribers and secure storage. The method may be executed at a content provider's site, at an operations center, over a video distribution system or over a variety of alternative distribution systems, at a home subsystem, and at a billing and collection system. The content provider or operations center and/or other distribution points perform the functions of manipulation and secure storage of text data, security encryption and coding of text, cataloging of books, message center, and secure delivery functions. The home subsystem connects to a secure video distribution system or variety of alternative secure distribution systems, generates menus and stores text, and transacts through communicating mechanisms. A portable book-shaped viewer is used for secure viewing of the text. A billing system performs the transaction, management, authorization, collection and payments utilizing the telephone system or a variety of alternative communication systems using secure techniques.

171 Claims, 55 Drawing Sheets

U.S. PATENT DOCUMENTS

| | | | |
|---|---|---|---|
| 4,272,819 A | | 6/1981 | Katsumata et al. |
| 4,405,829 A | * | 9/1983 | Rivest et al. .................. 380/30 |
| 4,513,390 A | | 4/1985 | Walter et al. |
| 4,528,643 A | * | 7/1985 | Freeny, Jr. .................... 705/52 |
| 4,578,531 A | * | 3/1986 | Everhart et al. ............ 380/282 |
| 4,625,076 A | * | 11/1986 | Okamoto et al. ........... 713/176 |
| 4,774,655 A | | 9/1988 | Kollin et al. |
| 4,796,220 A | | 1/1989 | Wolfe |
| 4,829,569 A | * | 5/1989 | Seth-Smith et al. ........ 380/234 |
| 4,890,319 A | | 12/1989 | Seth-Smith et al. |
| 4,891,838 A | * | 1/1990 | Faber ......................... 713/202 |
| 4,924,513 A | * | 5/1990 | Herbison et al. ........... 713/161 |
| 4,941,089 A | | 7/1990 | Fisher |
| 4,941,125 A | | 7/1990 | Boyne |
| 5,054,984 A | | 10/1991 | Chan et al. |
| 5,099,331 A | | 3/1992 | Truong |
| 5,144,665 A | * | 9/1992 | Takaragi et al. .............. 380/30 |
| 5,146,600 A | | 9/1992 | Sugiura |
| 5,220,438 A | | 6/1993 | Yamamoto |
| 5,220,649 A | | 6/1993 | Forcier |
| 5,237,614 A | | 8/1993 | Weiss |
| 5,247,575 A | * | 9/1993 | Sprague et al. ............... 705/53 |
| 5,260,788 A | | 11/1993 | Takano et al. |
| 5,315,711 A | | 5/1994 | Barone et al. |
| 5,341,425 A | | 8/1994 | Wasilweski et al. |
| 5,341,426 A | | 8/1994 | Barney et al. .............. 713/171 |
| 5,375,160 A | | 12/1994 | Guidon et al. |
| 5,428,529 A | | 6/1995 | Hartrick et al. |
| 5,444,853 A | | 8/1995 | Lentz |
| 5,475,585 A | | 12/1995 | Bush |
| 5,479,615 A | | 12/1995 | Ishii et al. |
| 5,532,920 A | * | 7/1996 | Hartrick et al. ............. 715/500 |
| 5,557,744 A | | 9/1996 | Kobayakawa et al. |
| 5,561,803 A | | 10/1996 | Kilis |
| 5,565,999 A | | 10/1996 | Takahashi |
| 5,581,686 A | | 12/1996 | Koppolu et al. |
| 5,621,658 A | | 4/1997 | Jackson et al. |
| 5,649,230 A | | 7/1997 | Lentz |
| 5,691,777 A | | 11/1997 | Kassaatly |
| 5,715,314 A | | 2/1998 | Payne et al. |
| 5,721,908 A | | 2/1998 | Lagarde et al. |
| 5,864,823 A | | 1/1999 | Levitan |
| 5,892,900 A | | 4/1999 | Ginter et al. |
| 5,917,915 A | | 6/1999 | Hirose ......................... 380/228 |
| 5,986,690 A | | 11/1999 | Hendricks ..................... 725/60 |
| 6,034,680 A | | 3/2000 | Kessenich et al. .......... 345/733 |
| 6,052,717 A | | 4/2000 | Reynolds et al. ........... 709/218 |
| 6,415,316 B1 | | 7/2002 | Van Der Meer |
| 6,438,233 B1 | | 8/2002 | Yoshimune et al. |
| 2003/0198932 A1 | | 10/2003 | Stuppy |
| 2005/0144133 A1 | | 6/2005 | Hoffman |

FOREIGN PATENT DOCUMENTS

| | | |
|---|---|---|
| JP | 03225445 | 10/1991 |
| JP | 05233547 | 9/1993 |
| JP | 6134489 | 5/1994 |
| WO | WO93/15466 | 8/1993 |
| WO | WO 95/15649 | 6/1995 |
| WO | WO 97/22049 | 6/1997 |
| WO | WO 97/22062 | 6/1997 |
| WO | WO 97/22063 | 6/1997 |
| WO | WO 97/22064 | 6/1997 |
| WO | WO 97/22065 | 6/1997 |
| WO | WO 97/22067 | 6/1997 |
| WO | WO 97/22079 | 6/1997 |
| WO | WO 97/22080 | 6/1997 |
| WO | WO 97/22097 | 6/1997 |
| WO | WO 97/22099 | 6/1997 |
| WO | WO 97/22100 | 6/1997 |
| WO | WO 97/22101 | 6/1997 |
| WO | WO 97/22102 | 6/1997 |
| WO | WO 97/22103 | 6/1997 |
| WO | WO 97/22104 | 6/1997 |
| WO | WO 97/22105 | 6/1997 |
| WO | WO 97/22106 | 6/1997 |
| WO | WO 97/22107 | 6/1997 |
| WO | WO 97/22108 | 6/1997 |
| WO | WO 97/22109 | 6/1997 |
| WO | WO 97/22110 | 6/1997 |
| WO | WO 97/22111 | 6/1997 |
| WO | WO 97/22112 | 6/1997 |
| WO | WO 97/23819 | 7/1997 |
| WO | WO 98/08344 | 2/1998 |
| WO | WO 98/18086 | 4/1998 |
| WO | WO 99/45491 | 9/1999 |
| WO | WO 01/18665 A2 | 3/2001 |

OTHER PUBLICATIONS

Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.

Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.

An Interactive Lesson in the Interactive Course Series, Waite Group Press, Macmillan Computer Publishing, 'Online! 1996, XP000829591, Retrieved from the Internet: URL:http://www.waite.com/> 'retrieved on 1996!

Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.

Hartley, S. et al., "Enhancing Teaching Using the Internet", SIGCSE/SIGCUE Conference on Integrating Technology into Computer Science Education, US, New York, ACM, vol. CONF. 1, Jun. 2, 1996, pp. 218-228, ISBN: 0-89791-844-4.

Technology Update, Wordperfect Corporation Introduces Wordperfect 6.0 for DOS, http://www.nfbnet.org/files/word_processing/WP60.TXT, Mar. 24, 1993.

T.V. Raman, "An Audio View of (LA)Tex Documents," Proceedings of the 1191 Annual Meeting, pp. 1001-1008.

Microsoft Press Computer Dictionary Second Edition, Microsoft Press, 1994, p. 418.

Herron T.L., "Teaching with the Internet" Internet and Higher Education, US, JAI Press, Stamford, CT, vol. 1, No. 3, 1998, pp. 217-222, XP002118719, ISSN: 1096-7516.

Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.

Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.

An Interactive Lesson in the Interactive Course Series, Waite Group Press, Macmillan Computer Publishing, 'Online! 1996, XP000829591, Retrieved from the Internet: URL:http://www.waite.com/>'retrieved on 1996!.

Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.

Hartley, S. et al., "Enhancing Teaching Using the Internet", SIGCSE/SIGCUE Conference on Intergrating Technology into Computer Science Education, US, New York, ACM, vol. CONF. 1, Jun. 2, 1996, pp. 218-228, ISBN: 0-89791-844-4.

Seno, H, et al., "A Consideration of Data Transmisson Method for Enhanced Teletext", NHK Science and Technical Research Laboratories, ITEJ Technical Report, vol. 16, No. 71, Oct. 1992, Japan, pp. 1-6.

* cited by examiner

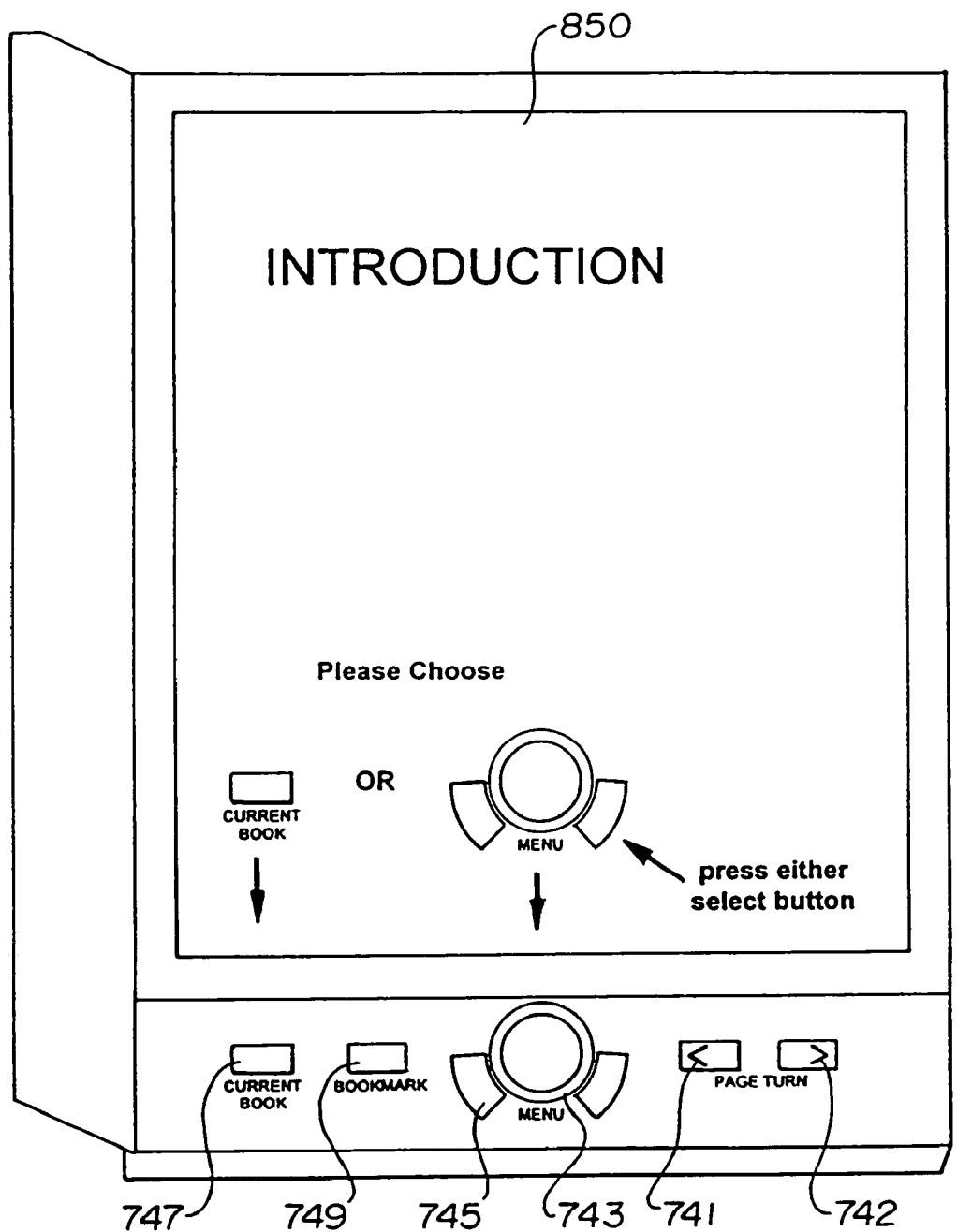

ELECTRONIC BOOK SECURITY AND COPYRIGHT PROTECTION SYSTEM

RELATED APPLICATIONS

This application is a continuation-in-part of U.S. application Ser. No. 07/991,074 entitled TELEVISION PROGRAM PACKAGING AND DELIVERY SYSTEM WITH MENU DRIVEN SUBSCRIBER ACCESS, filed Dec. 9, 1992, and U.S. application Ser. No. 08/336,247 entitled ELECTRONIC BOOK SELECTION AND DELIVERY SYSTEM, filed Nov. 7, 1994, now U.S. Pat. No. 5,986,690, and U.S. application Ser. No. 08/160,194 now U.S. Pat. No. 5,990,927, and PCT/US93/11606 entitled ADVANCED SET-TOP TERMINAL FOR CABLE TELEVISION DELIVERY SYSTEMS, filed Dec. 2, 1993, and U.S. application Ser. No. 08/906,469 entitled REPROGRAMMABLE TERMINAL FOR SUGGESTING PROGRAMS OFFERED ON A TELEVISION PROGRAM DELIVERY SYSTEM, filed Aug. 5, 1997, now U.S. Pat. No. 6,408,437, and U.S. application Ser. No. 09/191,520 entitled DIGITAL BROADCAST PROGRAM ORDERING, filed Nov. 13, 1998. These applications are incorporated by reference herein. Also incorporated by reference are co-pending U.S. application Ser. No. 09/237,827 entitled ELECTRONIC BOOK HAVING LIBRARY CATALOG MENU AND SEARCHING FEATURES, filed Jan. 27, 1999, U.S. application Ser. No. 09/237,828 entitled ELECTRONIC BOOK ELECTRONIC LINKS, filed Jan. 27, 1999, U.S. application Ser. No. 09/289,956, entitled ELECTRONIC BOOK ALTERNATIVE DELIVERY METHODS, filed on Apr. 13, 1999, and U.S. application Ser. No. 09/289,957, entitled ELECTRONIC BOOK ALTERNATIVE DELIVERY SYSTEMS, filed on Apr. 13, 1999.

BACKGROUND ART

Sparked by the concept of an information superhighway, a revolution will take place in the distribution of books. Not since the introduction of Gutenberg's movable typeset printing has the world stood on the brink of such a revolution in the distribution of text material. The definition of the word book will change drastically in the near future. Due to reasons such as security, convenience, cost, and other technical problems, book and magazine publishers are currently only able to distribute their products in paper form. This invention solves the problems encountered by publishers.

TECHNICAL FIELD AND BRIEF SUMMARY OF INVENTION

The electronic book selection and delivery system is a new way to distribute books to bookstores, public libraries, schools and consumers. The technological breakthroughs of this invention provide a secure electronic system for both delivering selected books and receiving payments. The system has an unusual combination of features that provides the consumer with a daily use household appliance that has a high tech aura while being very practical, portable, and easy to use.

An advantage of the system is that it eliminates the distribution of any physical object such as a paper book or computer memory device from any book or text distribution system. The purchase of a book becomes a PAY-PER-READ event avoiding the overhead, middle-men, printing costs, and time delay associated with the current book distribution system. Published material and text such as the President's speech, a new law, a court decision on abortion, or O. J. Simpson's testimony can be made immediately available to the consumer at a nominal fee. Alternatively, books may be made available free to the end use consumer, subsidized by advertisers who sponsor books or embed advertising within the books.

The system is a novel combination of new technology involving the television, cable, telephone, and computer industries. It utilizes high bandwidth data transmissions, strong security measures, sophisticated digital switching, high resolution visual displays, novel controls, and user friendly interface software.

The primary components of the text delivery system are the subsystem for preparing the text for secure delivery and the subsystem for receiving and selecting text that was delivered. An embodiment of the system includes additional components and optional features that enhance the system. The system may be configured for use by bookstores, public libraries, schools and consumers. In one embodiment, the system for consumer use is made up of four subsystems, namely: (1) an operations center, (2) a distribution system, (3) a home subsystem including reception, selection, viewing, transacting and transmission capabilities, and (4) a billing and collection system. Alternative configurations of the system are defined to allow for a variety of traditional and non-traditional delivery methods.

The operations center performs several primary functions: manipulating text data (including receiving, formatting and storing of text data), security encoding of text, cataloging of books, providing a messaging center capability, and performing uplink and secure delivery functions. In one embodiment, the system delivers the text from the operations center to consumer homes by inserting text data within analog video signals. The insertion of text is generally performed with an encoder at an uplink site that is within or near the operations center. The system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable or broadcast transmission capability without disruption to the subscriber's video reception. Using the entire video signal, thousands of books may be transmitted within just one hour of air time. Nearly any analog or digital video or data distribution system may be used to deliver the text data. The text data may also be transmitted over other low and high speed signal paths including a telephone network (e.g., a public switched telephone network) having a high speed connection such as an asynchronous digital subscriber line (ADSL) connection and the Internet, for example. The text data is delivered in a secure fashion over the distribution systems.

The home subsystem performs at least four functions: connecting to the distribution system, selecting text, storing text, and transacting through a communicating mechanism. The components of the home subsystem may be configured in a variety of hardware configurations. Each function may be performed by a separate component, the components may be integrated, or the capability of existing cable set top converter boxes, computers, and televisions may be utilized. A connector, library unit and viewer unit may be used. In one embodiment, the connector portion of the home subsystem receives an analog video signal and strips or extracts the text from the video. The home library stores the text signal, provides a user friendly software interface to the system and processes the transactions at the consumer home. The viewer provides a screen for viewing text or menus and novel user friendly controls. Alternative embodiments are presented that support the secure delivery and storage of text using a variety of communication and security mechanisms.

The viewing device may be a portable book shaped viewer which securely stores one or more books for viewing and provides a screen for interacting with the home library unit. A high resolution LCD display is used to both read the books and to interact with the home library software. In one embodiment, an optional phone connector or return-path cable connection initiates the telephone calls and, with the aid of the library, transmits the necessary data to complete the ordering and billing portion of the consumer transaction. Alternative embodiments are presented in the referenced related applications that support ordering and billing using a variety of communication mechanisms. The user-friendly controls include a bookmark, current book and page turn button. The billing and collection system performs transaction management, authorizations, collections and publisher payments automatically.

A system similar to the system for consumer use may be used in bookstores, schools and public libraries.

The electronic books are delivered from an operations center or other remote location to an end-user location such as a home system using security mechanisms that prevent unauthorized access to the electronic books. An asymmetric public key encryption technique may be used by the operations center, serving as a sending party. The operations center encrypts the electronic book using a symmetric key and a symmetric key encryption algorithm. The symmetric key may be randomly generated, or the symmetric key may be previously defined and retrieved from storage. The operations center then encrypts the symmetric key. The encrypted electronic book and the encrypted symmetric key are delivered to the home system. The home system decrypts the encrypted symmetric key and uses the symmetric key to decrypt the encrypted electronic book.

In another embodiment, only symmetric key encryption is used to protect the electronic book during delivery. A third party trusted source may provide a symmetric key to both the party sending the electronic book and the party receiving the electronic book. The trusted source encrypts the symmetric key using a symmetric key of the sending party and delivers the encrypted symmetric key to the sending party. The sending party decrypts the symmetric key and uses the decrypted symmetric key to encrypt the electronic book. The receiving party, which also receives the symmetric key from the trusted source in an encrypted format, decrypts the symmetric key using the receiving party's symmetric key. The receiving party then uses the decrypted symmetric key from the trusted source to decrypt the electronic book.

In another embodiment, the sending party and the receiving party negotiate a shared key for use in the delivery of the electronic book. The parties exchange key negotiation information and use the same key generation algorithm to generate the same key.

In yet another embodiment, a seed key generation algorithm is used to generate a sequence of encryption keys.

In an embodiment, the encrypted electronic book is broadcast to home systems. In another embodiment, the encrypted electronic book is provided on demand. In yet another embodiment, the encrypted electronic book is provided on a physical storage medium such as a smart card.

The system for providing secure electronic book delivery may also include integrity checking algorithms to ensure the electronic book was not altered in route. The system may also include mechanisms that identify the sending party and the receiving party.

Secure delivery of electronic books may be provided between a content provider such as a publisher and a distribution center such as an operations center. Secure delivery may also be provided between the operations center and a home system, between the home system library and the home system viewer, between a lending facility such as a public library and a home system, and between multiple viewers.

The system may also incorporate copyright protection mechanisms including application of visible copyright notices to the delivered electronic books. Other copyright information may be embedded within the electronic book using a visible watermark, for example.

BRIEF DESCRIPTION OF DRAWINGS

FIG. 14a is a schematic of an introductory menu.

DETAILED DESCRIPTION OF INVENTION

Figure 1A:
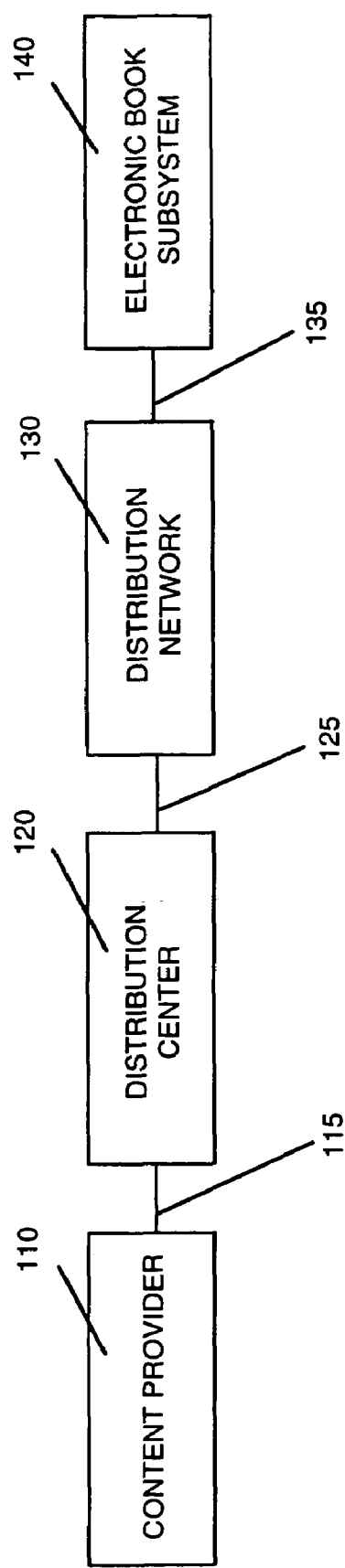
FIG. 1a is a block diagram of the primary components of an electronic book selection and delivery system.

FIG. 1a shows an electronic book distribution system 100 that may be used for secure distribution of an electronic book. A content provider 110 may publish hard copy versions of books or other printed media including newspapers, magazines, and product catalogs, for example. The content provider 110 may convert printed materials to an electronic format, apply security mechanisms, and provide the electronic formatted materials to a distribution center 120, over uplink path 115. The uplink path 115 may be a wired or a wireless path. The uplink path 115 may be a telecommunications network, for example. The uplink path 115 may be a satellite relay path or a wireless telephone path. The uplink path 115 may involve providing electronic books to the distribution center on a fixed media, such as a CD-ROM, for example.

In FIG. 1a, the content provider 110 and the distribution center 120 are shown as separate components of the electronic book distribution system 100. However, the content provider 110 and the distribution center 120 may be co-located. The distribution center 120 may convert printed matter into an electronic format. Alternately, the distribution center 120 may receive electronic files from an outside source, such as the content provider 110. The distribution center 120 may process and store electronic books using secure techniques as presented in Section VII.

The distribution center 120 distributes electronic books. The distribution may be, for example, over distribution path 125, distribution network 130, and distribution path 135 to an electronic book subsystem or terminal 140, which may include an electronic book viewer (not shown). The terminal may also be a television, a set top terminal, a personal computer, or similar device. An apparatus and method for the secure distribution of electronic books is disclosed in greater detail later. The distribution network 130 may be an electronic book store, an Internet web site, a wired or wireless telecommunications network, an intranet, a radio program delivery system, a television program delivery system, including cable television, satellite television broadcast, and over-the-air broadcast, for example. The electronic book distribution network 130 could include direct delivery through a mail delivery system of electronic books on a fixed media, such as a CD-ROM, for example.

Figure 1B:
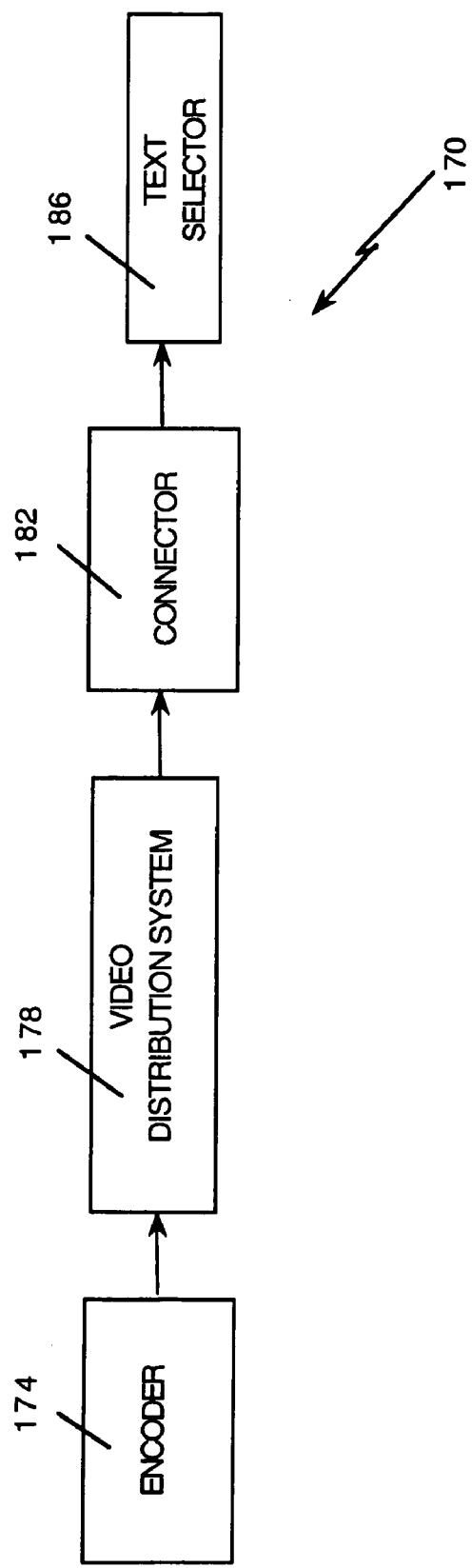
FIG. 1b is a block diagram of an electronic book selection and delivery system that uses a composite video signal.

FIG. 1b shows components of an electronic book distribution system 170 using a television program delivery system to distribute electronic books. In the embodiment shown in FIG. 1b, the components of the electronic book selection and delivery system 170 are an encoder 174, a video distribution system 178, a connector 182, and a text selector 186. The encoder 174 places textual data on a video signal to form a composite video signal. Although the composite signal may contain only textual data, it usually carries both video and textual data. A variety of equipment and methods may be used to encode text data onto a video signal. The video distribution system 178 distributes the composite video signal from the single point of the encoder 174 to multiple locations, which have connectors 182. The connector 182 receives the digital or analog video signal from the video distribution system 178 and separates, strips or extracts the text data from the composite video signal. If necessary, the extracted text data is converted into a digital bit stream. The text selector 186 works in connection with the connector 182 to select text.

Using the connector 182 and text selector 186 combination, various methods of selecting and retrieving desired text from a composite or video signal are possible. Text may be preselected, selected as received or selected after being received and stored. One method is for the connector 182 to strip or extract all the text from the video signal and have the text selector 186 screen all the text as received from the connector 182. The text selector 186 only stores text in long term or permanent memory if the text passes a screening process described below.

Figure 2:
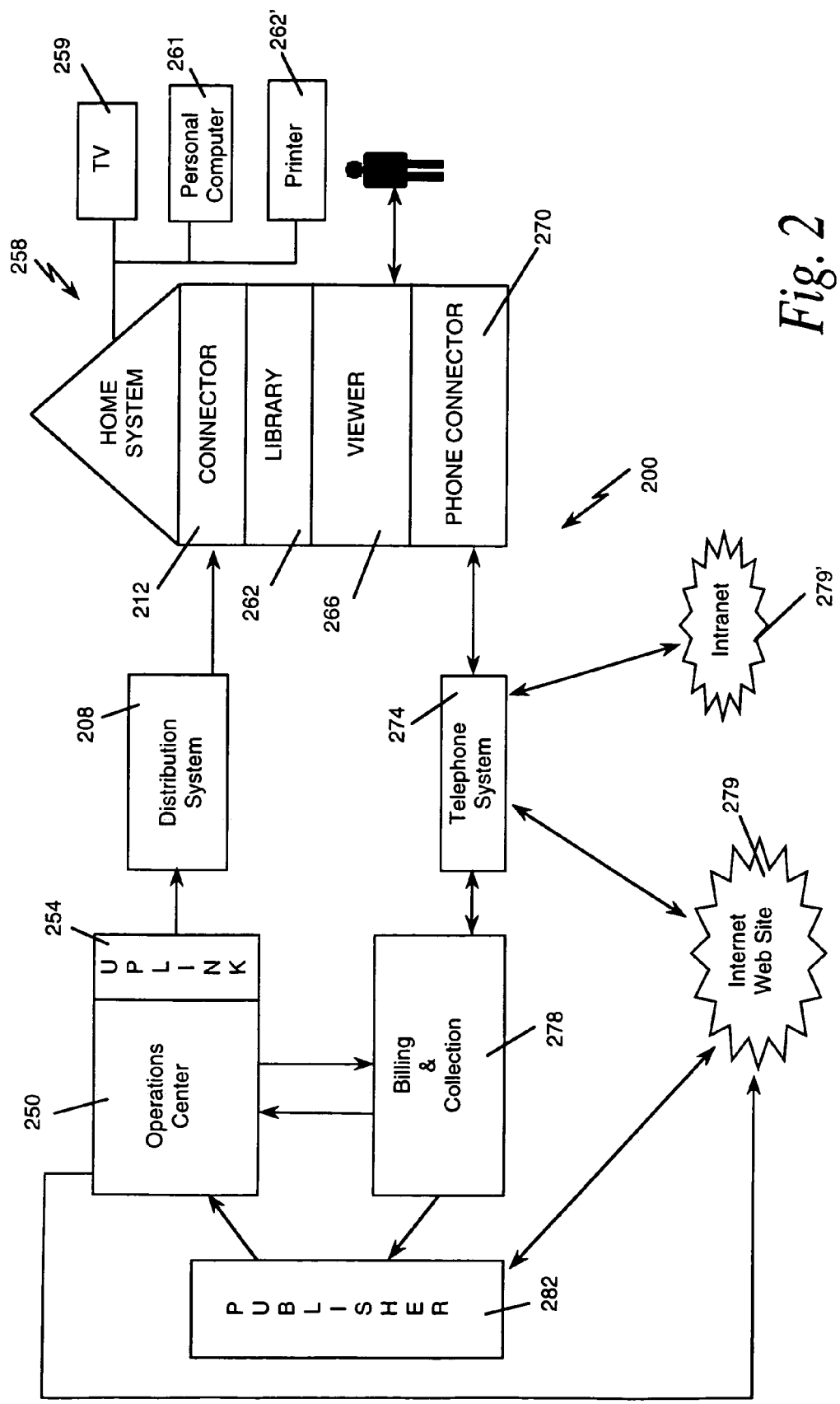
FIG. 2 is a schematic showing an overview of the electronic book selection and delivery system.

FIG. 2 shows another embodiment of an electronic book selection and delivery system 200. The delivery system 200 includes: an operations center 250 including an uplink site 254, a video distribution system 208, a home system 258 including a video connector 212, a library 262, a viewer 266, and a phone connector 270, telephone system 274, an Internet web site 279 and a billing and collection system 278. Also as shown in FIG. 2, the home system 258 may include connections to a television 259 and a personal computer 261 may be used to display menu screens, electronic books, electronic files, or any other information associated with the electronic book delivery system 200. In addition, the television 259 and the personal computer 261 may provide control functions that replicate and supplement those of the viewer 266.

The operations center 250 receives textual material from outside sources 282 such as publishers, newspapers, and on-line services. Alternately, the outside sources may maintain electronic books at the Internet web site 279. The outside sources 282 may convert textual and graphical material to digital format and apply security mechanisms, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual or graphical information such as contained in any novels, encyclopedias, articles, magazines, newspapers, catalogues, periodicals, or manuals. The term "title" may represent the actual title assigned by an author to a book, or any other designation indicating a particular group, portion, or category of textual information. The title may refer to a series of related textual information, a grouping of textual information, or a portion of textual data. For example, "Latest Harlequin Romance", "Four Child Reading Books (Ages 10-12)," "Encyclopedia 'BRITANNICA'™," "President's Speech," "Instruction Manual," "Schedule of 4th of July Events," "Pet Handbooks," "Roe v. Wade," and "The Joy of Cooking," are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book, and a picture of tickertape a title for a business book.

The operations center 250 includes the uplink site 254 for placing the text onto a telecommunications signal in a secure fashion and sending the telecommunications signal into a distribution system. The uplink site 254 would generally include an encoder 204 (not shown in FIG. 2) to encode the text onto the telecommunications signal.

Many analog and digital video distribution systems may be used with the electronic book delivery system 200, such as cable television distribution systems, broadcast television distribution systems, video distributed over telephone systems, direct satellite broadcast distribution systems, and other wire and wireless video distribution systems. Nearly any distribution system which can deliver a telecommunications signal, including a video signal, will work with the electronic book delivery system 200. It is also possible to distribute the electronic book without using a telecommunications signal as described in the embodiments presented in the referenced related applications. Methods used for securing the distribution of materials over the electronic book delivery system 200 are presented in Section VII.

The home system 258 performs five functions: (1) connecting with a video distribution system; (2) selecting data; (3) storing data; (4) displaying data; and (5) handling transactions. An important optional function of the home system 258 is communicating using, in one embodiment, a telephone communication system 274. The home system 258 may be made up of four parts: a video connector 212 or similar type of connector for connecting with the distribution system 208, a library 262 for storing and processing, a viewer 266 for viewing menus and text and a telephone connector 270 for connecting with a telephone communications system 274. Additional embodiments are presented in the referenced related applications that address alternative communication mechanisms.

The billing and collection system 278 may be co-located with the operations center 250 or located remote from the operations center 250. The billing and collection system 278 may be in communication with the home system 258 using telephone-type communication systems (for example 274). Any of a number of communication systems as presented in the referenced related applications, such as a cellular system or the Internet, will operate with the billing and collection system 278. The billing and collection system 278 records the electronic books or portions of text that are selected or ordered by the subscriber. The collection system will charge a subscriber's credit account or bill the subscriber. In addition, the billing and collection system 278 may monitor that amount due to publishers or other outside sources 282 who have provided textual data or other services such as air time to enable the text delivery system 200 to operate.

Also shown in FIG. 2 is an intranet 279'. The intranet 279' may be used as a part of a private distribution network for distributing and circulating electronic books. For example, a university library may use the intranet 279' to circulate electronic books to university students and professors.

Figure 3:
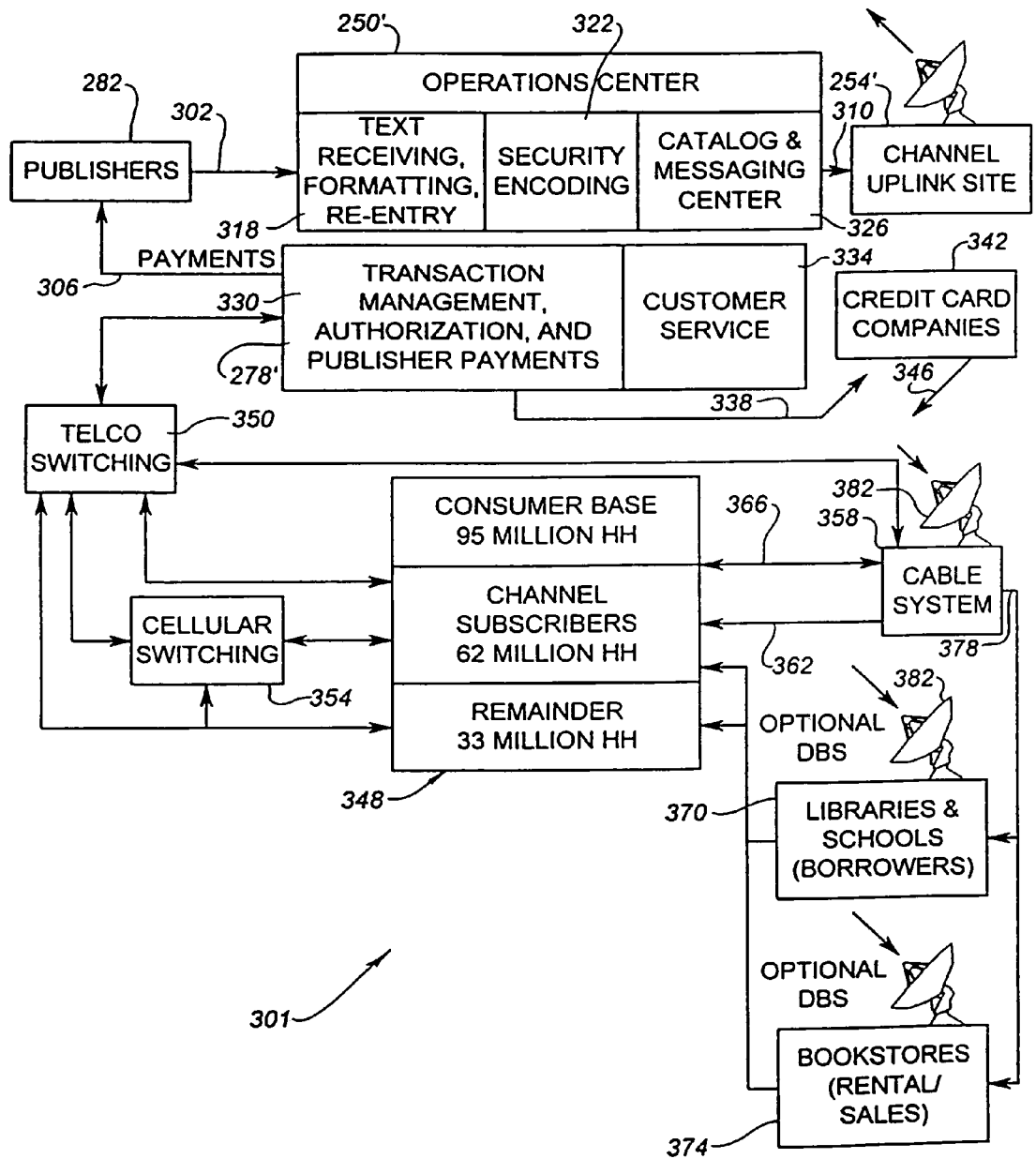
FIG. 3 is a schematic of a delivery plan for the electronic book selection and delivery system.

FIG. 3 is an expanded overview of a delivery plan 301 for the electronic book delivery system 200. It is a comprehensive delivery plan 301 to support various types of users and various billing systems. FIG. 3 shows that publishers 282 may provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding and processing 322 and a third section for catalog and messaging center functions 326.

The collection and billing system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Methods for communicating between the subscriber base 348 and the billing and collection system 278' include: by telephone switching 350 alone, cellular switching 354 and telephone switching 350 combined, and by use of the cable system 358 and the telephone switching 350. The system shown supports both one-way 362 and two-way cable communication 366 with subscribers. Additional communication methods are presented in the referenced related applications. Public libraries and schools 370 as well as bookstores 374 may use the delivery system 301. Methods used for securing these communications are presented in Section VII.

Public libraries and schools 370 could have a modified system to allow the viewer to be checked-out or borrowed while bookstores 374 would rent or sell the viewer and sell electronic book data. The bookstores 374 as well as the public libraries and schools 370 may be serviced by cable 378. Optional direct broadcast systems (DBS) 382 can also be used with the system 200 as detailed in the referenced related applications.

I. The Operations Center

Figure 4:
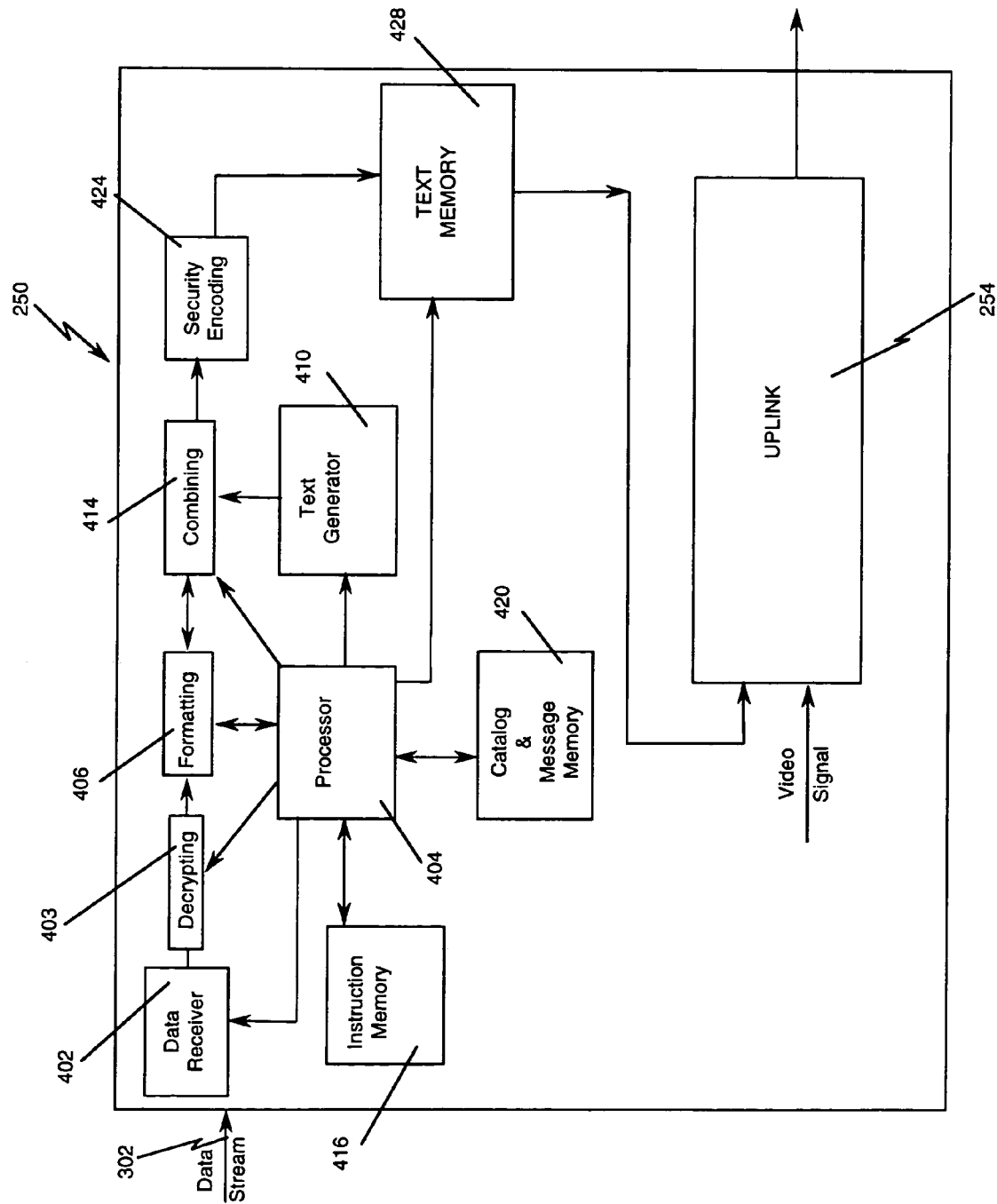
FIG. 4 is a block diagram of the operations center.

FIG. 4 is a schematic of the operations center 250, which includes the uplink The operations center 250 may gather text or books by receiving, decrypting, formatting, storing, and encoding. A data stream 302 containing text may be received at the operations center 250 by a data receiver 402. The data receiver 402 is under the control of a processor 404. After reception, the data stream is decrypted using digital logic for decrypting 403 which is under the control of the processor 404. The data stream is then formatted using digital logic for formatting 406 which is also under the control of the processor 404. If any additional text is generated at the operations center 250 locally for insertion into the distributed signal, the text generation is handled through text generator hardware 410, which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404, which uses an instruction memory 416. The processor 404 and instruction memory 416 may be supplied by a personal computer or mini-computer, for example. To perform the catalog and messaging functions, the operations center 250 uses a catalog and message memory 420 and the text generator 410 if necessary.

The data stream of text, catalog and messages may be encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Additional embodiments are presented n Section VII. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool books for transmission as is described below. The operations center 250 may also store the electronic book as secure compressed data files using the secure storage techniques presented in Section VII.

In an embodiment, to transmit textual data, the distribution system 208 (see FIG. 2) may use high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during regular television programming using four lines of the Vertical Blanking Interval at a rate of approximately one book every 1.6 minutes (63,840 bits per second). Alternatively, books may be transmitted over a dedicated channel, which interrupts programming so that 246 lines of video can be used to transmit approximately 2,250 books every hour (3.9 Mbits per second). A teletext type format is the simplest but possibly the slowest text format to use with the electronic book delivery system 200. In either event, an encoder 204 may be used at an uplink site 254 to insert textual data into the analog video signal. In many other respects, the delivery of the textual information may be completed using an existing cable television plant and equipment. Alternative transmit formats and delivery systems are presented in the referenced related applications.

Figures 5A, 5B:
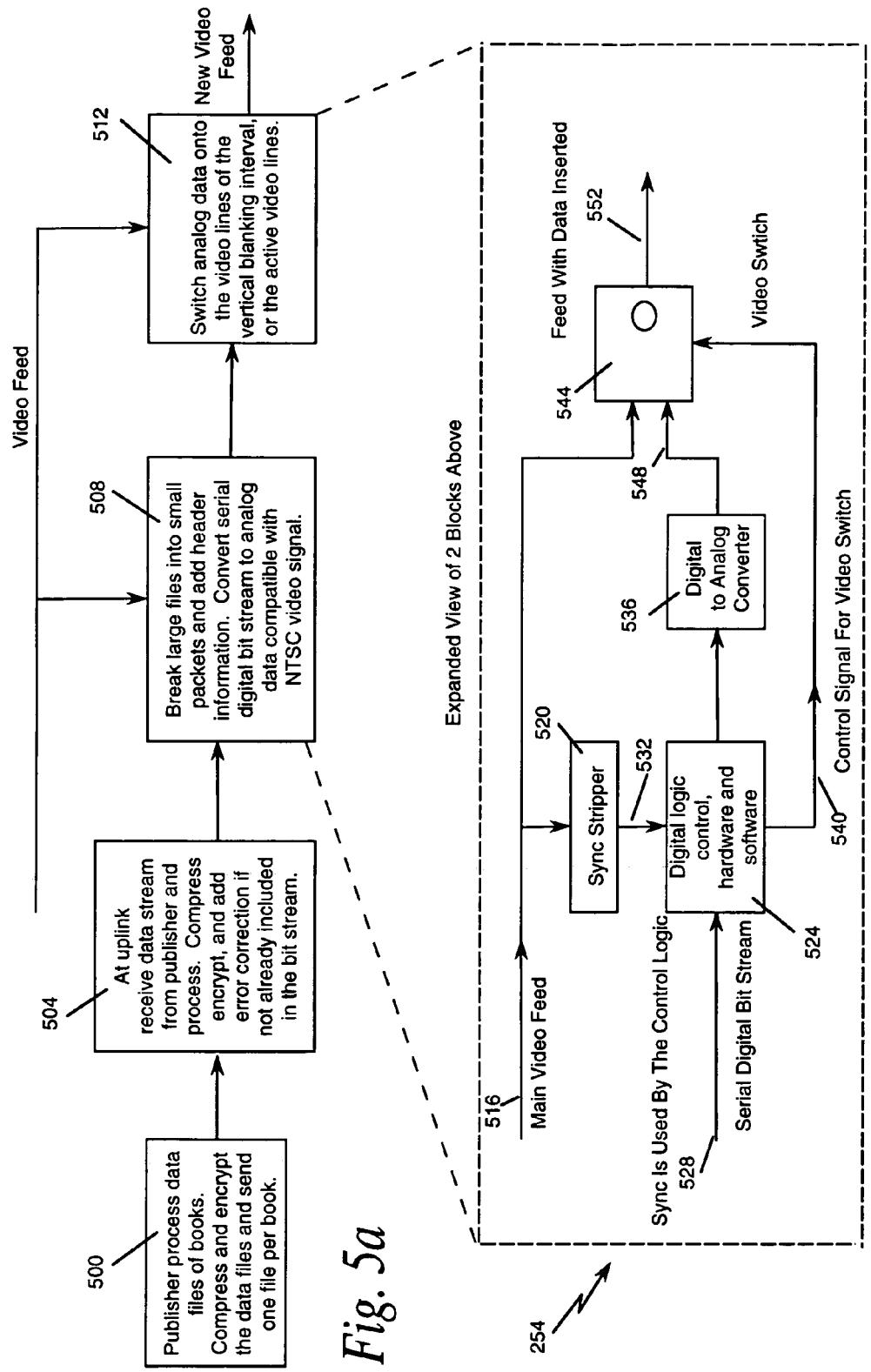
FIG. 5a is a flow diagram of processing at the operations center and uplink.
FIG. 5b is a block diagram of a hardware configuration for an uplink site.

FIG. 5a is a flowchart of steps involved in processing text from the publisher or provider 282 that may occur at the operations center 250. As shown in block 500, the publisher 282 processes data files of text for books, compresses, encrypts and sends the data files to the operations center 250 or uplink 254. Text files for books may be sent one book at a time. As shown in block 504, the uplink 254 or operations center 250 receives and processes the data stream from the publisher 282. Generally, part of this processing includes encryption and error correction. Specific embodiments used for encryption are presented in Section VII. Text files may be delivered for receipt by multiple home subsystems simultaneously, or to a specific individual home subsystem.

In FIG. 5a, the electronic books are distributed to consumers using a video distribution system such as a cable television system. However, the electronic books may also be packaged as data packets and distributed over other telecommunications networks such as a digital wireless telephone network, for example.

In one embodiment, as shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data may be placed either in the VBI or the active video lines. In some instances, unused portions of bandwidth (such as 5-40 MHZ, 70-75 MHZ, 100-109 MHZ or other guard bands) may be used instead of the video lines. Alternate transmission methods are presented in the referenced related applications.

FIG. 5b is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch The video switch 544 integrates the video feed 516 and analog data stream 548 into a video feed with analog data signal inserted 552.

As an alternative to cable, broadcast or other television delivery methods, the public telephone system may be used to transmit books to the subscribers. An average book would take about 7 minutes to transmit over the public telephone system. Using the telephone system, it is not necessary to combine video and text into a composite signal. In most other respects, the operations center would remain similar whether text delivery was by telephone or cable. File server technology (such as that described in U.S. Pat. No. 5,262, 875, entitled AUDIO/VIDEO FILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) may be used at the operations center with a telephone system text delivery method.

As another alternative to cable, television, and telephone system delivery, the public telephone system may be used to provide access to the Internet, where the Internet web site 279 may be accessed. Electronic books may be ordered, paid for, and delivered directly from the Internet web site 279 over the telephone system. In addition, the electronic book viewer 266 may be used for wireless voice and data communications using the Internet.

When a wireless telephone network is used to distribute electronic books, or otherwise communicate with the home system 258, the home system 258 may receive data using any one or more standard protocols including time division multiple access (TDMA), code division multiple access (CDMA), Global Systems for Mobile Communications (GSM) and Advanced Mobile Telephone System (AMPS) protocols. In any delivery system using the telephone system, individual subscribers may increase the electronic book deliver rate by incorporating high speed modems or other communications devices such as an Integrated Services Digital Network (ISDN) connector, or by use of a Digital Subscriber Line (DSL). These alternative delivery methods are presented in the referenced related applications.

II. The Home System

Figure 6A:
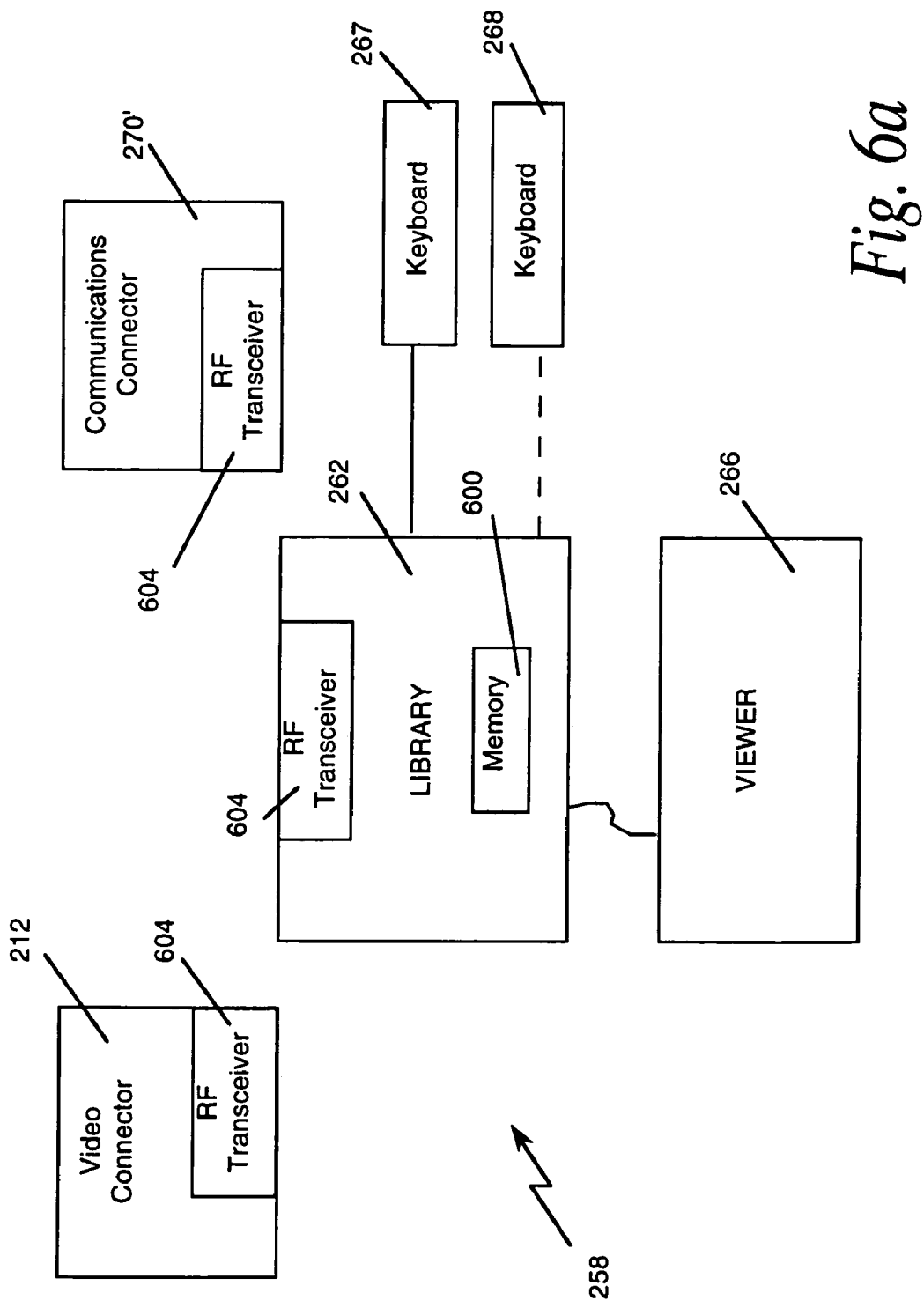
FIG. 6a is a block diagram of a hardware configuration for a four component home subsystem.
Figure 6B:
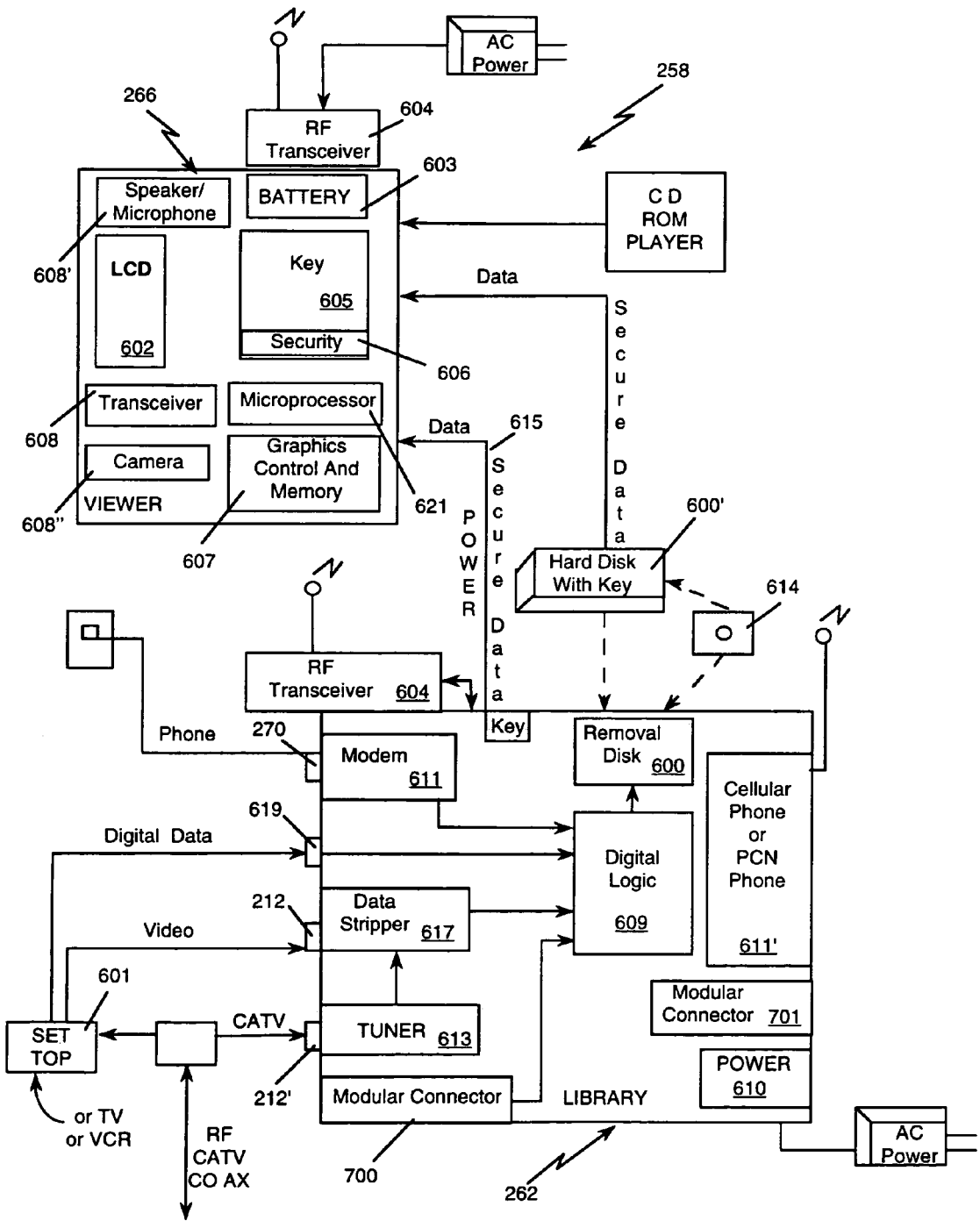
FIG. 6b is a schematic of a two unit home subsystem.

The hardware configuration for a four component home system 258 is shown in FIG. 6a. FIG. 6b shows a hardware configuration for a two component home subsystem. The home system 258 performs several functions, such as receiving data and video transmissions, stripping (or extracting) the data from the video signal, decrypting the data, screening and storing the data, providing user friendly interface controls and software, displaying menus and text, processing transactions, initiating telephone calls and transmitting billing data. Various hardware configurations may be utilized to achieve the desired functions of the home system 258. For example, as shown in FIG. 6b, the home system 258 can be configured to utilize the reception and channel tuning capability of the current installed subscriber base of cable converter boxes and televisions 601 and networked computers. The home system 258 can also be designed as an advanced set top terminal converter box with menu generation capability, electronic memory and a telephone modem as described in section V below. Alternatively, the home system 258 can be configured to support alternate delivery and ordering methods as described in the referenced related applications.

The electronic components which make up the home system 258 can be arranged in a variety of ways. In the four unit subsystem of FIG. 6a the viewer 266 and library 262 are wired together while the remaining components communicate through RF transceivers 604. In a simple version of the home system 258 there are only two units, a library 262 and a viewer 266. FIG. 6b shows a two unit home system 258 with certain optional features.

The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library 262 contains the connector function to the electronic book distribution system 208, connector function to a public telephone communications system, and memory 600 (which may be removable and portable 600'). More specifically, the library 262 would include data stripping functions 617, digital logic 609, memory storage 600, power circuitry 610, optional connections 611 (including cellular or PCN 611'), optional battery (not shown), optional tuner module 613 and an optional RF transceiver 604. The connector 212 and the public telephone system connection 270, as well as the removable portable memory unit 600 of the library 262 may be broken out into separate components. (FIG. 6b shows a removable portable hard disk memory 600' with removable cartridges 614.) Finally, the home system 258 may include an attached keyboard 267 or a wireless keyboard 268. Both the attached keyboard 267 and the wireless keyboard 268 may be used to communicate with the viewer 266 (not shown) or the library unit 262. The wireless keyboard 268 may communicate using radio frequency (RF) signaling, for example.

In an alternate arrangement, all functions of the home system 258 may be incorporated into a single unit. The functions of the library 262, for example, may be carried out by a card or chipset in the viewer 266. All the communications devices needed to couple the home system 258 to various telecommunications networks may also be incorporated into the viewer. All interfaces between the home system 258 and the subscriber may be included with the viewer 266. In this embodiment, the viewer 266 may include a communication device for receiving inputs from a separate keyboard. The viewer 266 may also include a built-in video camera 608" that may be used to transmit images of the subscriber. Using the transceiver 608, the camera 608" and the speaker/microphone 608', the subscriber may use the viewer 266 for video conferencing, for example.

Therefore, the home system 258 may have as many as five separate components, which communicate with each other. The two, three, four or five separate components which make up the home subsystem can communicate with each other in a variety of ways, including hardwired connection 615, RF transceiver 604 and other wireless methods.

RF communications may be used in the home, allowing separate components to be located throughout the home without restriction. The data communicated between the units may be secure data using security techniques presented in Section VII. In addition, the library 262 may provide power to the viewer 266 through the hard wire communication link 615.

To receive and strip data from a video signal at the consumer's home, a device such as a cable interface device or cable connector 212 is used. The cable connector device includes a tuner 613, while the cable interface device makes use of existing tuning equipment in the home. In either configuration, data is stripped from the video signal and stored at the subscribers location in the library 262. The phone connector 270, optional connector 611, and modular connector 701 initiate communications and transmit ordering and billing information to the operations center 250 or billing and collection system 278. A digital connector 619 is provided to communicate digital information with the set top 601. The library 262 is the intelligent component of the home subsystem, incorporating the hardware and software necessary to store the text data, generate menus and effect the purchase transactions. In addition to an RF transceiver 604, the home library 262 also includes the necessary jacks and connections to allow the system to be connected to the viewer 266. As shown in FIG. 6b, the library 262 communicates the text data to the viewer 266 in a secure format, which requires a key 605 for decryption. The text may be decrypted page by page just before viewing. Alternative security embodiments for library 262 to viewer 266 communications are presented in Section VII.

a. The Video Connector

Figure 7:
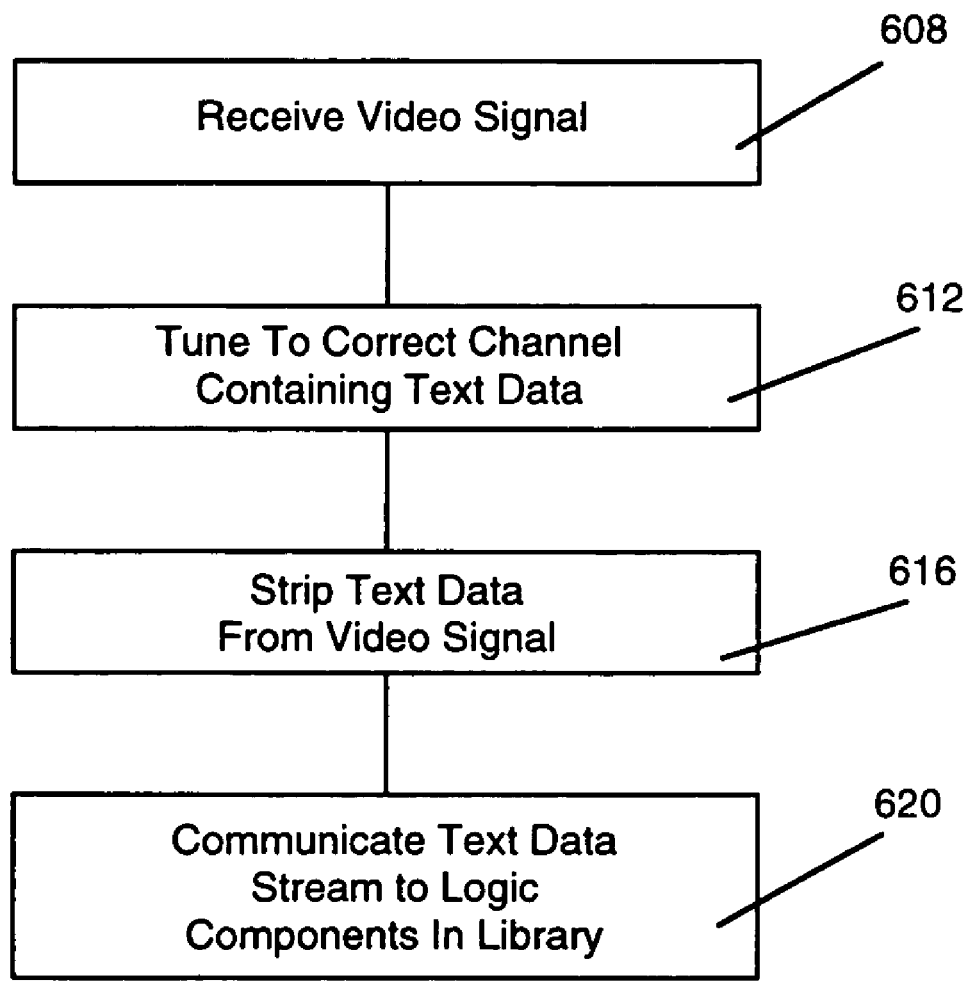
FIG. 7 is a flow diagram of processes performed by a video connector.

FIG. 7 shows the flow of the processes performed by the video connector 212. The video connector 212 receives the video signal 608, tunes to the channel containing the text data 612, strips the text data from the video signal 616, and communicates the text data stream to logic components in the library 622.

The connection to the video distribution system may be a cable connector to a cable television delivery system, as shown in FIG. 6b. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library 262. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home system 258. The optional tuner module 613 would instead receive the CATV signal directly through the cable connector 212. Additional connector options, which allow for the receipt of text files using alternative delivery methods, are presented in the referenced related applications. This ubiquitous access is provided using the modular connector 700 as depicted in FIG. 6*b*.

b. Library

Figure 8:
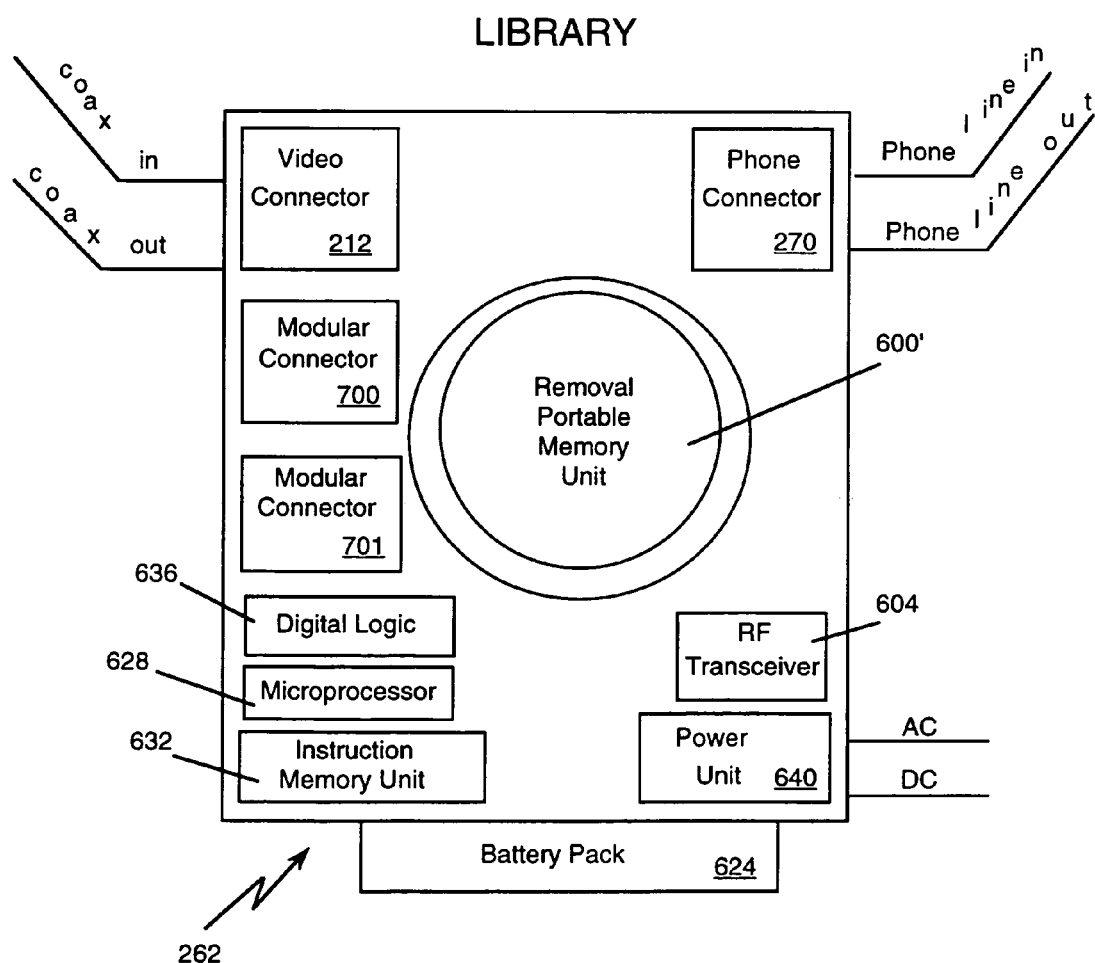
FIG. 8 is a block diagram for an example of a library unit.

An embodiment of the library 262 for a two unit home subsystem is shown in both FIG. 6*b* and FIG. 8. The embodiment shown includes the following optional parts: the video connector 212, phone connector 270, RF transceiver 604, and battery pack 624 in addition to a removal portable memory 600', microprocessor 628, instruction memory unit 632, digital logic 636, and power unit 640.

The library 262 contains a digital logic section 609 (not shown in FIG. 8) which includes the microprocessor 628, the digital logic 636 and the instruction memory unit 632. The microprocessor 628 may be a secure microprocessor such as the Mot SC21 device sold by Motorola. The digital logic section 609 will receive the serial digital bit stream from the data stripper circuit 617 and process the data. Error correction and security processing will also be performed by the digital logic section 609 and the data will be checked for proper address. If the address of the data is correct and the library 262 is authorized to receive the data, the data will be decrypted and transferred to the memory storage unit 600, 600'. Authorization to receive the data may be provided by the cable headend or another distribution point. An authorization code may be sent in the serial digital bit stream. The digital logic section 609 will send appropriate text and graphical data to the memory storage unit 600, 600'. It may decrypt then re-encrypt the data or transfer this data in a compressed and encrypted format and the data remains stored in a compressed and encrypted format.

i. Memory Storage Unit

The memory storage unit of the library may be a removable portable memory unit 600' (as shown in FIGS. 6*a*, 6*b* and 8). A variety of options are available for memory storage: a hard disk drive, such as an 80 megabyte, a 200 megabyte, a hard disk with removable platters, and CD ROM. Referring to FIG. 6*b*, a hard disk drive unit 600', which contains removable platters, may also be used. This would provide virtually unlimited library storage capacity. Data may be stored in the memory storage unit in a compressed and encrypted format. As is also shown in FIG. 6*b*, the data may also contain a key or unique ID number that matches the ID or key of the viewer 266. This matching of a unique key or ID number prevents unauthorized transfer of text data from the memory storage unit to an unauthorized viewer. Alternative embodiments to store text data in encrypted format are addressed in Section VII. Small memory devices such as smart cards, electronic memory cards or PCMCIA cards (personal computer memory card industry association) may also be used to store the data.

ii. Power Circuitry

As shown in FIGS. 6*b* and 8, the library 262 will accept power from AC wall power 610, DC power 640, or optional battery power 624. The power circuitry 610, 640 may provide all the voltage necessary from either the battery 624 or AC unit for the various circuitry in the library. The power circuitry 610, 640 may also provide power to the viewer through a single data cable when connected to the viewer. The power circuitry 610, 640 will recharge the battery using AC power when in operation. With the optional battery unit 624 installed, the library 262 becomes a portable unit and can still provide power to the viewer 266. In order to extend battery life, power conservation measures may be utilized, such as shutting down the memory system when not in use. When the viewer unit 266 is being utilized and the library circuitry is not being utilized, virtually all power may be shut down to the library 262.

iii. Connection to the Public Telephone System

In an embodiment, the connection to the telephone system may be provided by a connector device 611, which consists of a modem. Various available modems may be used to perform this function. As shown in FIG. 6*b*, cellular phone or PCN phone connections 611' may also be provided. When the home system 258 is first initialized, the modem may be used to transfer the name and credit card information of the consumer to the billing and collection system 278. The telephone connection 270 may be utilized each time an electronic book is purchased by a consumer to complete and record the transaction. The telephone connection 270 may also be used to receive the text data from the operations center 250, by-passing the video distribution system 208. The phone connection 270 may be a separate unit as shown in FIG. 6*b*. However, alternate means exist to connect the home system 258 to the billing and collection system 278 or the operations center 250. The modular connector 701 (shown in FIGS. 6*b* and 8) provides access to each communication network to provide a path from the home system 258 to the billing and collection system 278 or the operations center 250. These alternatives are presented in detail in the referenced related applications.

iv. Library Processing

Figure 9:
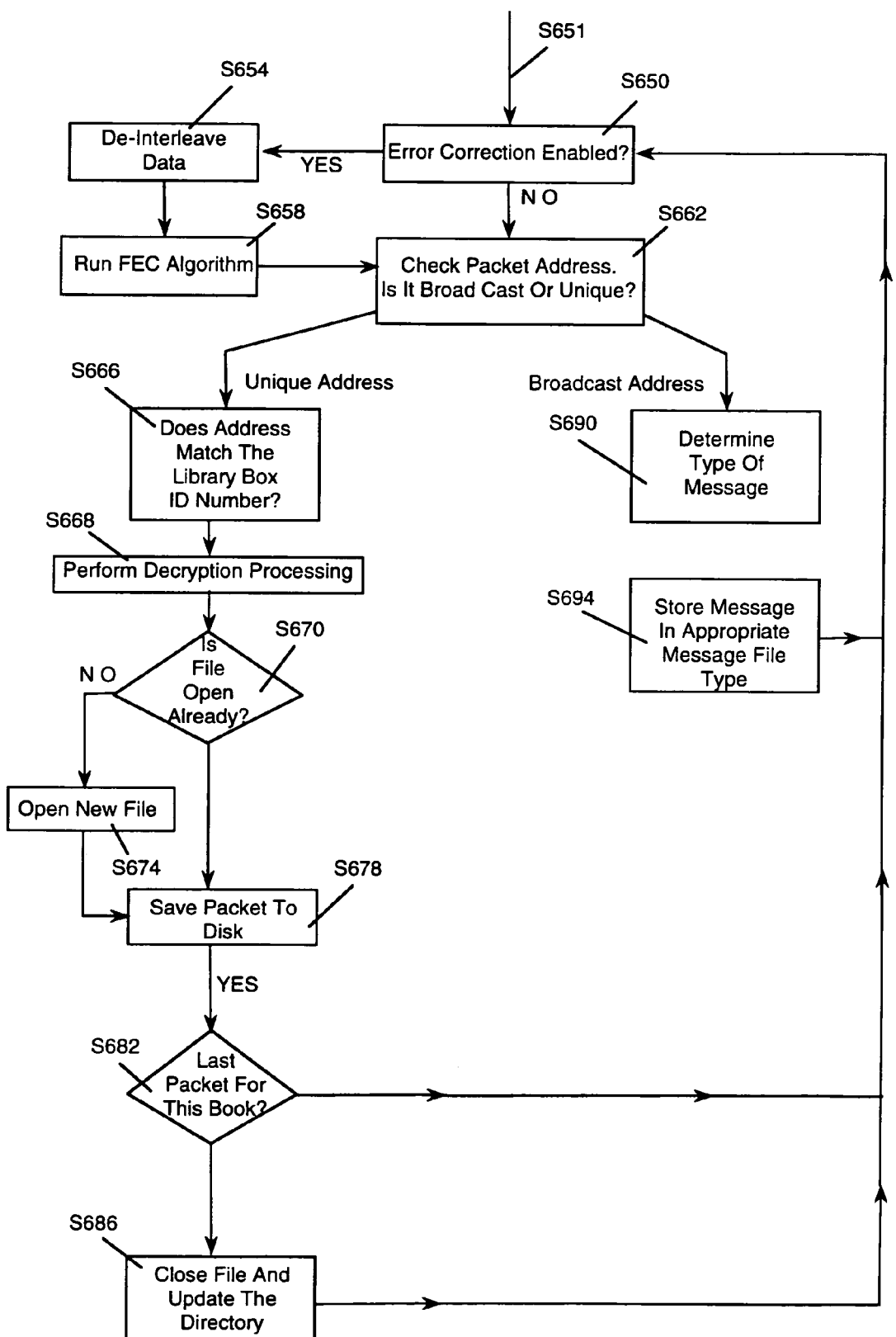
FIG. 9 is a flow diagram of processes performed by a library unit on the received data stream.

FIG. 9 shows for one embodiment, an example of processing performed by the digital logic section 609 of the library 262 on the data stream 651 received from the video connector 212 or stripper circuit 617. In step S650, digital logic section 609 checks the data stream 651 for error correction. If an error is detected, in step S654 digital logic section 609 de-interleaves the data and in step S658 runs a FEC (Forward Error Correcting) algorithm. In steps S650, S654 and S658, the digital logic section 609 performs the error correction needed on the data stream. If no error correction is necessary the digital logic section 609 proceeds to step S662 and checks data packets individually for packet address.

If the address is a unique address, the process moves to step S666 and the digital logic section 609 checks whether the address of the packet matches the library box ID number. The library box ID number is a unique number associated with the library 262. The library box ID is used to ensure security of the data. The process then moves to Step S668, and the digital logic section 609 performs the decryption processing, as presented in Section VI. The process then moves to step S670 and the digital logic section 609 determines whether an electronic file has already been opened into which the data packet can be saved. If no data file has been opened, the digital logic section 609 opens a new data file for that packet. If an electronic file has been opened, the process moves to step S678 and the digital logic section 609 saves the packet in the electronic file on disk. The process moves to step 682 and the digital logic section 609 checks to see if this is the last packet for a particular book for a particular textual data block being received. If it is the last packet of information, the process moves to step 686 and the digital logic section 609 closes the electronic file and updates the directory of available electronic files. Following either step S682 or S686, the process returns to receive another data packet from the data stream received from the data stripper block.

If the packet address is checked and the address is determined to be a broadcast address, the process moves to step S690 and the digital logic section 609 determines the type of message that is being sent. The message may be an index of book titles, menu (and menu graphics) information, announcements, special offerings, discounts, promotions, and previews, for example. The process then moves to step S694 and the digital logic section 609 stores the message in an appropriate electronic message file. The process then returns to step S650 to receive another data packet and perform another error check.

Figure 10:
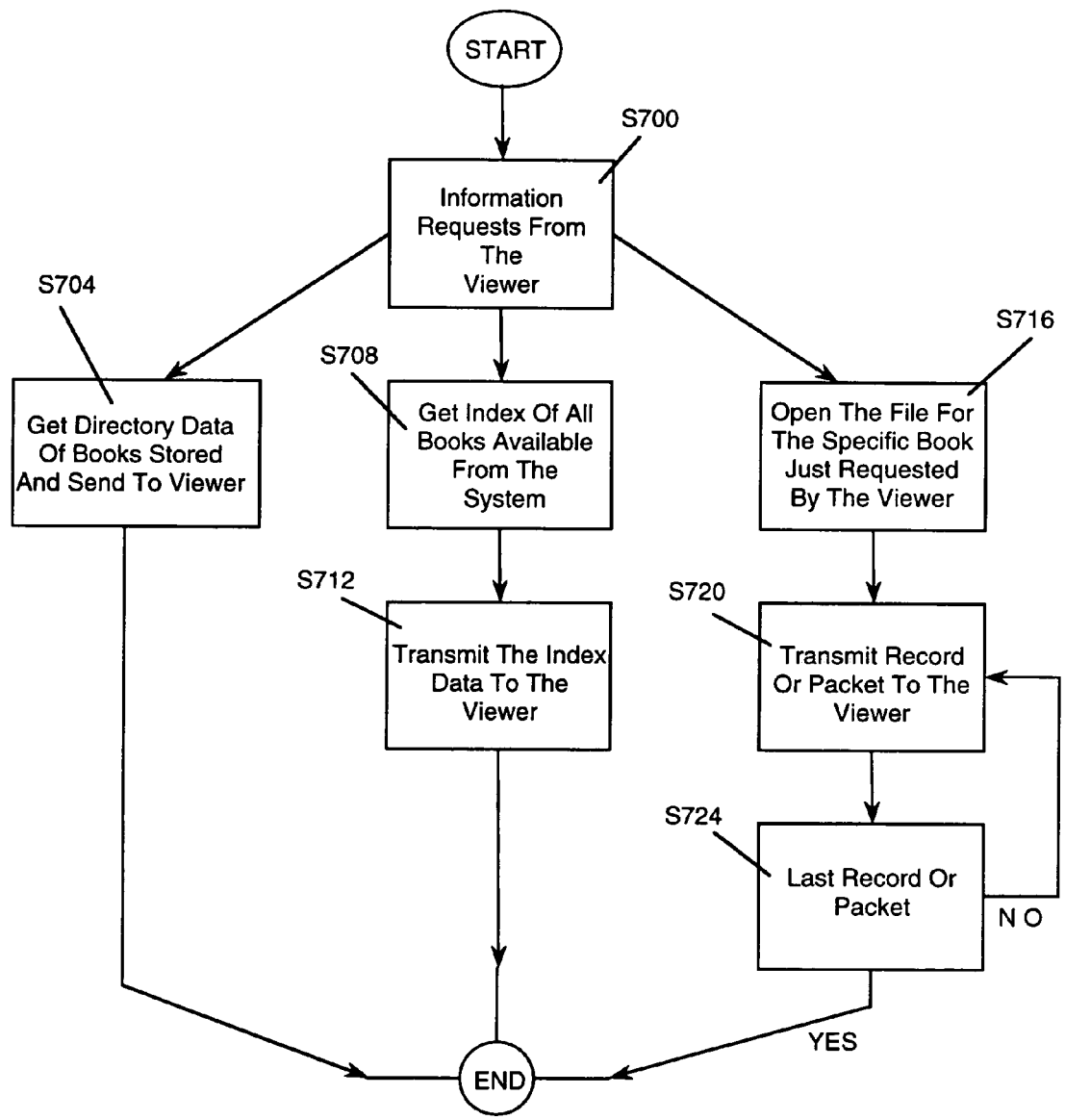
FIG. 10 is a flow diagram of processes performed by a library unit on information requests from a viewer.

Using the process of FIG. 9, the library 262 is able to receive, store and update directories related to the textual data and graphical data (that can be used to depict pictures in a given book or to generate menus). Variations of the processes are possible depending on the format of the data and operating system of the library 262. FIG. 10 shows an example of the processing of information requests from the viewer 266 at the library 262. Information requests from the viewer 266 are received either through the cable connecting the viewer 266 to the library 262 or through wireless transmissions such as RF. It is possible in some embodiments for subscribers' requests to come from a set top converter box 602 (see Section V).

Information requests received from the viewer 266 generally fall into three categories: (1) directory data of books stored in the library 262, (2) index of all available books on the system, and (3) requests for a specific book (step S700). In step S704, the digital logic section 609 answers a request from the viewer 266 for a directory of data showing the books stored at the viewer 266. The directory of data is sent to the viewer 266 so that it may be displayed to the subscriber. In step S708, the digital logic section 609 handles requests from the viewer 266 for an index of all available books on the system. The library 262 will obtain an index of all the available books on the system and transmit that index, in step S712, with menu information to the viewer 266. In step S716, the digital logic section 609 replies to a request from the viewer 266 for a specific book. In step S720, the digital logic section 609 opens an electronic file for the specific book requested by the viewer 266 and transmits the record or transmits the information on a packet-by-packet basis to the viewer 266. This process of transmitting the specific book, record, or packets to the viewer 266 continues until the last record or packet has been sent in step S724.

In addition to the processes shown on FIG. 10 in handling a request for a specific book, the library 262 also orders and receives specific books from the operations center 250 using the process as described in step S716. Following a request for a specific book which is not stored at the library 262, the library 262 will proceed to determine the next available time the book will be on the video distribution system 208 or an alternative delivery system and ensure reception and storage of that book (process not shown). In performing this process the library 262 will transmit to the viewer information on when it will obtain the text data for the book so that the subscriber may view the book. In addition to timing information, price and other ordering information may also be passed by the library 262 to the subscriber.

C. The Viewer

Figure 11:
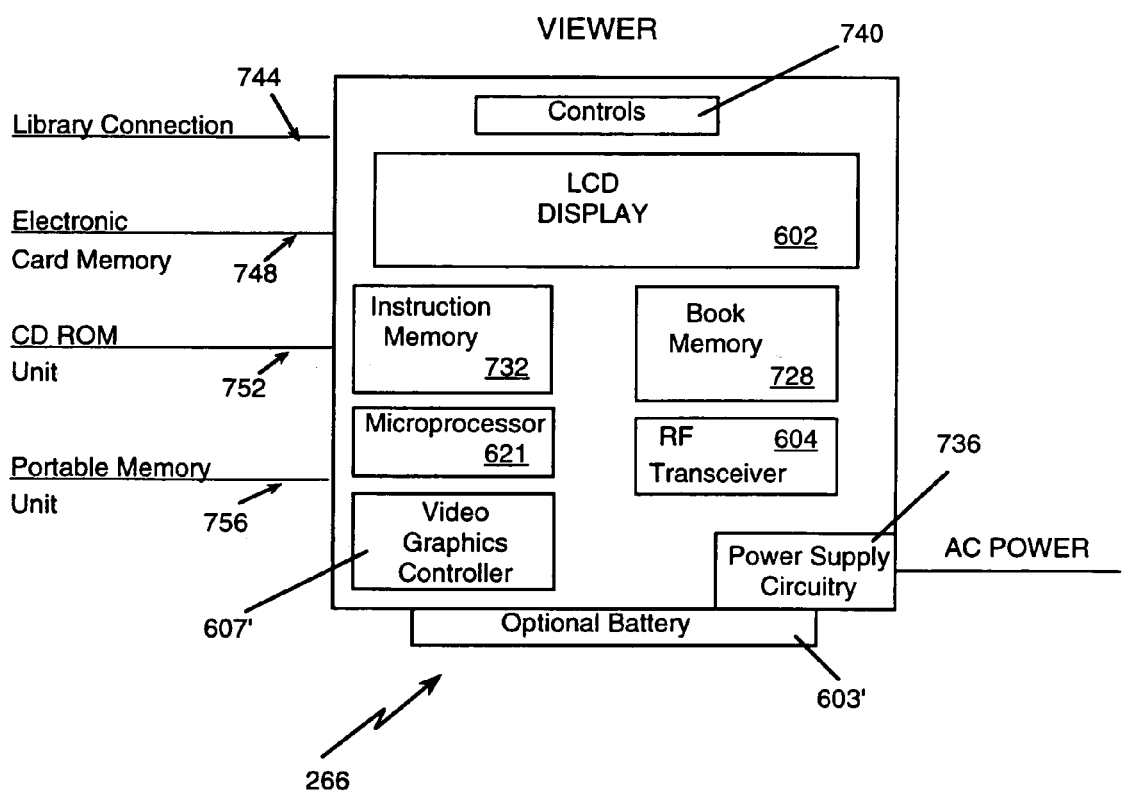
FIG. 11 is a block diagram showing the components for an example of a viewer.

FIG. 11 is a block diagram of a viewer 266 showing its internal components. The viewer 266 of FIG. 11 is similar to the viewer 266 depicted in FIG. 6*b*. The viewer 266 is designed to physically resemble a bound book. The viewer 266 is made up of five primary components and seven optional components: (1) LCD display 602, (2) digital circuitry (not shown), (3) video graphics controller 607N, (4) controls 740, (5) book memory 728, (6) optional power supply circuitry 736, (7) optional battery 603N, (8) optional RF transceiver 604, and (9) optional cellular or mobile connector (such as 611N) (10) optional keyboards 267 and 268, and (11) an optional speaker/microphone 608', (12) optional alternative communication interface devices.

(1) A high resolution LCD screen 602, of VGA quality, may be used by the viewer 266 to display text and graphic images. The screen may be the size of one page of an electronic book. A two page screen or two screens may also be used with the viewer 266.

(2) Digital circuitry that includes a secure microprocessor 621, instruction memory 732, and digital logic. Data is transferred to the viewer 266 in compressed and encrypted format. In one embodiment, the secure microprocessor 621 compares the ID number of the viewer 266 with the incoming data stream and only stores the text data if the ID number of the viewer 266 matches that within the incoming data stream. The viewer 266 may be configured to not output text data or other data and that the data is decompressed and decrypted only at the moment of viewing and only for the current page being viewed. These measures provide additional security against unauthorized access to data. Additional embodiments are presented in Section VII.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the consumer to select stored electronic books and electronic books from catalogues, move a cursor, and turn pages in an electronic book. Typically, the controls 740 include forward and reverse page buttons 742, 741, a ball 743 for cursor movement, one or more selection buttons 745, a current book button 747 and a bookmark button 749 (see FIG. 14*a*).

The controls 740 should be easy to use and conveniently located. Referring to FIG. 14*a*, the controls for the viewer 266 may be located below the screen 602 at the bottom portion of the viewer 266. The next page turn button 742 is the most used button 740 and is located towards the right edge of the page. The subscriber is likely to use right hand thumb movements to work the controls particularly the page turn buttons 741, 742. Therefore, the buttons may be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown, those buttons 747, 749 are located on the inside portion towards the binder of the viewer 266.

Locating the ball 743 or other cursor movement device (such as four pointer arrows not shown) in the bottom center of the viewer 266 is both easier for the subscriber to use and easier in manufacturing the viewer 266. The selection buttons for the cursor 745 may be located below the middle diameter of the cursor ball 743 on the right and left sides of the ball as shown. If pointer arrows are used for cursor movement, a selection button 745 may be located in the center of the four arrow buttons (not shown). Again, the most used controls 740 should be located where a subscriber's right hand thumb would normally rest.

(5) Book memory 728 for at least one electronic book or more of text is included in the viewer 266. The memory 728 stores text and any graphics, which represent pictures in a book. The memory 728 can also store menu graphics data. Two different memory 728 devices may be used in the viewer 266, one for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books.

Text for electronic books may be displayed in various font sizes. To accommodate various fonts for display, a variety of fonts are stored in instruction 732 or book memory 728. Thus larger or smaller fonts may be recalled from memory 621, 728 to create displays desired by the subscriber.

(6) Power supply circuitry 736 in the viewer 266 will accept power from either an AC power source or from an optional battery 603', or the library 262. The power supply circuitry 736 provides the necessary voltages to accommodate the various systems within the viewer 266.

(7) An optional battery 603' is provided in one embodiment. The battery 603' is automatically recharged when AC power is available.

(8) An optional RF transceiver 604 which provided two-way data link between the viewer 266 and other components of the home subsystem can also be included in the viewer 266.

(9) Also, the viewer 266 may include a cellular transceiver (not shown) for mobile communications.

(10) The optional wired (attached) keyboard 267 and wireless (e.g., RF) keyboard 268 (see FIG. 6a) may be used with the viewer 266 to provide communications between the subscriber and the viewer 266.

(11) The optional speaker and microphone 608' allow the viewer 266 to provide audio signals to the subscriber, and allow the subscriber to provide an audio input. The speaker and microphone 608' may be used in conjunction with the cellular transceiver 608 or other telecommunications equipment to provide for reception and transmission of telephony and data.

(12) The optional alternative communication interface devices allow the viewer 266 to make use of a variety of communication paths, including wireless Internet paths.

The viewer 266 of FIG. 11 has parts available for providing connections to: a library 744, electronic card memory 748, CD ROM units 752, and a portable memory unit 756 (such as that shown in FIG. 6b as 600'). Various electronic memory cards such as PCMCIA can be used with the viewer 266 to supply and store electronic books.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 for a predefined period of time determined by the system operator. The software can be configured to allow the electronic book to be read during a period of time (i.e., two weeks) and then automatically erased, read once and erased, or held in memory permanently. In one embodiment, each viewer 266 may have a unique key 605. All of the data storage may be encrypted with the key 605 for an individual viewer 266 to prevent more than one viewer 266 accessing the text file or electronic book file. Alternative security embodiments are presented in Section VII.

Figure 12:
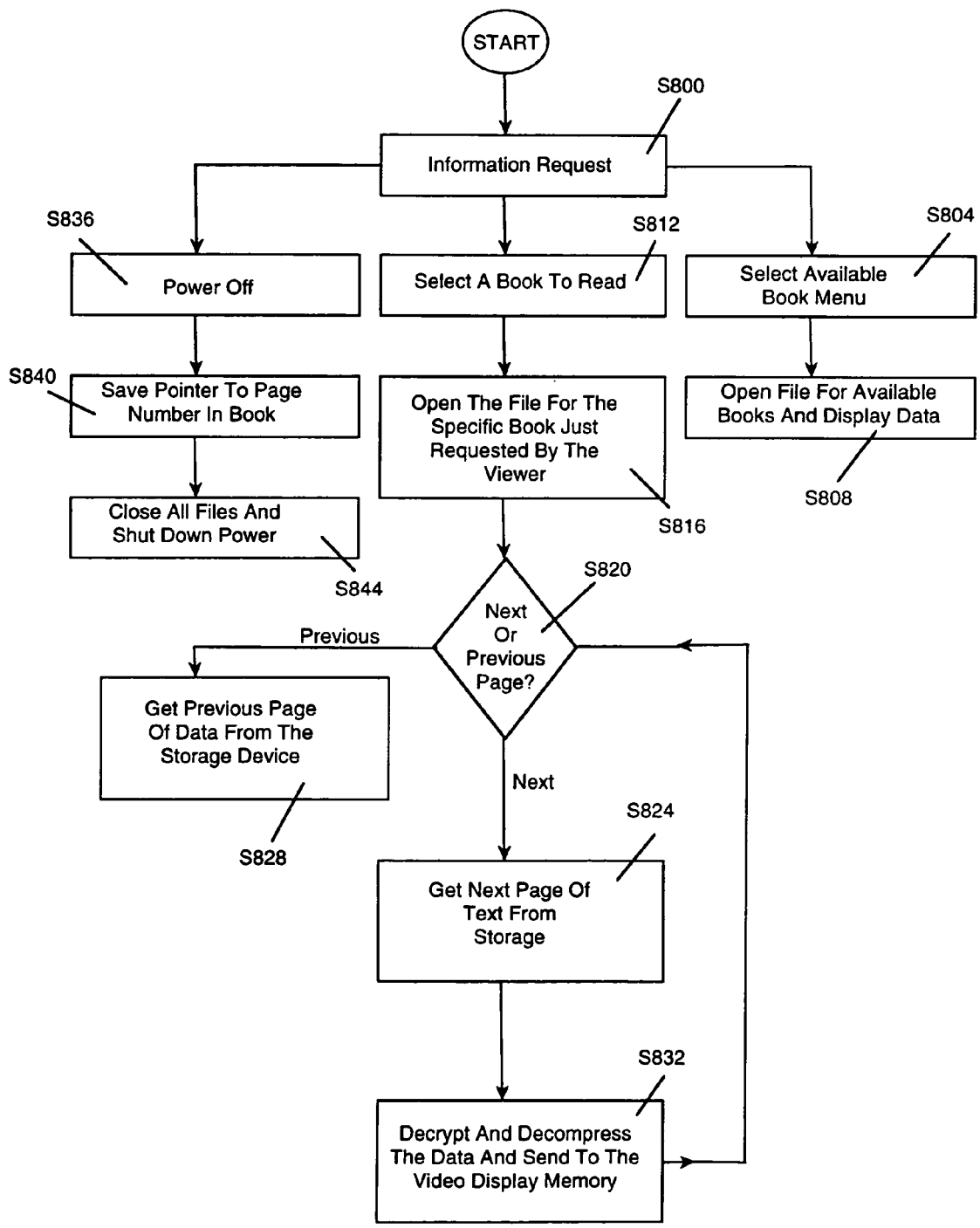
FIG. 12 is a flow diagram of processes performed by a viewer on an information request from a subscriber.

FIG. 12 is a flow diagram of some of the processes executed by the microprocessor 621 in the viewer 266. The viewer 266 may receive inputs from the subscriber through touch panel controls 740. In step S800, the subscriber's information requests are then processed by the microprocessor 621.

In step S804, if the subscriber requests a menu of available electronic books, the microprocessor 621 will select an electronic book menu. In step S808, the microprocessor 621 will open the electronic files that list the electronic books which are available (related to the category of topic of the menu) and display the menu with the names of the available electronic books.

If the subscriber selects a particular book to read, then in step S812, the microprocessor 621 will process the selection and determine the electronic file that contains the specific electronic book. In step S816, the microprocessor 621 will open the file for that specific electronic book and normally access the first page. (If a pointer has already been set in that books electronic file, the process may default to that page.) In step S820, the microprocessor 621 will then determine which page needs to be displayed. That is, the microprocessor 621 will determine whether a next page, previous page or a bookmarked page needs to be displayed. If the pointer for the electronic file is not in the correct location then in step S828, the microprocessor 621 will move the pointer and obtain the previous page of data from the stored file. Otherwise, in step S824, the microprocessor 621 will normally obtain the next page of text from the stored electronic file. In step S832, the microprocessor 621 decrypts the text data using one of the embodiments presented in Section VII, decompresses the text data and sends the data to the video display. The video display will generally have a video display memory associated with it. In step S832, the microprocessor 621 will send the data directly to that video display memory. The circuitry for the display then completes the process of displaying the page of text.

If the subscriber, through the controls 740, requests (from step S800) that the power be turned off, then in step S836, the microprocessor 621 initiates power off. In step S840, the microprocessor 621 saves the pointer in memory to the page number in the book that the viewer 266 is currently reading. In step S844, the microprocessor 621 closes all the electronic files and signals the power circuitry to shut down the power to the various circuits in the viewer 266. With these examples of basic processes the viewer 266 is able to display book selections and display text from those electronic books.

d. Menu System

Figure 13:
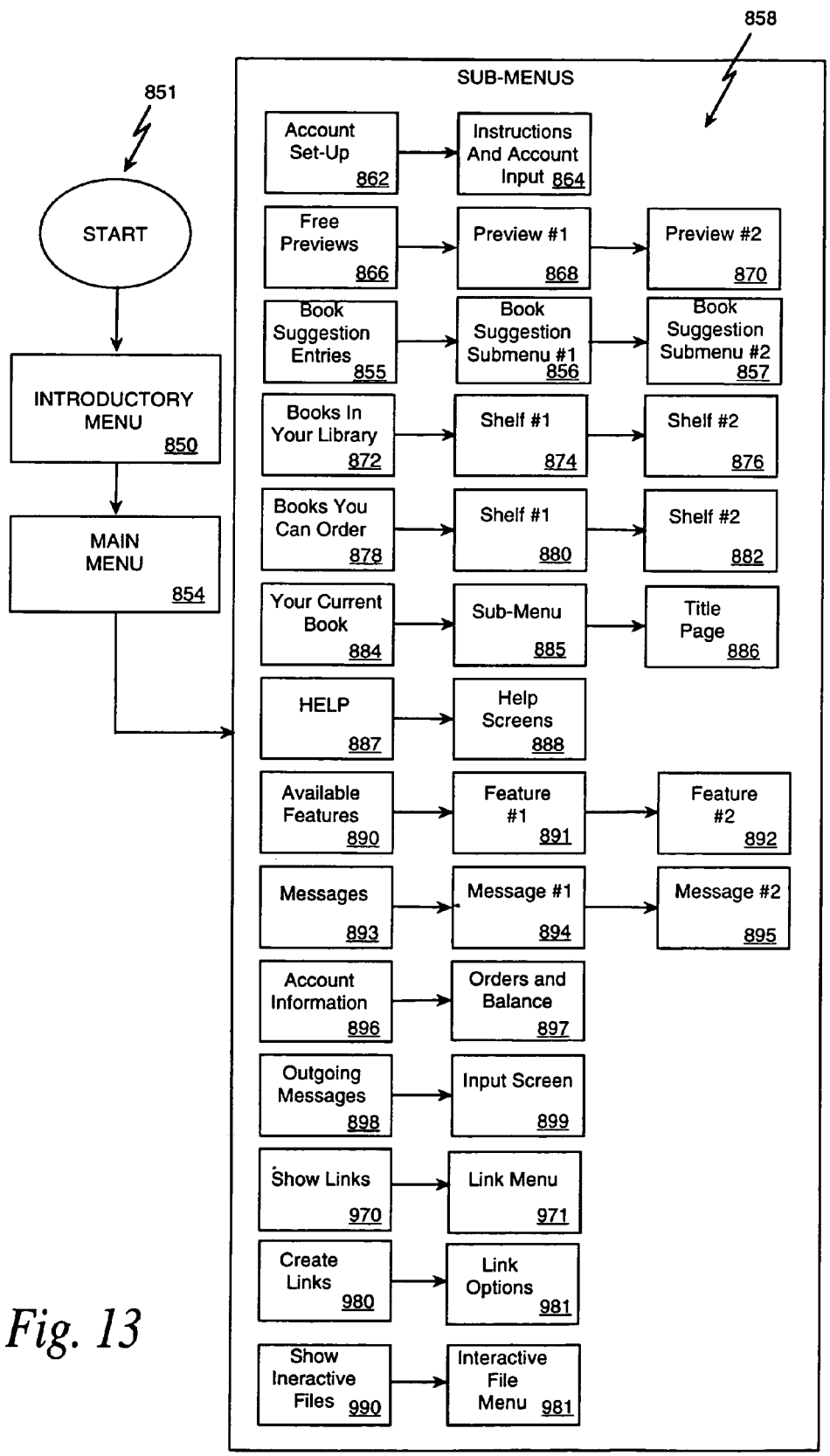
FIG. 13 is a chart depicting a menu structure and sequencing of menus in a menu system.

Referring generally to FIG. 13, the electronic book system 200 may have a menu system 851 for selecting features and books from the electronic book system 200. The operating software and memory required for the menu system 851 may be located at the viewer 266 (e.g., the instruction memory 732 and/or book memory 728). However, it can also be located at the library 262 (e.g., the instruction memory 632) or the library 262 and the viewer 266 can share the software and memory needed to operate the menu system 851. Since the menus are usually displayed on the viewer, and since the viewer 266 may be capable of operating in the absence of the library 262, the basic software and memory to create the menus is more conveniently located at the viewer 266.

The menu system 851 allows sequencing between menus and provides menu graphics for graphical displays such as on the LCD display 602 of the viewer 266. In an electronic book system that uses a set top converter these menus may also be displayed on a television screen. In an electronic book system that uses a computer, these menus may also be displayed on the computer monitor. In an embodiment, the menus provide just basic text information from which the subscriber makes choices. In other embodiments, the menus provide visual displays with graphics and icons to assist the subscriber and allow for subscriber interaction and real-time ordering of electronic books or other content available to the subscriber.

FIG. 13 depicts the menu system 851 with sequencing. The primary menus in the menu system 851 are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the user interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
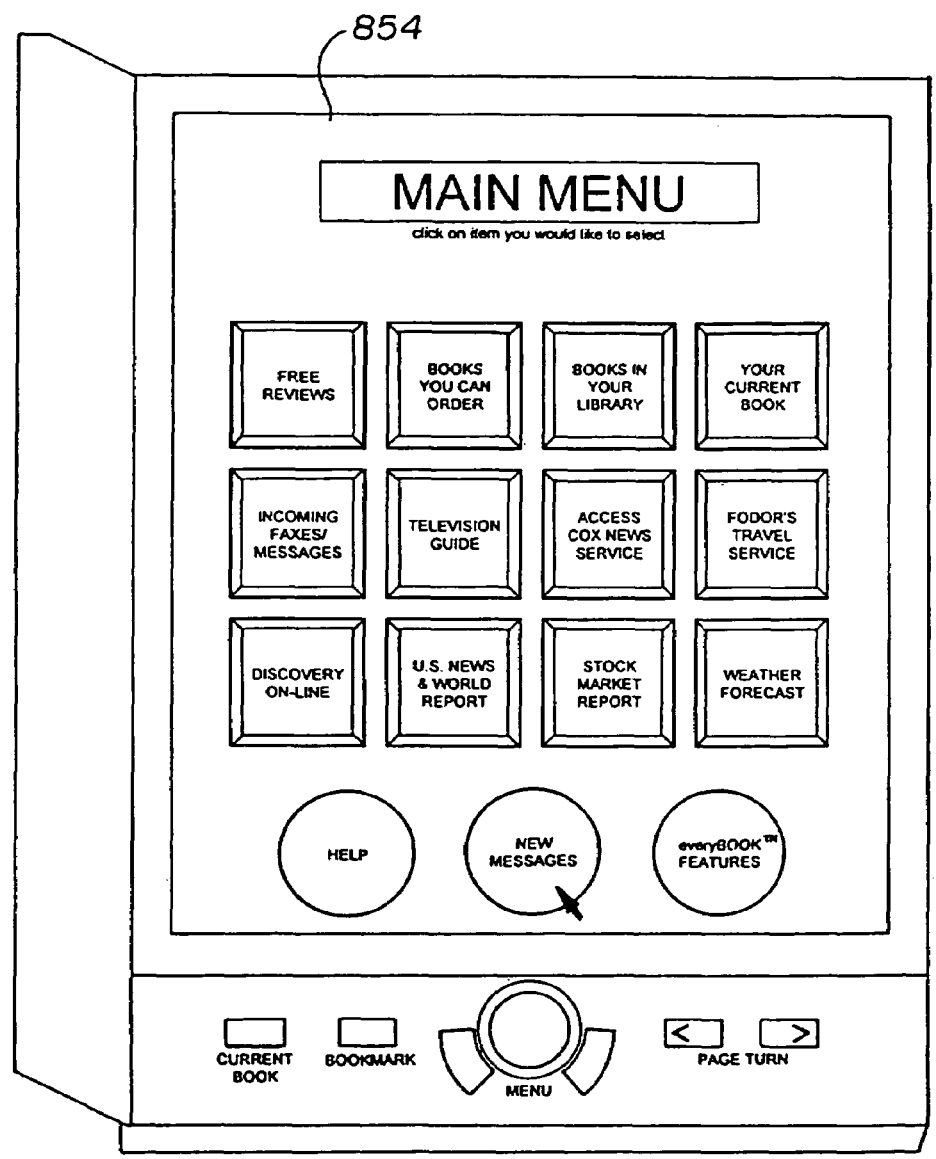
FIG. 14b is a schematic showing an example of a main menu.

An example of an introductory menu 850 is shown on FIG. 14a. Generally the introductory menu 850 introduces the viewer 266 to the system and provides initial guidance, announcements and instruction. The introductory menu 850 is followed by a main menu 854, an example of which is shown in FIG. 14b. The main menu provides the viewer 266 with the basic selection or features available in the system. FIG. 14b is an example of a main menu 854 offering many additional features and submenus 858 to the subscriber. For example, FIG. 14b shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
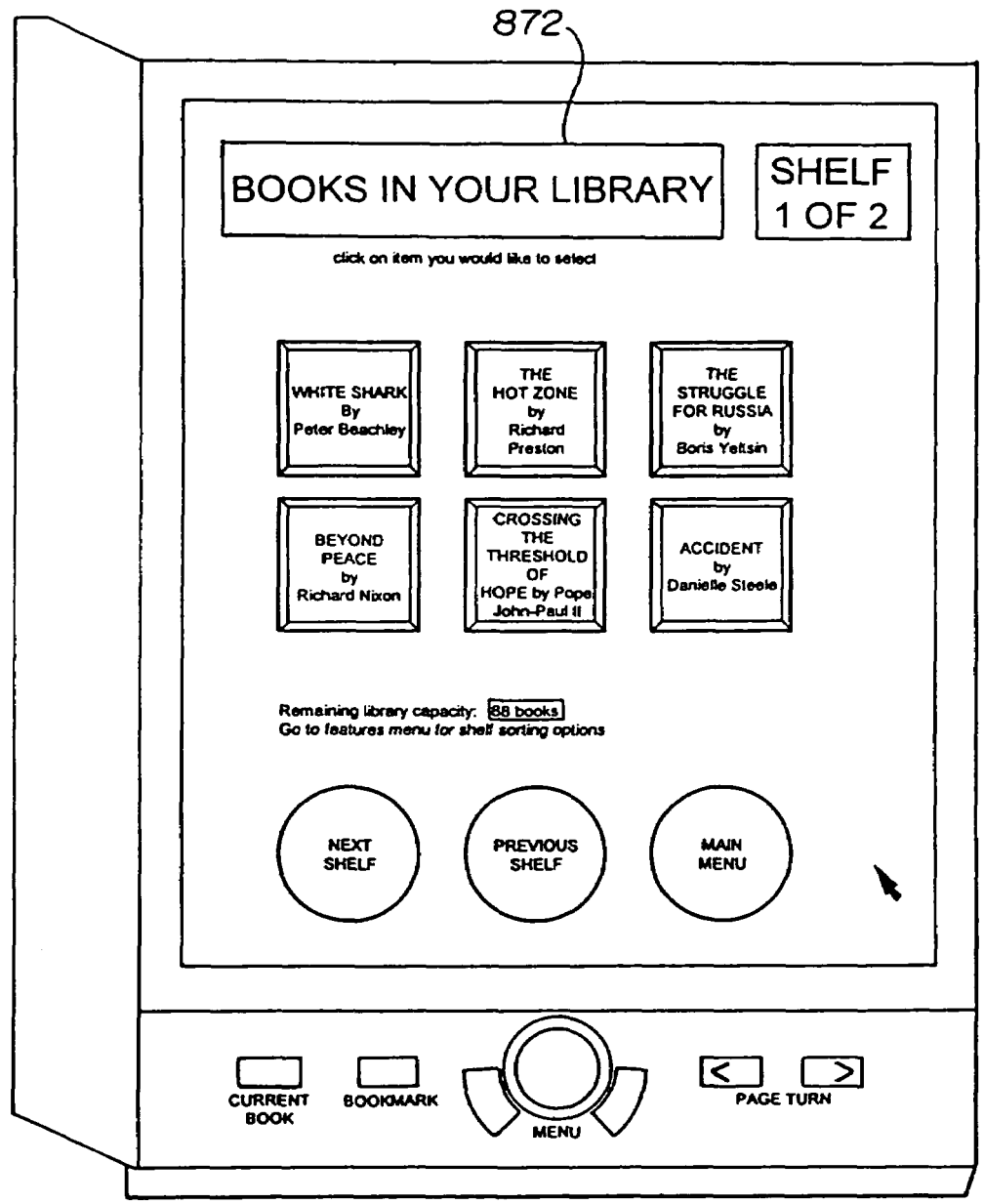
FIGS. 14c, 14d, 14e, 14f, 14g, 14h, 14i and 14j are schematics showing examples of submenus.
Figure 14D:
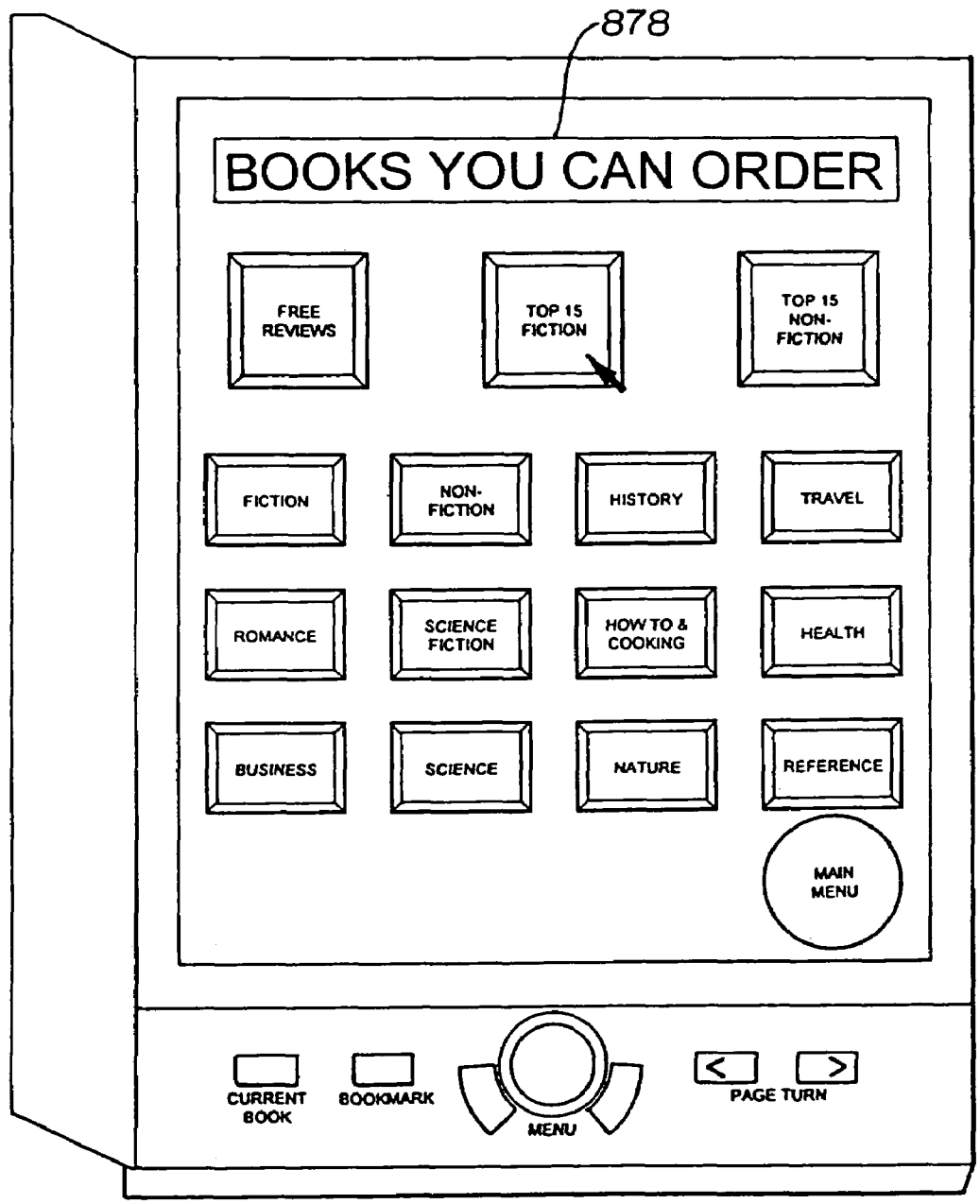
Figure 14E:
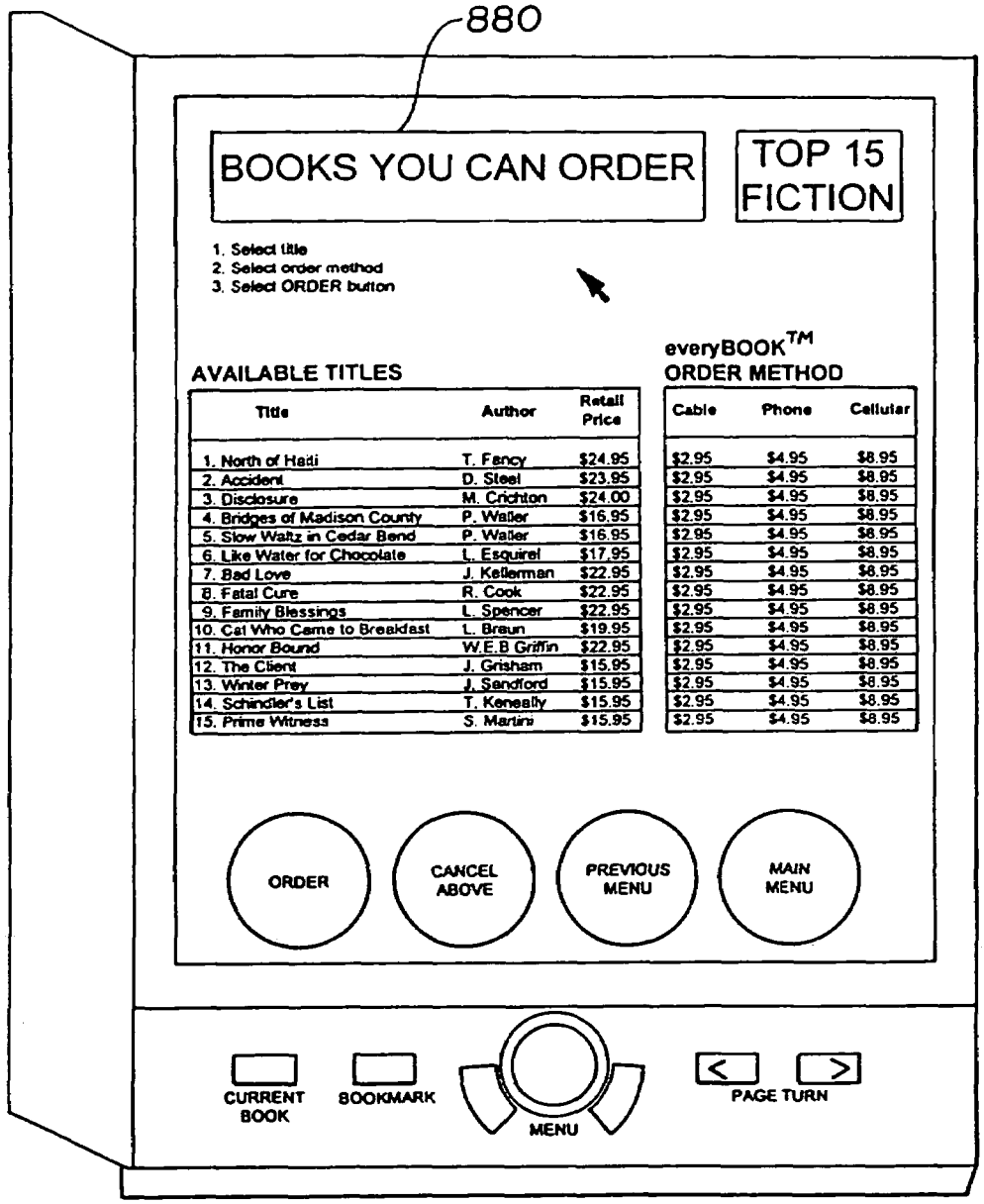

FIG. 13 shows fourteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links submenu 970, (13) create links submenu 980, and (14) show interactive files submenu 990. FIG. 14c is an example of a first level submenu for books in your library 872. This "Book In Your Library" example submenu 872 shows six available books by title and author and provides the subscriber with the ability to check a different shelf of books 874 or return to the main menu 854. FIGS. 14d and 14e show example submenus 858 for books that may be ordered using the "Books You Can Order" submenu 878.

Figure 14F:
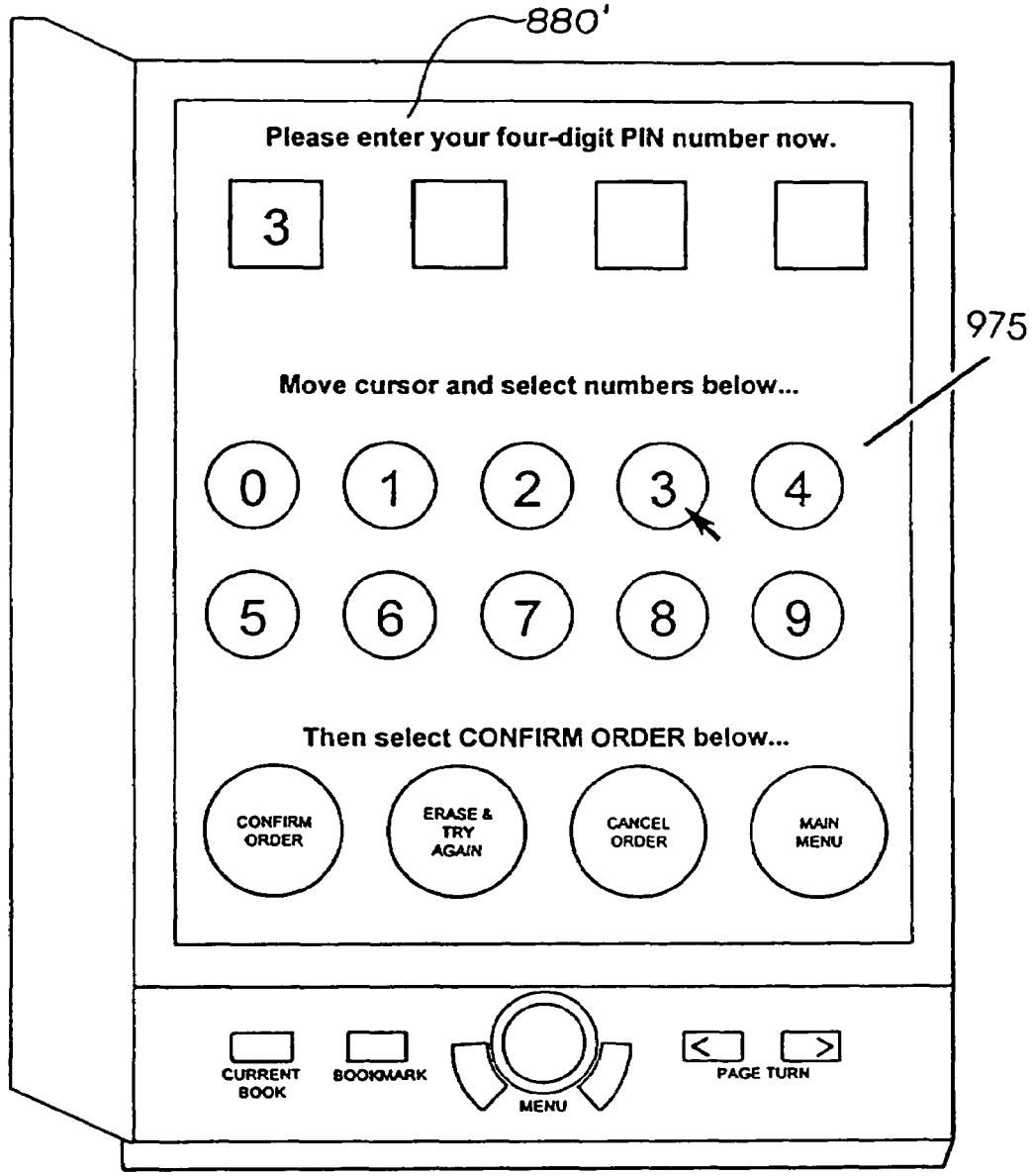

FIG. 14f is an example of a confirmation menu which confirms a subscribers order. In this particular example, the subscriber is required to enter a PIN number to complete the subscriber's order. Any alpha-numeric or similar password may be used to ensure the subscriber is an authorized subscriber. In one embodiment, the subscriber confirms an order with a PIN or password and then receives a final confirmation screen. The final confirmation screen is primarily text and may state:

Your book order is now being processed using CABLE.
Your book will be delivered overnight and your VISA account will be charged $2.95.
Your book will be available for reading at 6:00 AM EST tomorrow. Make sure that:
1. your Library Unit and Cable Connection Unit are plugged in with aerials up tonight; and
2. you tune your cable converter to THE BOOK Channel. The TV set does not have to remain on.

or similar language.

Figure 14G:
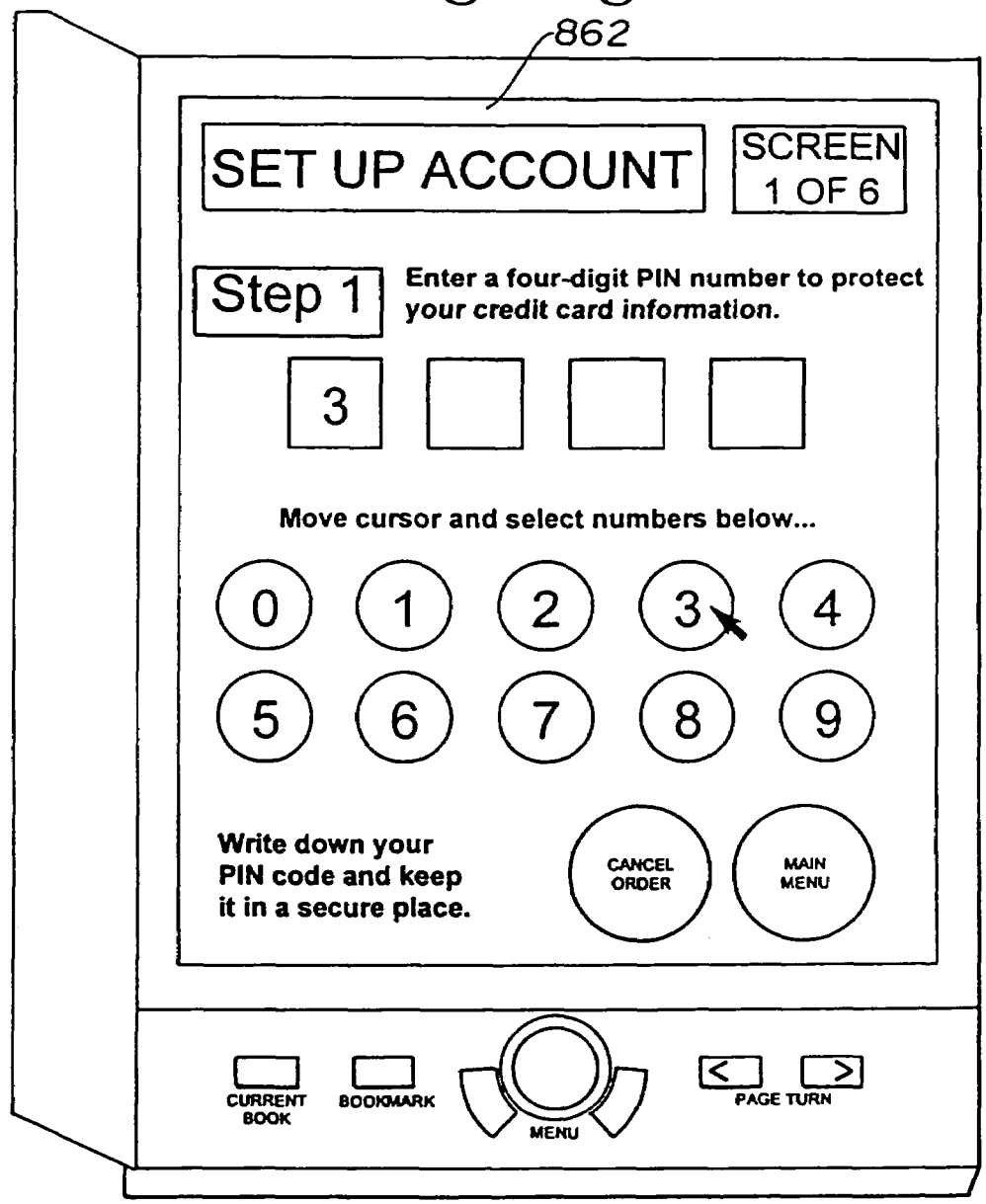
Figure 14H:
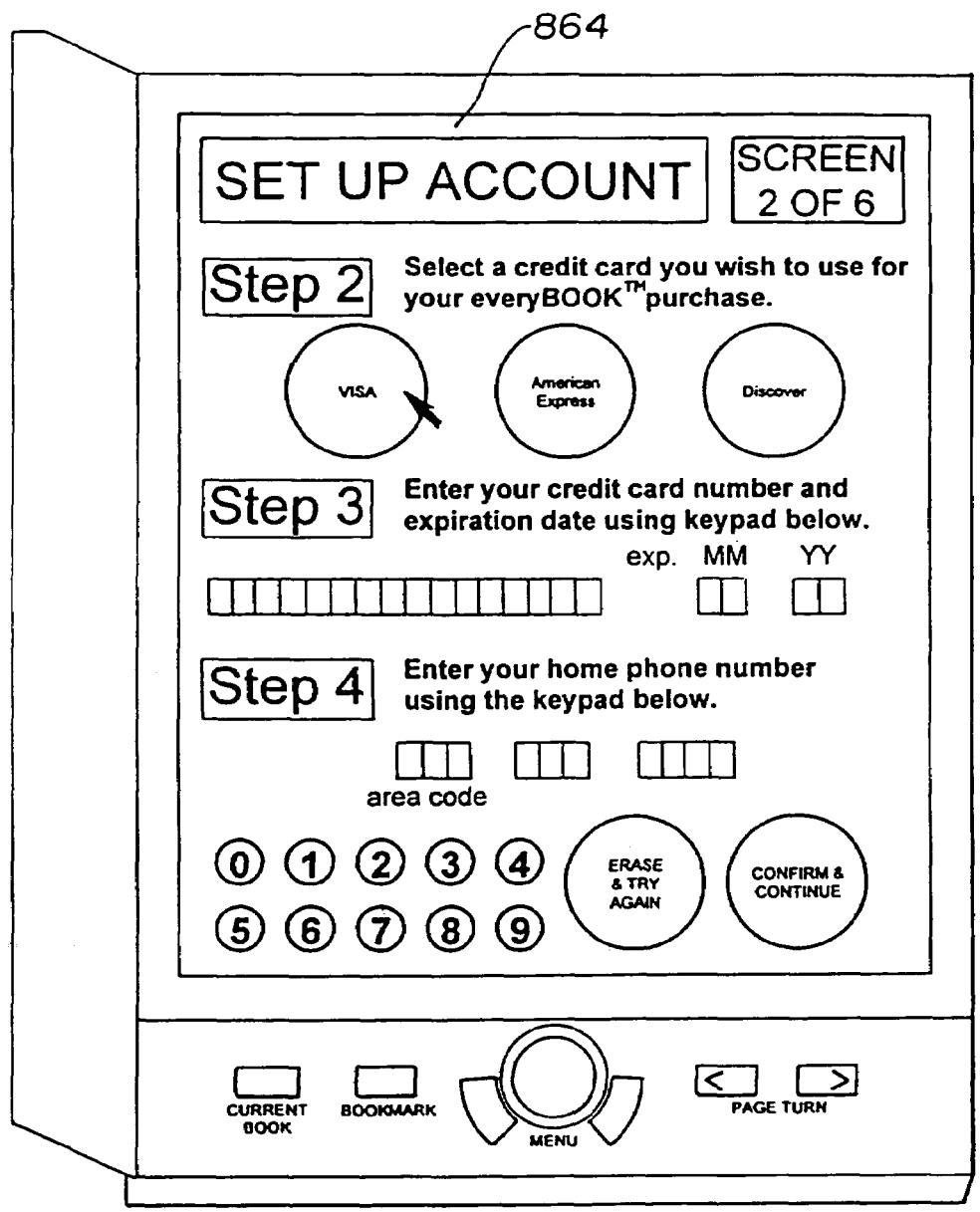

Examples of the "Account Set Up Menu" 862 and further submenus 858 related to account set up (which provide instructions and account input 864) are shown in FIG. 14g and FIG. 14h. These submenus 858 allow initialization of an account at the operations center 250 and orders to be charged to credit cards. The submenus 858 include the ability to enter data related to your desired PIN number or password, credit cards, phone numbers, etc. In one embodiment, the account set up is performed using the telephone system. A confirmation menu verifies that the account has been properly set up with the desired PIN or password and credit card. However, additional set-up methods are presented in the referenced related applications.

Figure 14I:
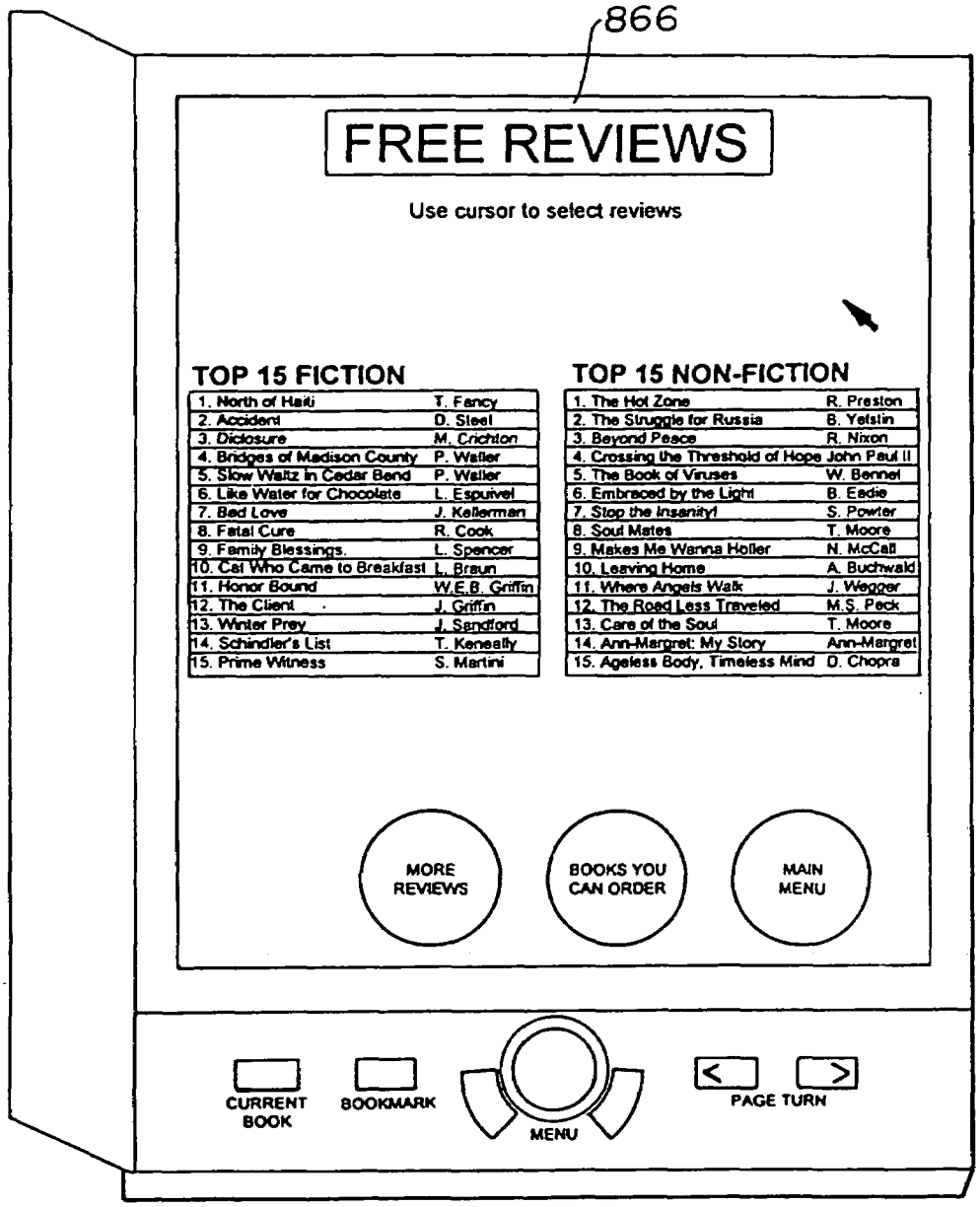
Figure 14J:
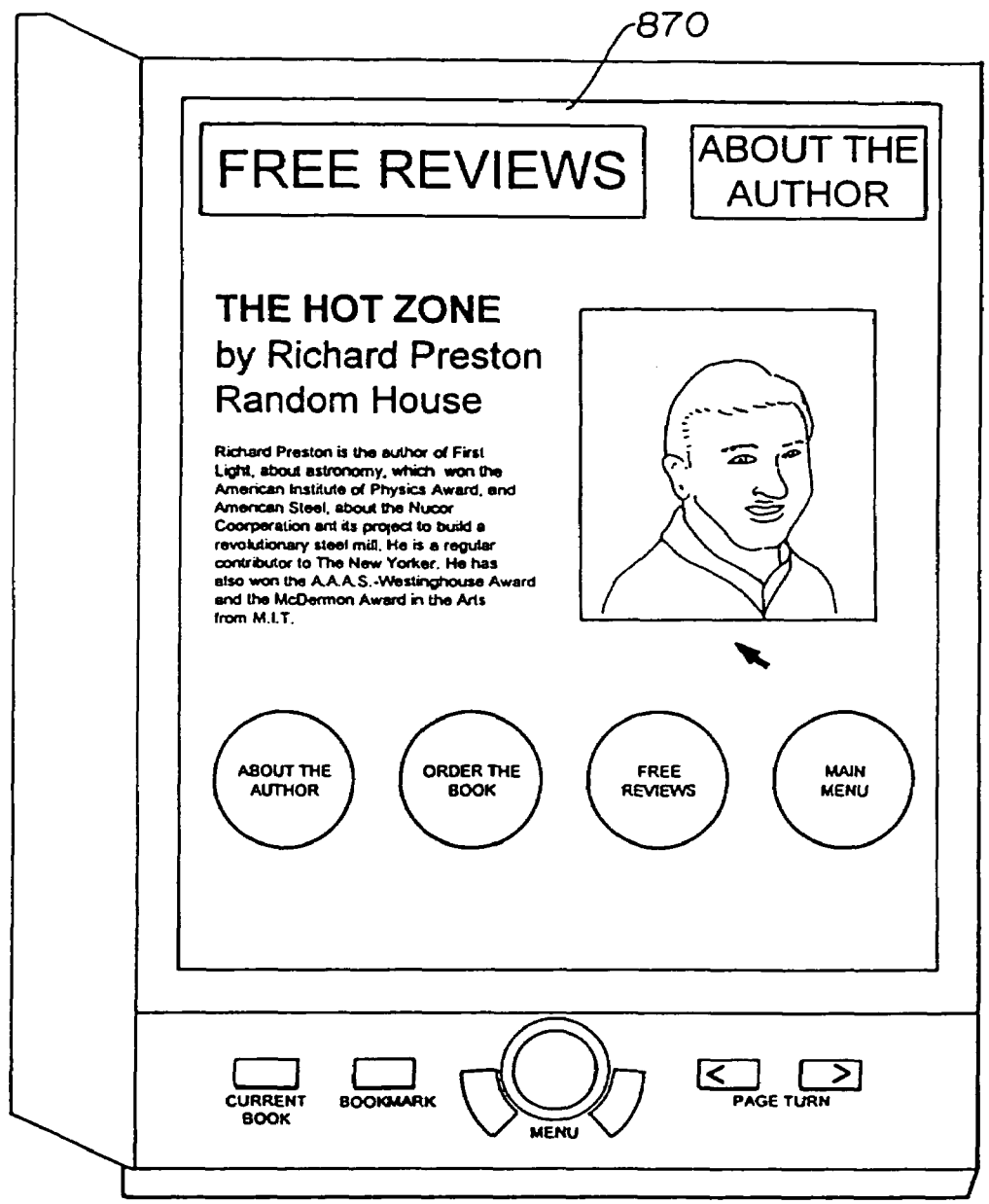

Free previews for books 866 are also provided by submenus (868, 870). Examples of the free preview menus are shown in FIG. 14i and FIG. 14j. FIG. 14i shows a menu depicting various books for which previews are available for viewing. Following a book selection, a screen submenu showing an excerpt of the selected book cover's description is provided along with an excerpt from a critic's review of the selected book. In one embodiment, this preview screen for a particular book also allows the subscriber to select a submenu, which provides information about the author. The book preview submenu may also include a still video picture or graphics portraying a book cover or a scene from the book. An example of such a still video picture or graphics is shown in FIG. 14j, which depicts a preview screen 870 about the author. The author's preview screen 870 shows a picture of the author, provides a short biography, and may allow the subscriber to order the author's books. The price for ordering the authors various books may also be shown on the menu.

In addition to free previews, in other embodiments, the electronic book system 200 provides the subscriber with a book suggestion feature (see 855). This is accomplished using the menu system 851 and the processor with associated memory located at the viewer 266, library 262 or at the distribution point (1020 or 250). When necessary, information for the book suggestion feature is sent in the text data of the signal to the home system 258. With this feature, books or authors are suggested to a subscriber based upon historical data of the subscriber's previous orders, demographics or mood of the subscriber, other indicators, and/or by text word searches.

In one book suggestion embodiment, text word searches of preview information (such as book cover descriptions, critics reviews and biographies about the author) and/or text of books or other titles are performed by the library 262 using databases stored in the library memory 600. Personalized book or author suggestions are made to the subscriber by obtaining information from the subscriber indicative of general subscriber interests. Subscriber entries may be solicited from the subscriber using the book suggestion entry submenu 855. The system uses these subscriber entries either directly or indirectly to search for books or authors to suggest to the subscriber.

Generally, the electronic book suggestion methods may be categorized into two categories, either responsive methods (which respond to a series of subscriber menu entries), or intelligent methods (which analyze data to suggest a book). Using a responsive or intelligent method, the system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the home system's 250 processor 404 and instruction memory 416 assign each title mood indicators (and sub-indicators) from a group such as light, serious, violent, short, long, dull, exciting, complex, easy-read, young theme, old theme, adventure, romance, drama, fiction, science-fiction, etc. These indicators are sent to the home system 258 with the text data and are stored in library memory 600. Based upon the subscriber entries, the processor associates a set of indicators with the subscriber's request and a set of books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the microprocessor 628 using instruction from a routine in instruction memory 632.

Intelligent methods of suggesting programs include analyzing personal profile data on the subscriber and/or historical data about the subscriber such as past books ordered by the subscriber (or buy data). This method may be performed at the distribution point or operations center 250 by the on-site processor 404 using subscriber databases stored in memory 428. The home system 258 receives the text data including program suggestion information from the distribution point or operations center 250 and generates the program suggestion submenus 855, 856, 857 using the same text data receiving 212 and viewer menu generation hardware (e.g., 607, 621) described above. Software routines and algorithms stored in instruction memories (e.g., 632, 732) are used to analyze historical data and book ordered data to determine a line of books to suggest to the subscriber.

The algorithms for this powerful feature of suggesting books or authors to subscribers is disclosed in great detail in U.S. Pat. No. 5,798,785, entitled TERMINAL FOR SUGGESTING PROGRAMS OFFERED ON A TELEVISION PROGRAM DELIVERY SYSTEM, filed Dec. 2, 1993, which is incorporated herein by reference.

Referring to FIG. 13, submenus 858 are shown on the "Books In Your Library" submenu 872 and may be broken into shelf numbers with submenus for each shelf 874, The submenus 858 for the "Books You Can Order" submenu 878 is similarly broken out into submenus by shelves 880, 882. These shelves may each be a category or genre of books. Books may be grouped into categories such as best sellers, novels, fiction, romance, etc. See FIG. 14*d*.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 may be broken out into a sequence of separate submenus for each feature 891, 892. Referring to FIG. 13, messages can also be sent with the electronic book selection and delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14*a* through FIG. 14*j*, many other variations and features are possible. When a book is finally selected for viewing the title page 886 will appear on the screen followed by a page of text.

III. The Billing and Collection System

In one embodiment, the billing and collection system 278 (shown in FIGS. 2 and 3) utilizes the latest technology in electronic transaction and telephone switching to track orders, authorize deliveries, bill consumers, and credit publishers automatically. The telephone calls initiated by the phone connector 270 are received by the billing and collection system 278 which responds immediately without human intervention by placing the order and charging the consumers credit card account. Data is compiled periodically and publishers 282 are credited for sales of their books or other text. The billing and collection system 278 may also connect with subscribers through two-way cable connections, cellular, or other communication means. These additional methods are detailed in the referenced related applications.

The billing and collection system 278 communicates with the operations center to track changes in available books and to provide statistical data to the operations center 250.

IV. Public Library, School, and Bookstore System

Figure 15:
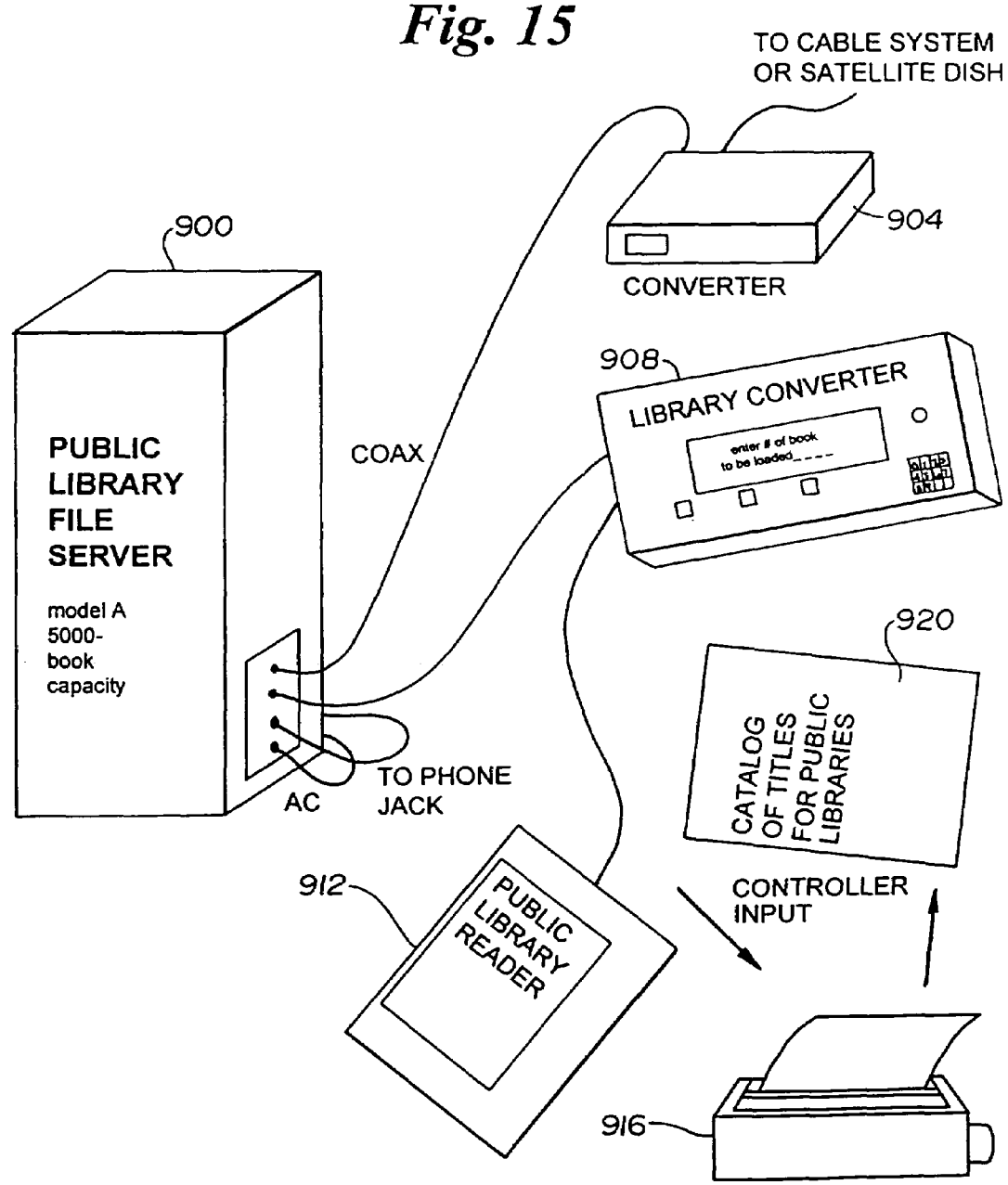
FIG. 15 is a schematic diagram of an electronic book system for a bookstore or public library.

The electronic book system can be modified to be used at public libraries, schools, bookstores, newsstands, or stand-alone kiosks. FIG. 15 shows one possible arrangement of components for the distribution location. The main unit is the file server 900. The file server 900 is a large electronic memory unit that can store thousands of books, newspapers, or periodicals. Various electronic storage means may be used in the file servers, such as hard disks, read-write CD ROMs and read-only CD ROMs.

The system comprises five components; the file server 900, a converter or video connector 904 or connector capable of interfacing to one of the alternative delivery systems presented in the referenced related applications, a controller 908, a viewer 912, and a catalog printer 916. The software for controlling the system is primarily located in the controller 908. The converter or video connector 904 is similar to those described above. In this configuration the controller unit 908 monitors the data being transferred to the file server 900 by the converter 904. The controller 908 may be provided with a viewing screen and several control buttons. When it is necessary to have a larger screen to perform more sophisticated controlling of the system a viewer 266 may be connected to the controller 908 and the viewer screen and controls 740 may be used.

For security reasons, the controller 908 is only able to download books to public viewers 912 which are authorized to receive books from the particular file server 900. Also for security reasons it is not desirable that the public viewer 912 have access to more than one file server 900. In this way, security can be maintained over the text data for books. The public viewer 912 may be limited to receiving one or two books at a time from the controller 908. When the user of the public viewer 912 needs a new or additional book, the user returns the viewer 912 to the school or public library where the user receives a new book from the controller 908. Additional security mechanisms associated with this kiosk-based distribution of electronic books are presented in Section VII.

In order to track the books that are available on the file server 900, the titles of the available books may be printed on a catalog printer 916. The catalog printer 916 is connected to the library controller 908 and the titles of the books are downloaded to the catalog printer 916. For security reasons, the coded text for any of the electronic books may not be authorized for printing using the controller 908 and catalog printer 916. In order to maintain security over the data, none of the electronic book data may be allowed to be downloaded to the printer 916. Once a complete printout of available book titles, magazines, or other textual material is complete, a hard copy of the catalog 920 can be maintained at the file server 900.

The system shown may also be used at bookstores. The bookstores can rent the public viewer 912 to customers with the text for one or two books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional books for viewing. Using this arrangement, it is also possible for the bookstore to (permanently) sell a viewer 912 to a regular customer. The customer then returns to the bookstore from time to time to receive textual data for a book which the customer can then store permanently on the customer's own viewer 912. Various other configurations are possible for bookstores, schools and public libraries using the file server 900 and public viewer 912 can be described.

V. Use of a Set Top Converter

Existing set top converter boxes such as those made by Scientific Atlanta or General Instruments are presently unequipped to handle the book selection system of the present invention. Although set top converters may be built which include the library functions, hardware modifications are necessary in order to use the book selection system with existing set top converter technology.

Figure 16A:
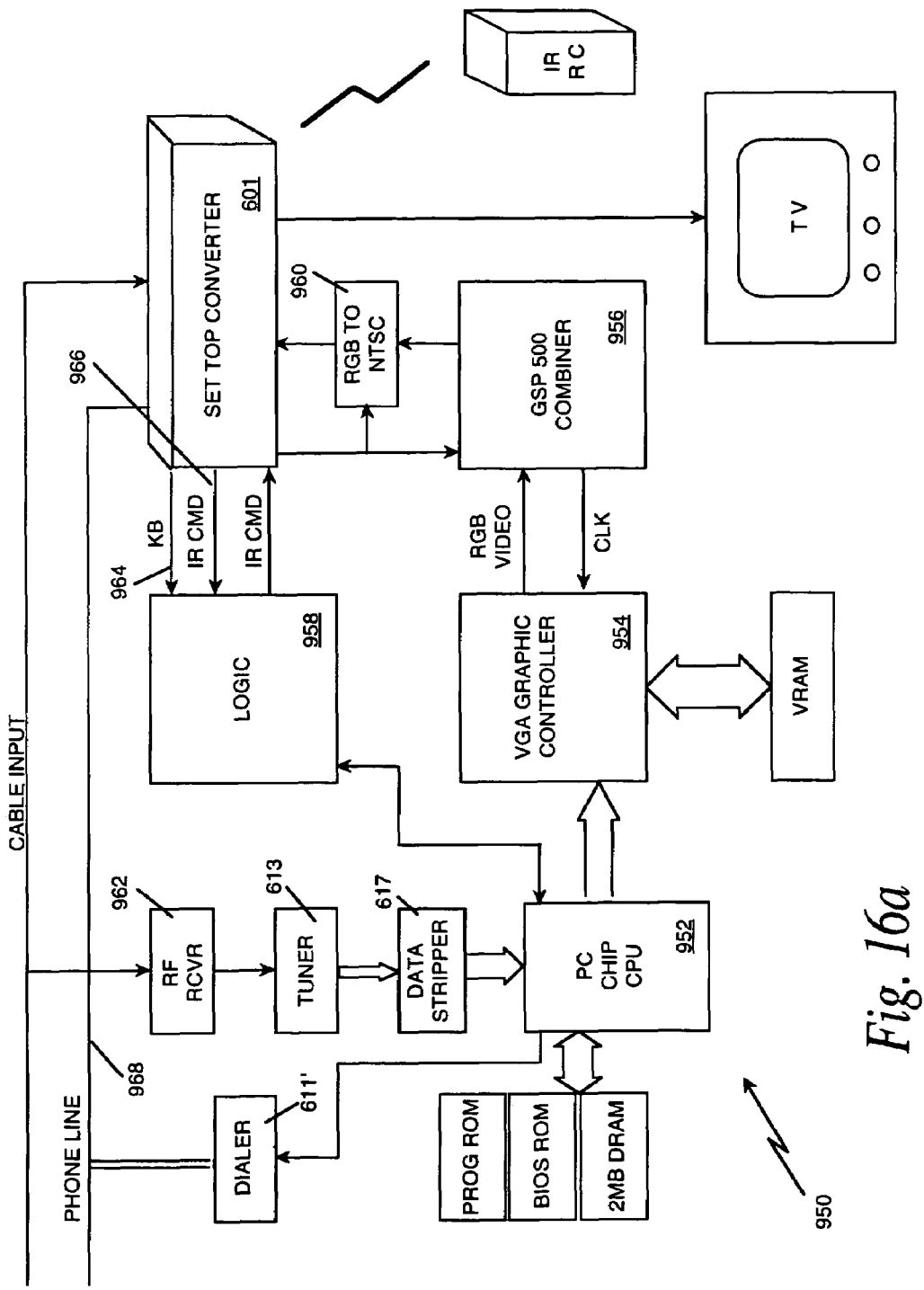
FIG. 16a and FIG. 16b are schematics of hardware modifications or upgrades to a set top converter.
Figure 16B:
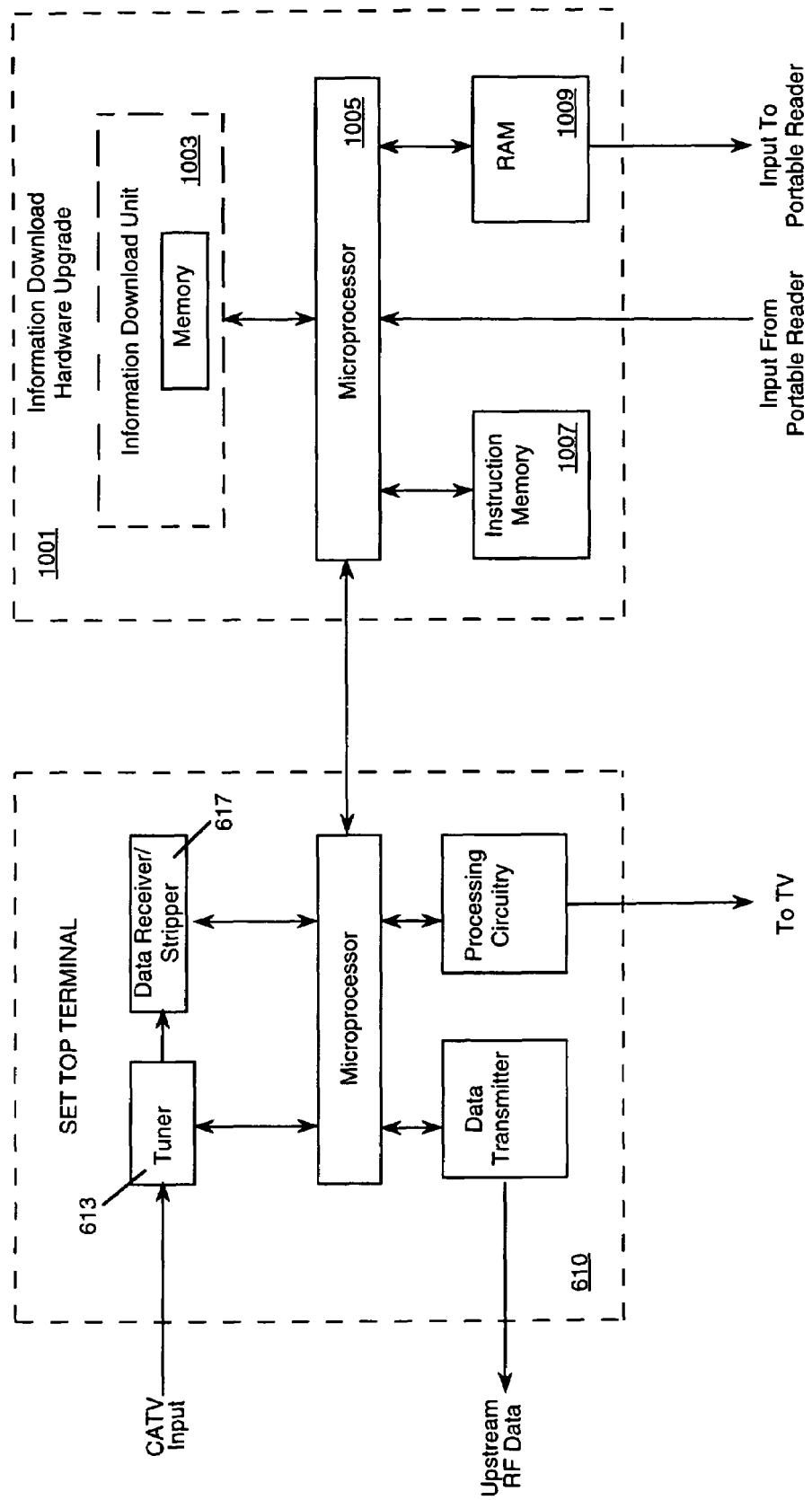

FIGS. 16*a* and 16*b* are examples of hardware modifications or upgrades. A port is used to attach hardware upgrades described below to a set top terminal. Two upgrades are possible to set top converters 601 to assist in receiving and selecting electronic books, a menu generation card upgrade (FIG. 16*a*) and an information download unit (FIG. 16*b*). Each of these upgrades may be connected to the set top terminal unit through an upgrade port. A four wire cable, ribbon cable, FireWire (IEEE 1394B) interface connector, USB connector, or the like may be used to connect the upgrade to the set top converter 601.

A card addition 950 to a set top converter 601 is depicted in FIG. 16*a*. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the subscriber to select a book using either the television or a viewer 266. The card 950 also provides a method for a remote location, such as the cable headend, to receive information on books ordered. The books ordered information and control commands may be passed from the cable headend to the card 950 using telephone lines or alternative ordering methods as presented in the referenced related applications.

The primary components of the card 950 are a PC chip CPU 952, a VGA graphic controller 954, a video combiner 956, logic circuitry 958, NTSC encoder 960, a receiver 962, demodulator (not shown), and a connector 611', which consists of a dialer. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 266 on the remote control are received by the set top converter's 601 IR equipment and passed through to the card 950. The card 950 interprets the IR signal and determines the book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit electronic books ordered information to the cable headend. It is also possible to receive the electronic books over the telephone lines and other telecommunications networks, including wireless networks, and by-pass the video distribution system.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In one embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

An information download hardware upgrade 1001 shown in FIG. 16*b* allows the subscriber to download large volumes of information from the operations center 250 or cable headend using a set top terminal 610. The hardware upgrade 1001 will enable subscribers to download data, such as electronic books and electronic magazines, to local secure storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16*b*). A small portable viewer may also provided with the upgrade 1001 to enable downloaded text to be read without the use of a television.

The downloadable information may be text or graphics supplied by the operations center 250 or cable headend. With the upgrade 1001, electronic books may be downloaded and read anywhere with the viewer 266. Using the upgrade 1001, electronic books may be downloaded and stored in compressed form for later decompression. The electronic books may be decompressed only at the time of viewing. Important text that the public desires immediate access may made available through this system. Text such as the President's speech, a new law, or a recent abortion decision rendered by the Supreme Court may be made immediately available.

Figure 17:
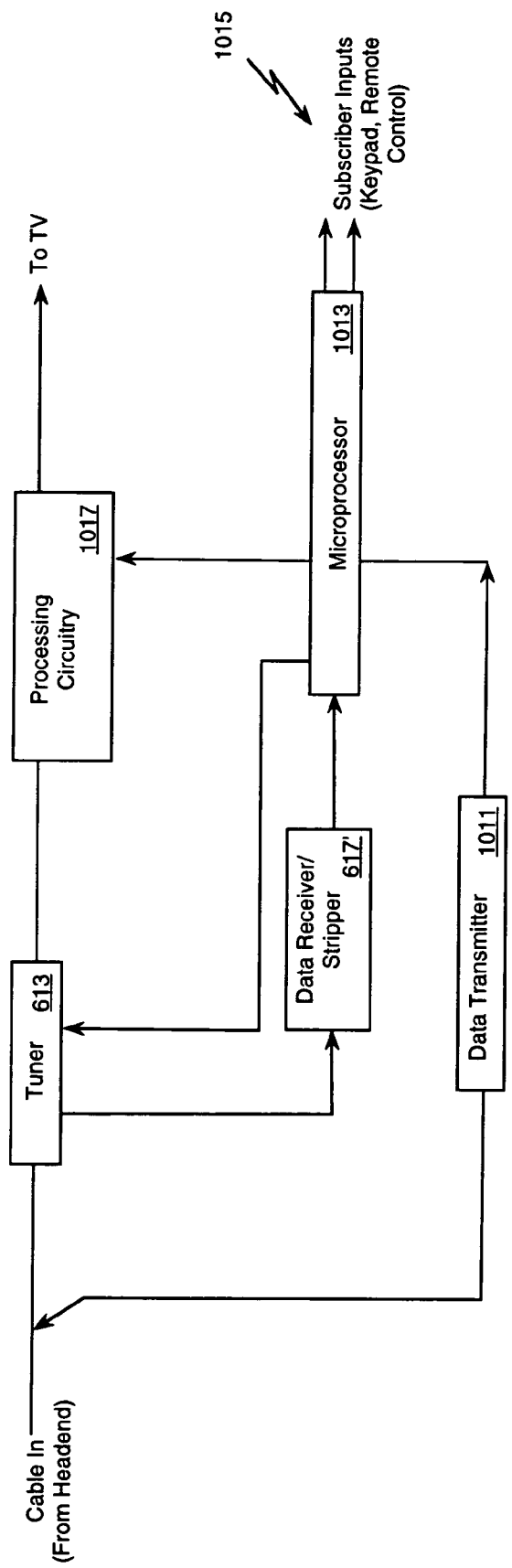
FIG. 17 is a schematic showing a set top terminal that includes a data receiver and data transmitter.

In one embodiment, electronic book ordering information is stored at each set top terminal 610 until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used. FIG. 17 shows components of a set top terminal 610'. The components include a data receiver 617' and a data transmitter 1011. The data transmitter provides upstream data communications capability between the set top terminal 610' and the cable headend. Upstream data transmissions are accomplished using the polling system described and, using a data transmitter 1011. Both receiver 617' and transmitter 1011 may be built into the set top terminal 610' itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 1013, which receives inputs 1015, from the subscriber, either through a set top terminal's keypad, a remote control unit or viewer 266. Generally, all cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or 4 TV carrier.

Data targeted to individual set top terminals is received by the data receiver 617' according to each set top terminal's specific address or ID. In this way, each addressable set top terminal 610' only receives its own data. The data receiver 617' may receive set top terminal 610' specific data in the information field of the signal frame described or on a separate data carrier located at a convenient frequency in the incoming spectrum. The received data includes information regarding electronic books and menus available for selection. The subscriber may enter a series of commands 1015 using a keypad or remote control in order to choose an electronic book or menu. Upon receipt of such commands, the set top terminal's microprocessor 1013 instructs the tuner to tune to the proper frequency of the channel carrying data and subsequently instructs the processing circuitry 1017 to begin descrambling of this data.

Upon selection of an electronic book, the microprocessor 1013 stores any selection information in local memory (not shown) for later data transmission back to the cable headend. The set top terminal's microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-On-Demand System

Figure 18A:
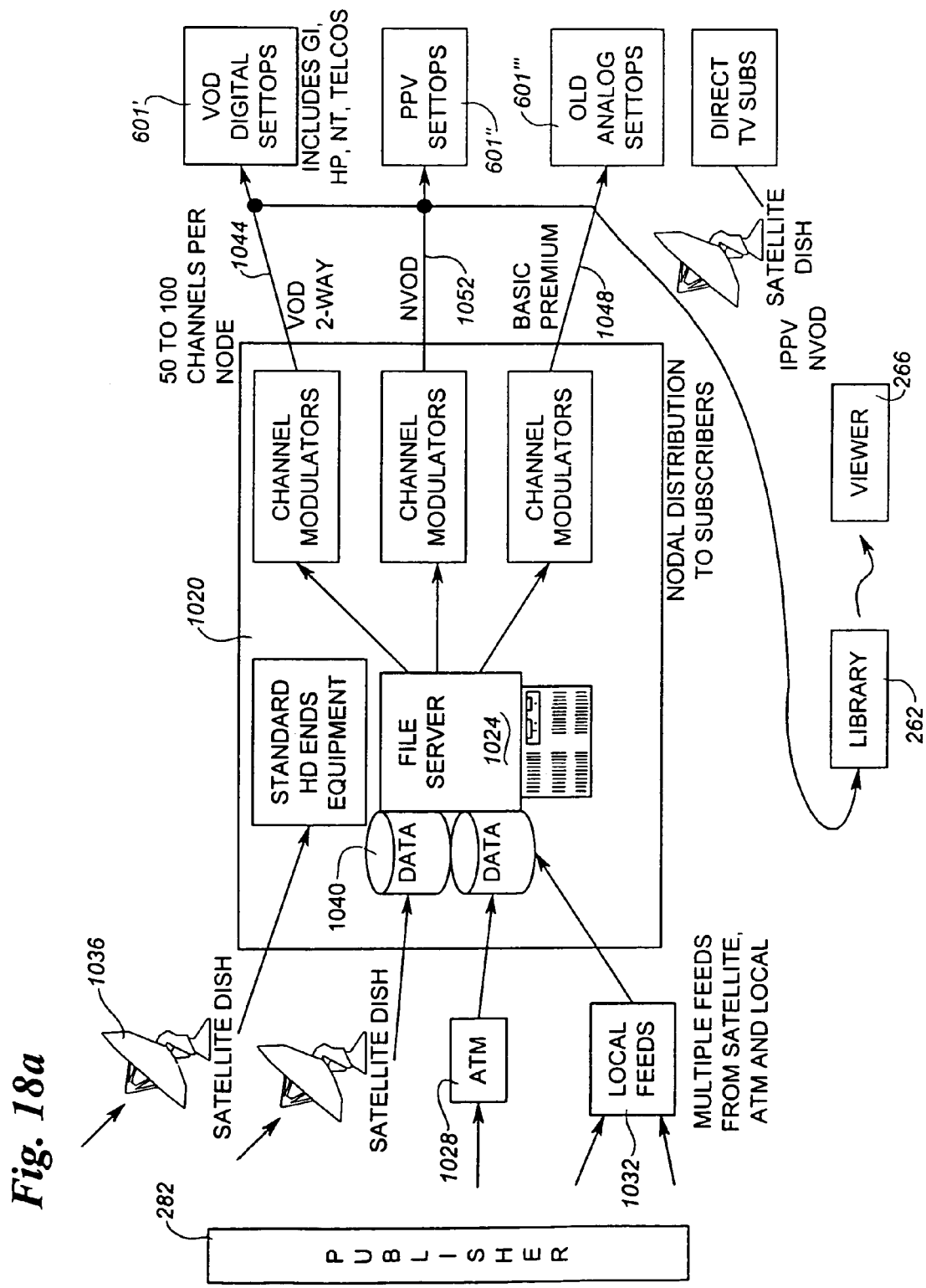
FIG. 18a is a schematic of a book-on-demand system.

The electronic book system 200 described may also be configured in a book-on-demand style. FIG. 18a shows one example of a configuration for a book-on-demand system. A book on demand system requires more powerful two-way communications between the consumer's home, bookstore, school or public library and either the operations center 250 or a distribution site 1020 such as the cable headend. In one embodiment, this type of two-way communication can be provided by the hardware shown in FIG. 17 and described above. Additional methods related to alternative communication paths are presented in the referenced related applications.

Referring to FIG. 18a, in a book-on-demand system, the subscriber selects the book to be download from an available menu of books (see for example FIGS. 14d and 14e). The data for menus of available books is usually sent to the subscriber location by the distribution site 1020. After the subscriber's menu selection, information about the subscriber selection (or request) is then communicated to either a distribution point 1020 (such as a cable headend) or the operations center 250. Upon receipt of this request, the needed textual and graphical information for the book is spooled and sent to the subscriber. In this manner, electronic books are only sent when requested by the subscriber and are sent immediately upon demand for the electronic book (or text).

In order to support such a demand system, the text delivery and distribution must be conducted on a strong nodal architecture distribution system, such as, a video-on-demand cable or telephone television system, through use of individual telephone calls on the public telephone system or cellular phone system, through the use of the Internet, or a number of other data network options.

The book-on-demand system allows for a greater selection of electronic books to the subscriber and limits the amount of communicated book data that is unnecessary or unneeded. It also provides the electronic book to the subscriber in a much timelier fashion.

In addition to a stronger distribution system, a book-on-demand system requires a distribution point 1020 to have more sophisticated equipment to access and "spool out" the textual information. This can be accomplished using file server technology 1024 for storing the books and distribution technology such as ATM 1028 or telephone-type switching (not shown) to distribute the textual information. The file server 1024 and distribution technology that can be used in configuring such a book-on-demand system is described in U.S. Pat. No. 5,262,875 and U.S. Pat. No. 5,218,695, cited above.

FIG. 18a shows an embodiment for a book-on-demand system that utilizes file server technology. In addition to books, the embodiment of FIG. 18a will support distribution of nearly any digital data. Books or textual files are received from publishers 282 and other sources through local feeds 1032, ATM 1028, or by satellite dish 1036, for example. The data is then stored in memory 1040 at the file server 1024. In one embodiment, the distribution point 1020 is a cable headend that receives requests from subscribers and delivers text to subscribers over a two-way communication system (such as a video-on-demand system (VOD) 1044).

The library 262 can be connected to either a basic premium-type service cable system 1048, a near video-on-demand type cable system (or pay-per-view (PPV) 1052) or a video-on-demand cable system 1044. In connecting with either of these three systems the library 262 may access the cable directly or may access the system through a set top terminal 601', 601", or 601'''.

Using the two-way video-on-demand system 1044, a subscriber is able to request a specific book title and receive that text immediately following its request. To accomplish this, the distribution point 1020 transmits a list of available books through the cable delivery system to the library 262. The library 262 displays the list of available books on a menu or similar format. As described earlier, the library 262 may use menus which list categories of available books to form its request from the distribution point 1020. After selecting a book the library 262 then sends a request signal on the two-way communication system 1044 back to the distribution point 1020. This request signal can be handled in two ways. The library 262 either initiates the request or the distribution point 1020 polls the various libraries on to the two-way system 1044. Upon receiving the request for the book title, the text associated with that book title is transmitted to the library 262 using the two-way cable system 1044.

Figure 18B:
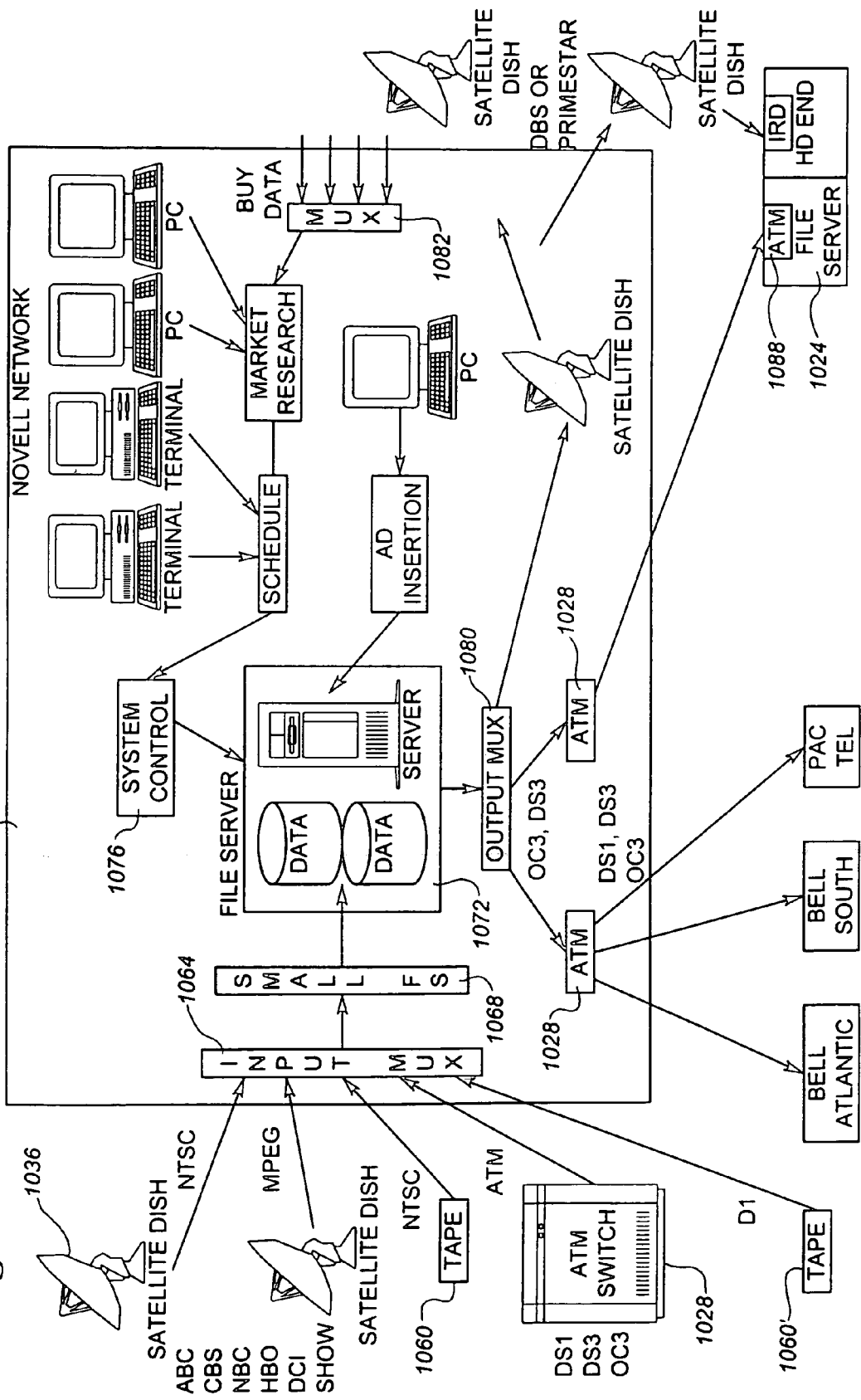
FIG. 18b is a schematic of an operations center supporting a book-on-demand system.

FIG. 18b is an expanded view of an operations center 250 that supports a regional or national book-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as books received from publishers 282 is then stored on the master file server 1072. The digital data may be stored compressed in a standard format such as MPEG2.

A system controller 1076 provides control over the regional or national book-on-demand system. Books may be packaged into groups to provide feeds to various cable headends. In addition, scheduling and marketing research are conducted at the operations center 250. In order to handle the scheduling and market research, book buy data is received at the operations center 250 through a multiplexer 1082. Book buy information can be provided by the operations center 250 to the billing and collection system 278.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In one embodiment, cable headends receive text data on books from the master file server 1080 through the output multiplexer 1028 and an ATM system 1028. After receiving the digital book data, the cable headends store the books in a local file server 1024. FIG. 18a's distribution point 1020 is an example of a cable headend which may receive data from the operations center 250 of FIG. 18b through an ATM hookup 1088 or satellite hookup. All communications and storage in the Book on Demand system may make use of the security mechanisms presented in Section VII.

VII. Electronic Book Security Mechanisms

The electronic book distribution system and components may incorporate various forms of security using cryptographic mechanisms. Cryptography consists of an encryption and reversing decryption process. A basic encryption process operates on a string of digital bits, or clear text, by modifying the clear text using a series of mathematical operations with both the clear text and a second string of bits, called an encryption key, as inputs, resulting in a third string of bits, called ciphertext. A reversing process exists using a fourth string of bits, called a decryption key, that, when input into a decryption process consisting of a second series of mathematical operations, along with the ciphertext, the resulting output is the original clear text string of digital bits.

Figure 19A:
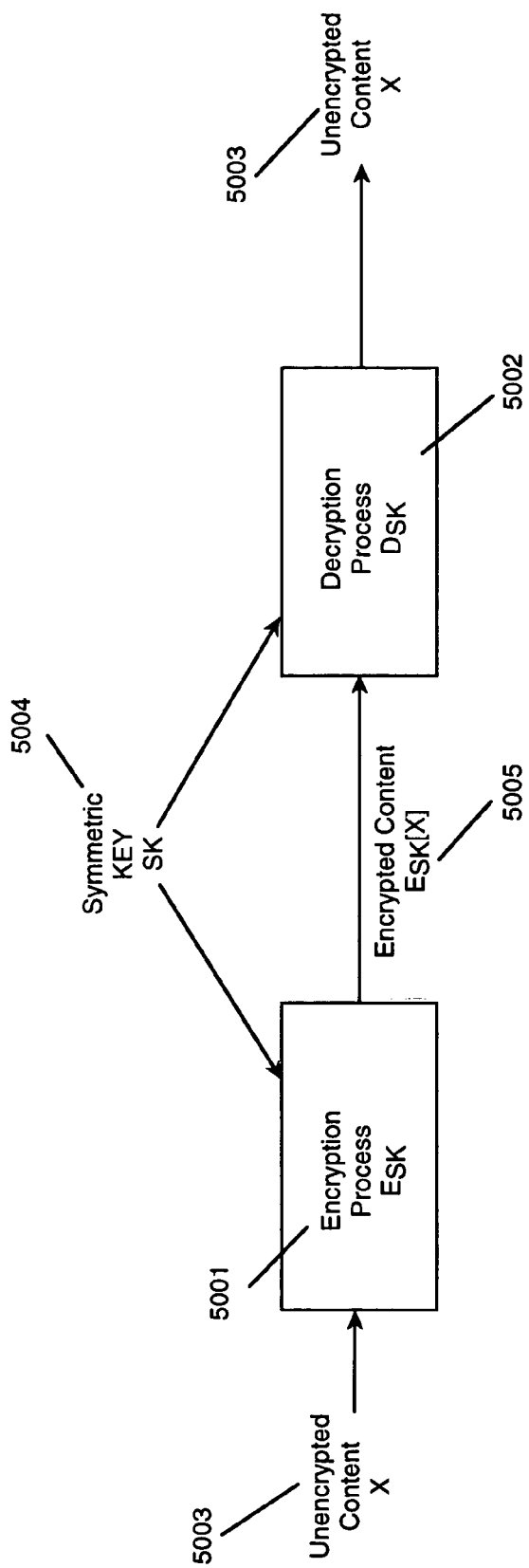
FIG. 19a is a diagram of symmetric key encryption.

Two types of techniques underlie the majority of encryption mechanisms associated with electronic book security: symmetric encryption and asymmetric public key encryption. Referring to FIG. 19a, symmetric encryption uses a cryptographic algorithm where the same key used by encryption process 5001 to encrypt data is also used by decryption process 5002 to decrypt data. Henceforth, for uses of symmetric key encryption, encryption of unencrypted content X 5003, using symmetric key SK 5004 is represented as $E_{SK}[X]$ 5005, whereas decryption of encrypted content $E_{SK}[X]$ 5005 using symmetric key SK 5004, is represented as $D_{SK}[E_{SK}[X]]$ and results in unencrypted content X 5003.

Figure 19B:
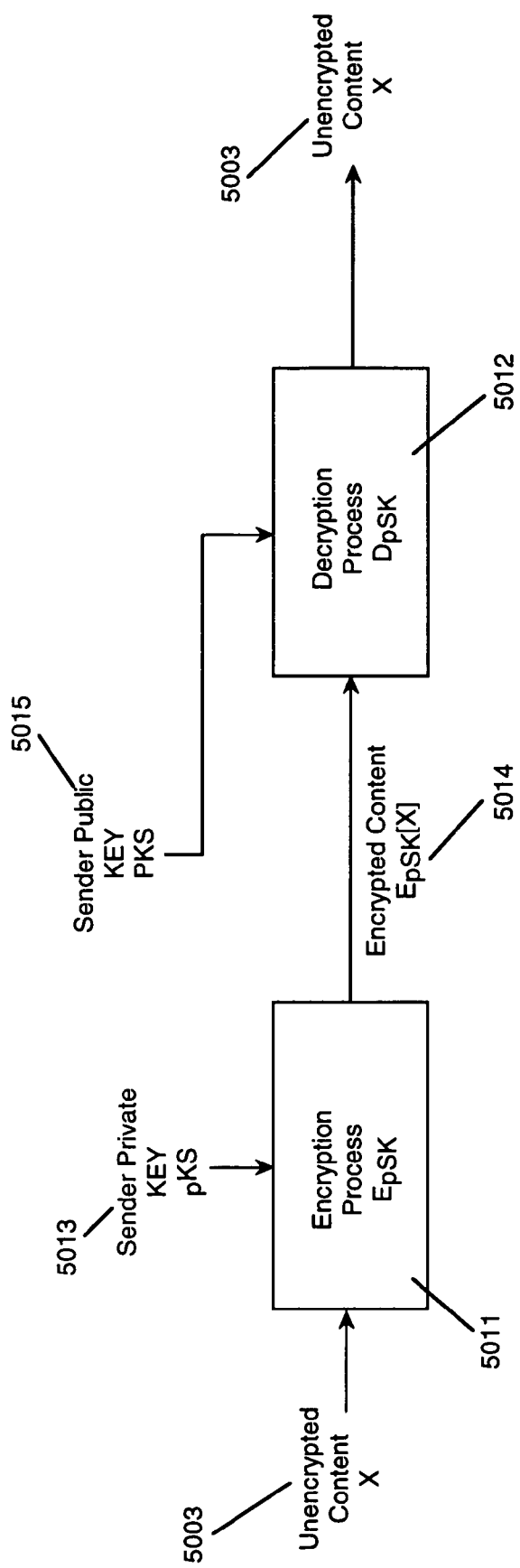
FIG. 19b is a diagram depicting asymmetric encryption using a private key.
Figure 19C:
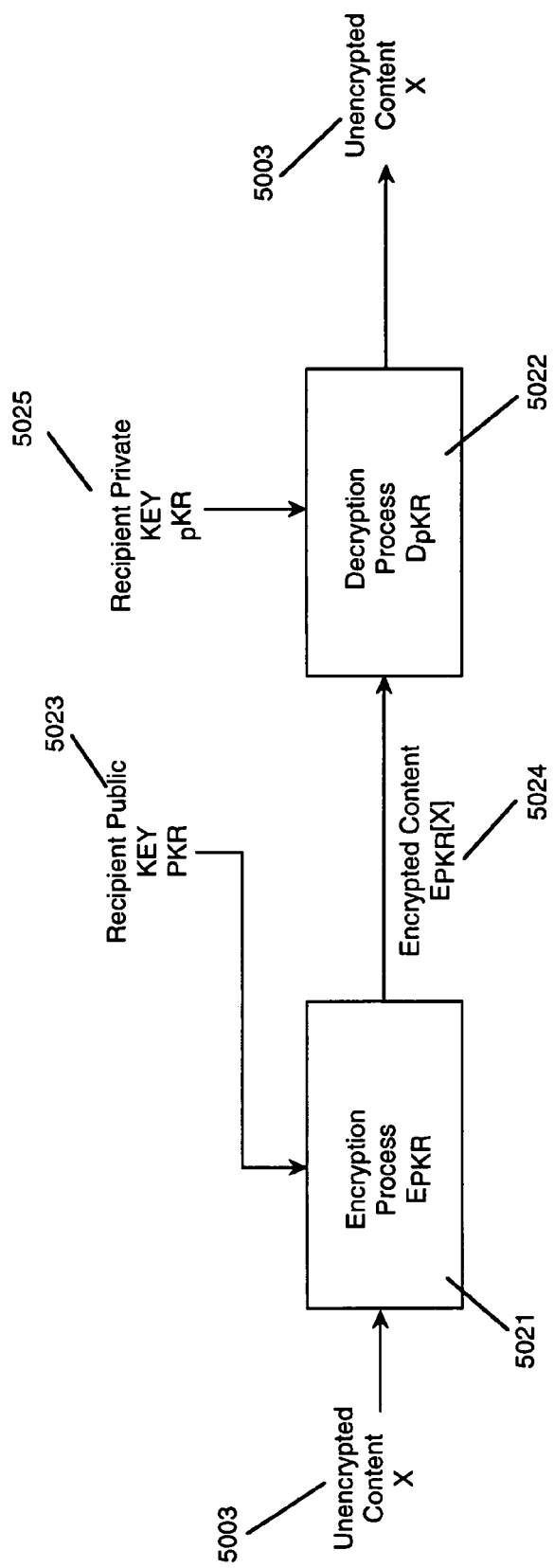
FIG. 19c is a diagram depicting asymmetric encryption using a public key.

Asymmetric public key encryption is a cryptographic system using two keys, one key to encrypt content, and a different key to decrypt the same content. These key pairs and the associated cryptographic algorithms are constructed such that knowledge of one of the two keys does not reveal the other key. Additionally, in asymmetric public key encryption, content encrypted using one key cannot be decrypted using the same key. Therefore, one of the keys of the key pair, the public key, can be distributed widely, while the other key of the key pair is held closely and protected, the private key. This allows a first party, or a sender S to encrypt content using the sender's private key, pKS 5013 and encryption process $E_{pKS}$ 5011. The sender can then distribute the resulting encrypted content $E_{pKS}[X]$ 5014 to any second party, or recipient that possesses the sender's public key PKS 5015. The recipient can then decrypt the encrypted content $E_{pKS}[X]$ 5014 using the sender's public key, PKS 5015 and decryption process $D_{PKS}$ 5012. Encryption of unencrypted content X 5003 using the private key of sender S is represented as $E_{pKS}[X]$, whereas decryption of the encrypted content, using the public key of the sender is represented as $D_{PKS}[E_{pKS}[X]]$. FIG. 19b depicts the case where content is encrypted in a private key. Alternatively, the sender could use the recipient public key PKR 5023 and encryption process $E_{PKR}$ 5021 to encrypt the unencrypted content X 5003. Then, only the recipient, using a recipient's private key pKR 5025, is able to decrypt the encrypted content $E_{PKR}[X]$ 5024 using decryption process $D_{pKR}$ 5022. Encryption of the unencrypted content X 5003 using the recipient's public key PKR 5025, is represented as $E_{PKR}[X]$, whereas decryption of the encrypted content $E_{pKS}[X]$ 5014, using the recipient's private key 5025 is represented as $D_{pKR}[E_{PKR}[X]]$. FIG. 19c depicts the case where content is encrypted in a public key.

A. Publisher to Operations Center Communications Security

Publishers 282 or other content providers 110 can deliver their electronic book content to the operations center 250 via a secured mechanism. In one embodiment, an asymmetric public key encryption technique is used, as described in Contemporary Cryptography, edited by Gustavus Simmons, published by IEEE Press in 1992, and hereby incorporated by reference. Public key algorithms used may include the Merkle-Hellman Knapsacks technique, as described in U.S. Pat. No. 4,218,582 to Hellman and Merkle, the RSA technique, as described in U.S. Pat. No. 4,405,829 to Rivest, Shamir, and Adleman, the Pohlig-Hellman technique, as described in U.S. Pat. No. 4,424,414 to Hellman and Pohlig, the Schnorr Signatures technique, as described in U.S. Pat. No. 4,995,082 to Schnorr, or any comparable public key technique. The techniques described in these U.S. Patents are hereby incorporated by reference. In an embodiment depicted in FIG. 20, a publisher 282, serving as a sender 4998, first encrypts electronic book content EBC 5100 destined for the operations center 250, which serves as the recipient 4999, using a symmetric key encryption process $E_{SK}$ 5102 and DES, PKZIP, BLOWFISH, or any other symmetric encryption algorithm, resulting in encrypted content $E_{SK}[EBC]$ 5109. The encryption process $E_{SK}$ 5102 uses a symmetric key SK 5103 either randomly generated by a key generator process 5104 or previously defined and retrieved from key storage memory 5105. Then, the publisher 282 encrypts the symmetric key SK 5103 with private key encryption process $E_{pKS}$ 5106 using the publisher's private key pKS 5107, resulting in encrypted key $E_{pKS}[SK]$ 5108. Then, the publisher 282 packages encrypted key $E_{pKS}[SK]$ 5108, encrypted content $E_{SK}[EBC]$ 5109 and non-encrypted information 5110 related to the electronic book or the exchange and delivers the package to the operations center 250. Using decryption process $D_{PKS}$ 5111 and the publisher's public key PKS 5112, the operations center 250 decrypts the encrypted key $E_{pKS}[SK]$ 5108 and uses the recovered symmetric key SK 5103 to decrypt the encrypted content $E_{SK}[EBC]$ 5109 using decryption process $D_{SK}$ 5113.

Figure 21:
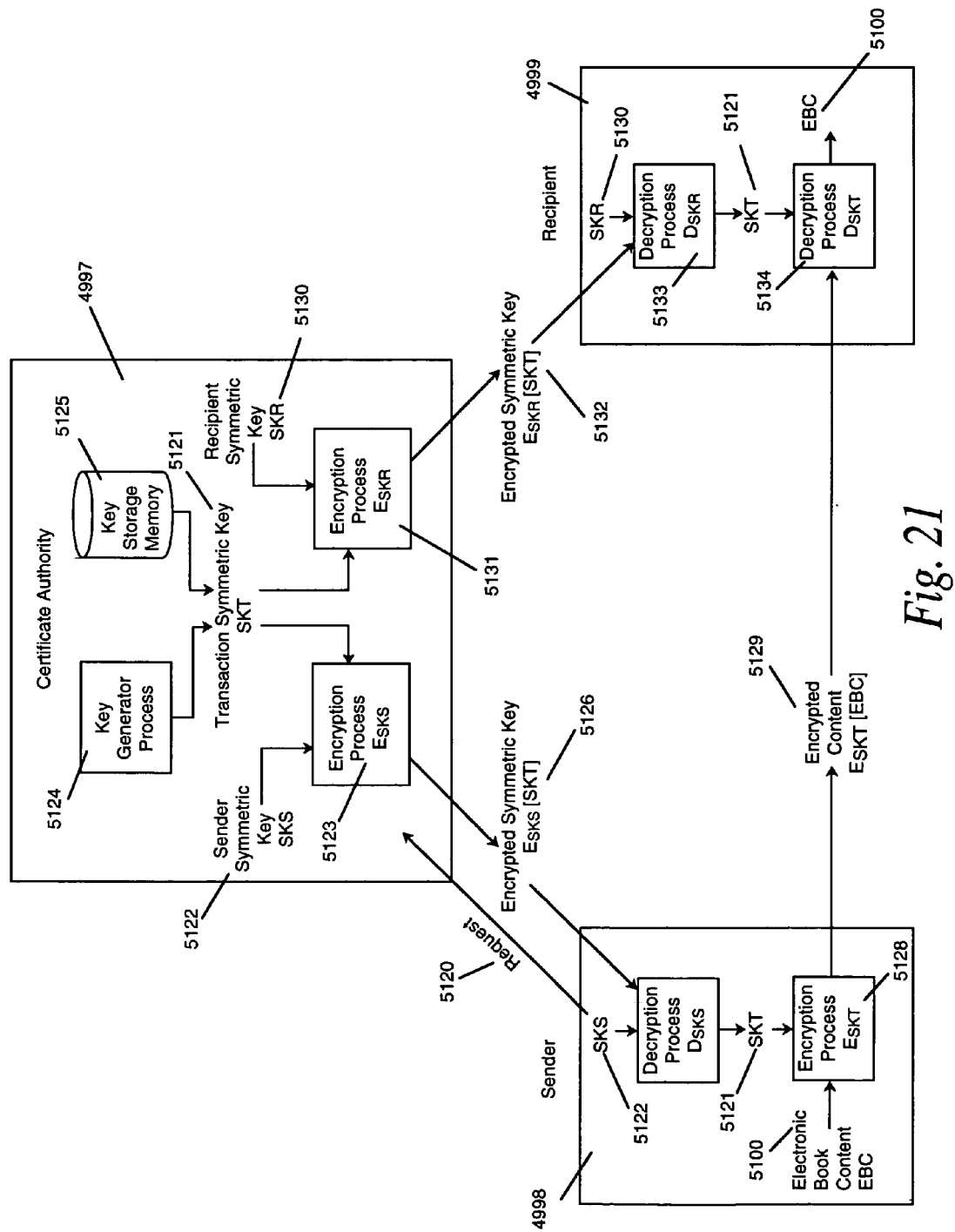
FIG. 21 is a depiction of symmetric key encryption for electronic book distribution where a certificate authority provides the encryption key.

In an alternate embodiment, depicted in FIG. 21, symmetric key encryption is used in conjunction with a certificate authority 4997. The certificate authority 4997, a trusted source, provides a symmetric key to each publisher 282, serving as the sender 4998, and the operations center 250, serving as the recipient 4999. The certificate authority 4997 may be an existing commercial entity such as Entrust or Verisign or a private entity established for the sole purpose of electronic book secure distribution. The publisher 282 contacts the certificate authority 4997, sending a request 5120 for a transaction symmetric key SKT 5121 to be used during a transaction. The certificate authority 4997 either randomly generates the transaction symmetric key SKT 5121 by using a key generator process 5124 or retrieves the previously defined transaction symmetric key SKT 5121 from key storage memory 5125. The transaction symmetric key SKT 5121 is encrypted by the certificate authority 4997 using symmetric key encryption process $E_{SKS}$ 5123 and the publisher's symmetric key SKS 5122. A resulting encrypted transaction symmetric key $E_{SKS}[SKT]$ 5126 is delivered by the certificate authority 4997 to the publisher 282. The publisher 282 decrypts the encrypted transaction symmetric key $E_{SKS}[SKT]$ 5126 using decryption process $D_{SKS}$ 5127 and the publisher's symmetric key SKS 5122 to recover the transaction symmetric key SKT 5121. The publisher 282 then uses the recovered transaction symmetric key SKT 5121 received from the certificate authority 4997 to encrypt the electronic book content EBC 5100 using encryption process $E_{SKT}$ 5128, resulting in encrypted content $E_{SKT}[EBC]$ 5129. The publisher 282 then delivers the encrypted content $E_{SKT}[EBC]$ 5129 to the operations center 250. The transaction symmetric key SKT 5121 is also encrypted by the certificate authority 4997 using symmetric key encryption process $E_{SKR}$ 5131 and the operations center's symmetric key SKR 5130. The resulting encrypted transaction symmetric key $E_{SKR}[SKT]$ 5132 is delivered by the certificate authority 4997 to the operations center The operations center 250 decrypts the encrypted transaction symmetric key $E_{SKR}[SKT]$ 5132 using decryption process $D_{SKR}$ 5133 and the operations center's symmetric key SKR 5130 to recover the transaction symmetric key SKT 5121. The operations center 250 then uses the recovered transaction symmetric key SKT 5121 received from the certificate authority 4997 to decrypt the encrypted content $E_{SKT}[EBC]$ 5129 using decryption process $D_{SKT}$ 5134, resulting in unencrypted electronic book content 5100.

Figure 22:
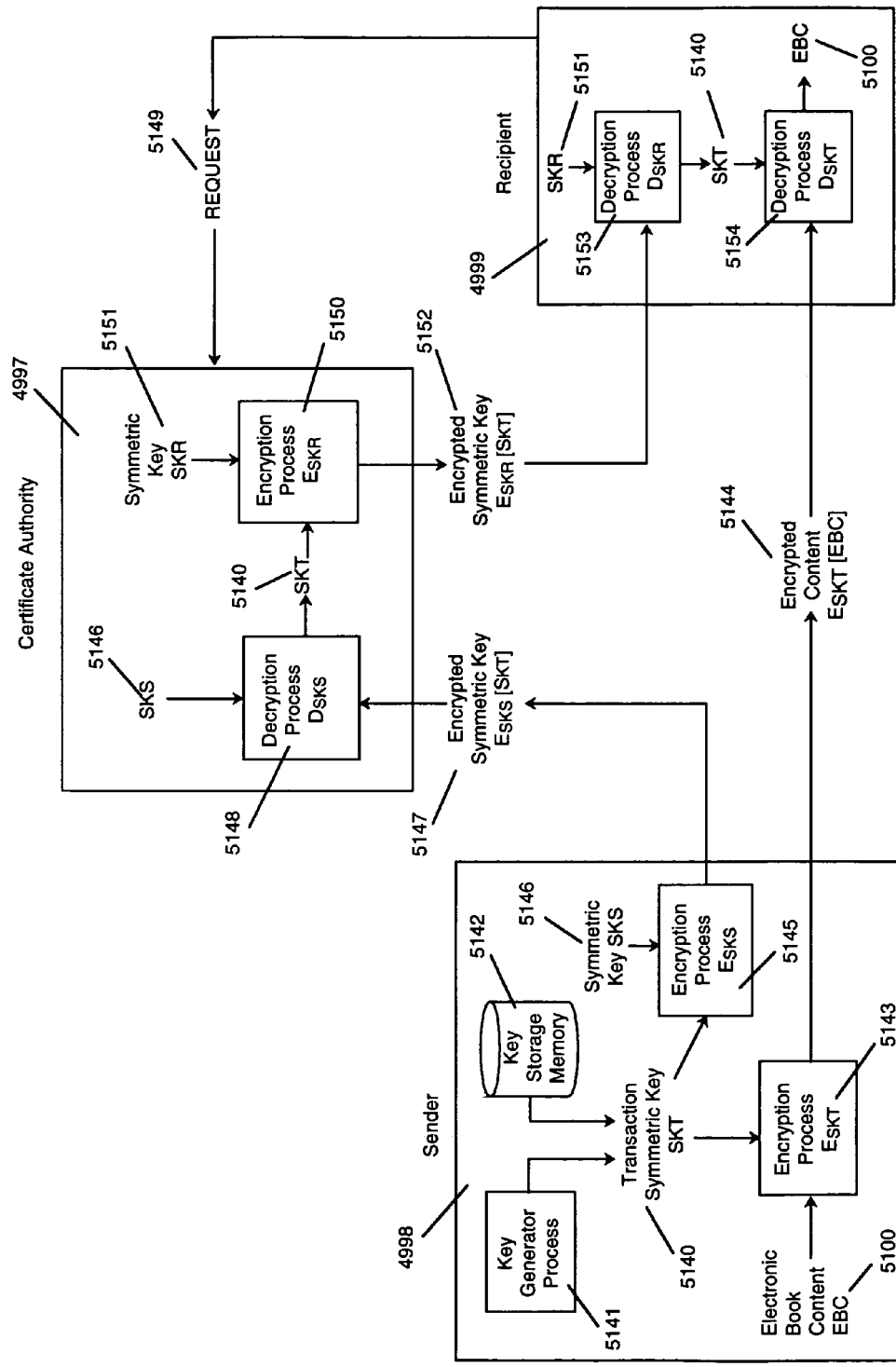
FIG. 22 is a depiction of symmetric key encryption for electronic book distribution where a certificate authority is provided the encryption key.

In yet another embodiment, depicted in FIG. 22, the publisher 282, acting as the sender 4998, generates a transaction symmetric key SKT 5140. The publisher 282 either randomly generates the transaction symmetric key SKT 5140 by using a key generator process 5141, or retrieves a previously defined transaction symmetric key SKT 5140 from key storage memory 5142. The publisher 282 encrypts the electronic book content EBC 5100 using encryption process $E_{SKT}$ 5143 and the transaction symmetric key SKT 5140, and delivers encrypted content $E_{SKT}[EBC]$ 5144 to the operations center 250, acting as recipient 4999. The publisher 282 then encrypts the transaction symmetric key SKT 5140 using encryption process $E_{SKS}$ 5145 and a publisher's symmetric key SKS 5146 that it shares with a third party certificate authority 4997 and delivers an encrypted symmetric key $E_{SKS}[SKT]$ 5147 to the certificate authority 4997. The certificate authority 4997 decrypts the encrypted symmetric key $E_{SKS}[SKT]$ 5147 using decryption process $D_{SKS}$ 5148 and the publisher's symmetric key SKS 5146. The operations center 250 may contact the certificate authority 4997 using request 5149 to obtain the transaction symmetric key SKT 5140. Prior to the certificate authority 4997 delivering the needed transaction symmetric key 5140 to the operations center 250, the operations center 250 may be required to complete a financial transaction with the certificate authority 4997, paying for the electronic book content first. The certificate authority 4997 then encrypts the transaction symmetric key SKT 5140 using encryption process $E_{SKR}$ 5150 and an operations center's symmetric key SKR 5151 that the certificate authority 4997 shares with the operations center 250 and delivers encrypted symmetric key $E_{SKR}[SKT]$ 5152 to the operations center 250. The operations center 250 decrypts the encrypted symmetric key $E_{SKR}[SKT]$ 5152 using decryption process $D_{SKR}$ 5153 and the operations center's symmetric key SKR 5151, and uses the recovered transaction symmetric key SKT 5140 to decrypt the encrypted content $E_{SKT}[EBC]$ 5144 using decryption process $D_{SKT}$ 5154, resulting in electronic book content EBC 5100.

Figure 23A:
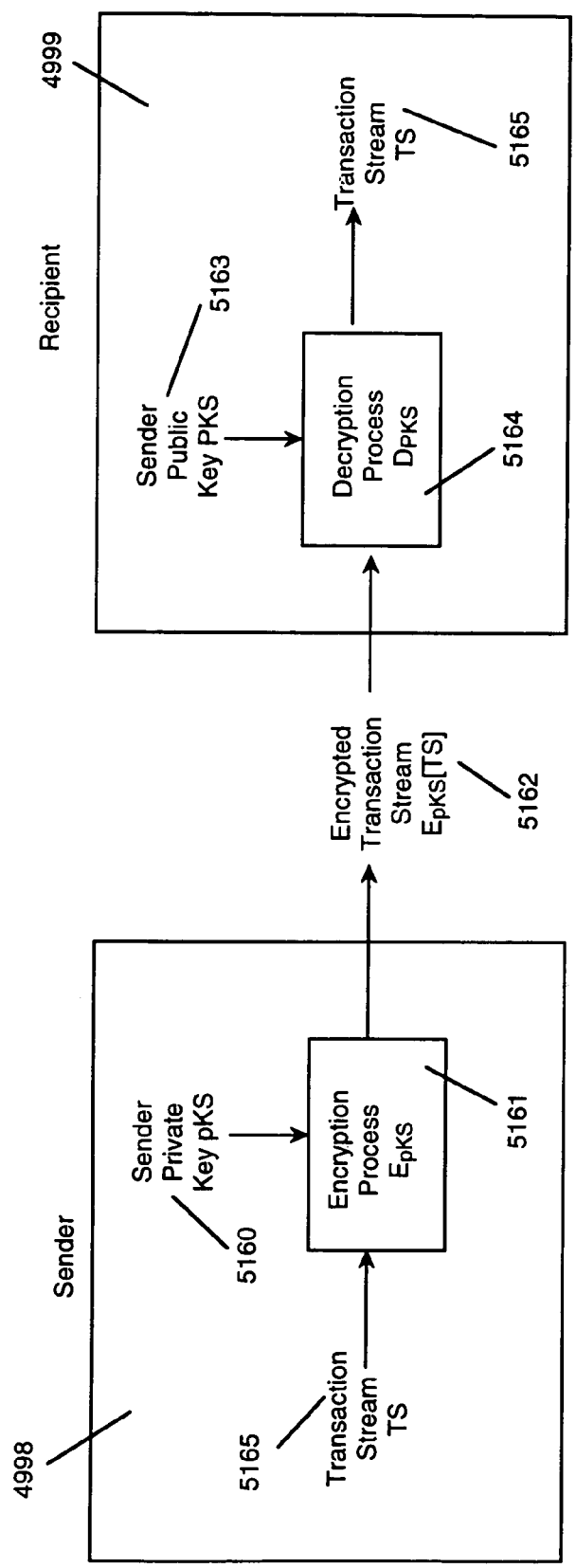
FIG. 23a is a diagram depicting asymmetric encryption using a private key for an entire transaction stream.

In another embodiment, depicted in FIG. 23a, the publisher 282, serving as the sender 4998, encrypts a transaction stream TS 5165 between the publisher 282 and the operations center 250, serving as the recipient 4999. To do so, the publisher 282 may use a sender private key pKS 5160 and encryption process $E_{pKS}$ 5161 to encrypt the transaction stream TS 5165, resulting in encrypted transaction stream $E_{pKS}$[TS] 5162.

In this embodiment, the operations center 250 uses decryption process $D_{pKS}$ 5164 and sender public key PKS 5163 to decrypt the encrypted transaction stream $E_{pKS}$[TS] 5162. In another embodiment, depicted in FIG. 23b, the publisher 282, serving as the sender 4998, may use a public key of the operations center 250, serving as the recipient 4999, to encrypt the transaction stream TS 5165. To do so, the publisher 282 may use a recipient public key PKR 5171 and encryption process $E_{PKR}$ 5170 to encrypt the transaction stream TS 5165, resulting in encrypted transaction stream $E_{PKR}$[TS] 5173.

In this embodiment, the operations center 250 uses decryption process $D_{pKR}$ 5174 and recipient private key pKR 5172 to decrypt the encrypted transaction stream $E_{PKR}$[TS] 5173. In another embodiment, depicted in FIG. 23c, the publisher 282, serving as the sender 4998, may use a transaction symmetric key SKT 5181 that both the publisher 282 and the operations center 250 have stored in advance of the transaction to encrypt the transaction stream TS 5165. In this embodiment, the publisher 282 uses encryption process $E_{SKT}$ 5180 and transaction symmetric key SKT 5181 to generate the encrypted transaction stream $E_{SKT}$[TS] 5182. The operations center 250 uses decryption process $D_{SKT}$ 5183 and transaction symmetric key SKT 5181 to decrypt the encrypted transaction stream $E_{SKT}$[TS] 5182, resulting in the transaction stream TS 5165.

Figure 24A:
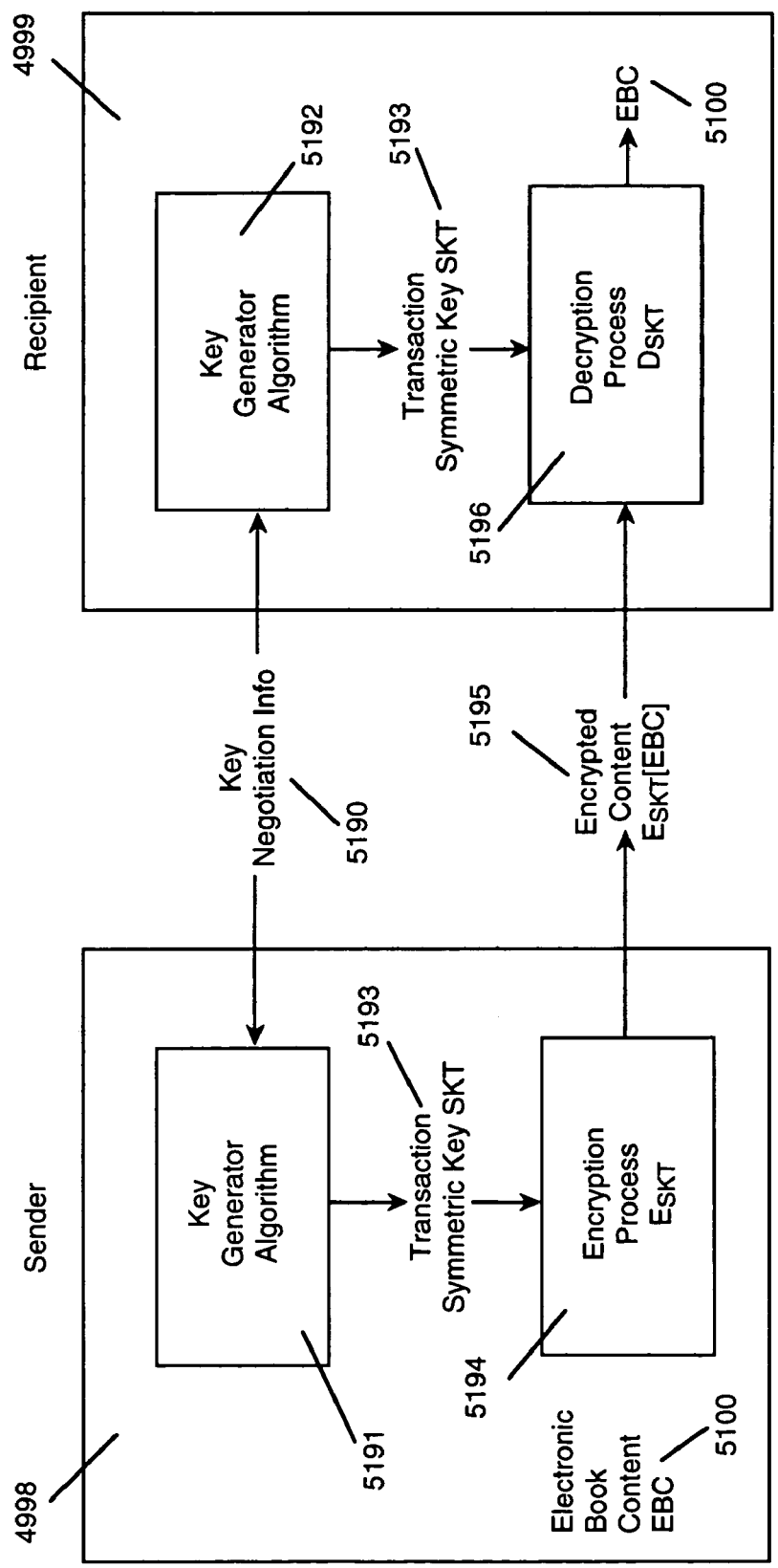
FIG. 24a depicts transaction key negotiation process.

In another embodiment, depicted in FIG. 24a, the publisher 282, serving as the sender 4998, and the operations center 250, serving as the recipient 4999, initiate the transaction by negotiating a shared key to use for the transaction, using, for example, the Elliptic Curve Diffie-Hellman key exchange algorithm, described in U.S. Pat. No. 4,200,700 to Hellman, Diffie, and Merkle, which is hereby incorporated by reference, to generate the shared transaction symmetric key. Key negotiation information 5190 is exchanged between the publisher 282 and the operations center 250. As a result of the negotiation process, a publisher's key generator algorithm 5191 generates the transaction symmetric key SKT 5193 and the operations center's key generator algorithm 5192 generates the transaction symmetric key SKT 5193. The publisher 282 encrypts the electronic book content EBC 5100 using encryption process $E_{SKT}$ 5194 and the shared transaction symmetric key SKT 5193 and delivers the resulting encrypted content $E_{SKT}$[EBC] 5195 to the operations center 250. The operations center 250 uses the shared transaction symmetric key SKT 5193 and decryption process $D_{SKT}$ 5196 to decrypt encrypted content $E_{SKT}$[EBC] 5195. In a different embodiment, depicted in FIG. 24b, the publisher 282 serves as the sender 4998 and operations center 250 serves as the recipient 4999. Initial key negotiation information 5200 is exchanged between a seed key generation algorithm 5201 at the publisher 282 and a seed key generation algorithm 5202 at the operations center 250. As a result, the seed key generation algorithm 5201 at the publisher 282 and the seed key generation algorithm 5202 at the operations center 250 each generate seed key SK 5203 using, for example, the Elliptic Curve Diffie-Hellman key exchange algorithm, as described in U.S. Pat. No. 4,200,700. The seed key SK 5203 is then used by key sequence generator 5204 at the publisher 282 to generate the first in a sequence of keys, transaction symmetric key SKTi 5206. Similarly, the seed key SK 5203 is used by key sequence generator 5205 at the operations center 250 to generate an identical sequence of keys, beginning with shared transaction symmetric key SKTi 5206. The publisher 282 encrypts the electronic book content EBC 5100 using encryption process $E_{SKTi}$ 5207 and the shared transaction symmetric key SKTi 5206 and delivers a resulting encrypted content $E_{SKTi}$[EBC] 5208 to the operations center 250. The operations center 250 uses the transaction symmetric key SKTi 5206 and decryption process $D_{SKTi}$ 5209 to decrypt the encrypted content $E_{SKTi}$[EBC] 5206. The publisher key sequence generator 5204 and the operations center key sequence generator 5205 continue to generate matching transaction symmetric keys for use in encrypting each subsequent transaction between the publisher 282 and the operations center 250.

The publisher 282 may deliver the electronic book content to multiple operations centers. In one embodiment, the publisher 282 delivers the electronic book content to each operations center 250 independently using one of the embodiments described herein. In an alternative embodiment, the publisher 282 may broadcast the electronic book content to multiple operations centers 250 simultaneously. In one embodiment used for broadcasting, depicted in FIG. 25a, the publisher 282, serving as the sender 4998, encrypts the electronic book content EBC 5100 using encryption process $E_{SKT}$ 5211 and transaction symmetric key SKT 5210, resulting in encrypted content $E_{SKT}$[EBC] 5217. The transaction symmetric key SKT 5210 is then encrypted using public key encryption process $E_{PKA}$ 5212 and public key PKA 5213 for recipient A 4999, the first operations center 250 to receive the electronic book content, resulting in encrypted key $E_{PKA}$[SKT] 5218. The transaction symmetric key SKT 5210 is then encrypted using public key encryption process $E_{PKB}$ 5212' and public key PKB 5213' for recipient B 4999', the second operations center 250 to receive the electronic book content, resulting in encrypted key $E_{PKB}$[SKT] 5218'. This process is repeated for each of the operations centers 250 receiving the electronic book content. The encrypted content $E_{SKT}$[EBC] 5217, along with encrypted keys 5218, 5218', and 5218", are delivered to all the receiving operations centers 250. Each operations center 250 uses its own private key to decrypt the transaction symmetric key SKT 5210. For example, recipient A 4999 uses decryption process $D_{pKA}$ 5214 and private key pKA 5216 to decrypt the encrypted key $E_{PKA}$[SKT] 5218, recovering the transaction symmetric key SKT 5210. Decryption process $D_{SKT}$ 5215 is then used to decrypt encrypted content $E_{SKT}$[EBC] 5217 using transaction symmetric key SKT 5210.

Figure 25A:
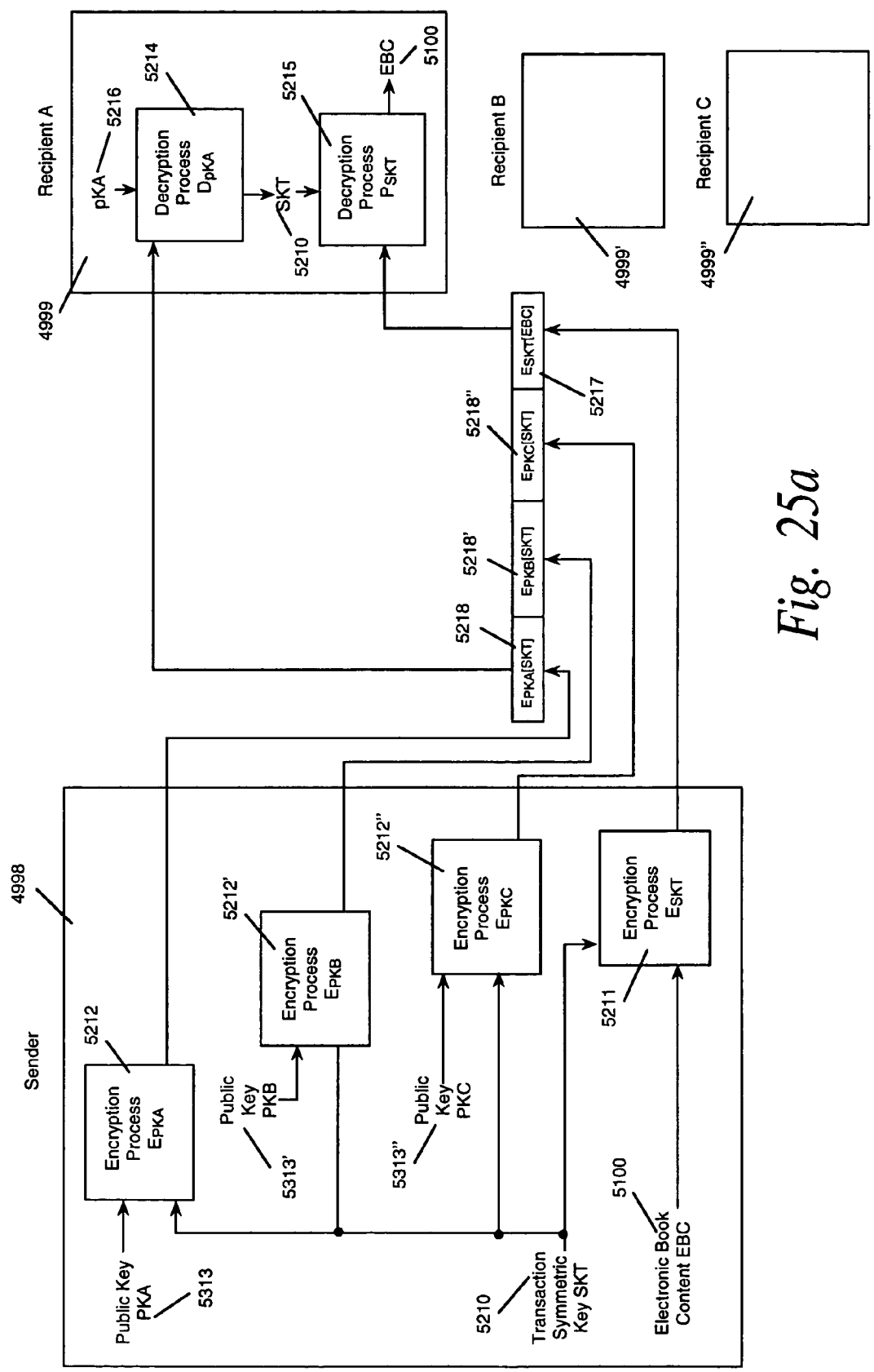
FIG. 25a depicts a secure method for broadcast distribution.
Figure 25B:
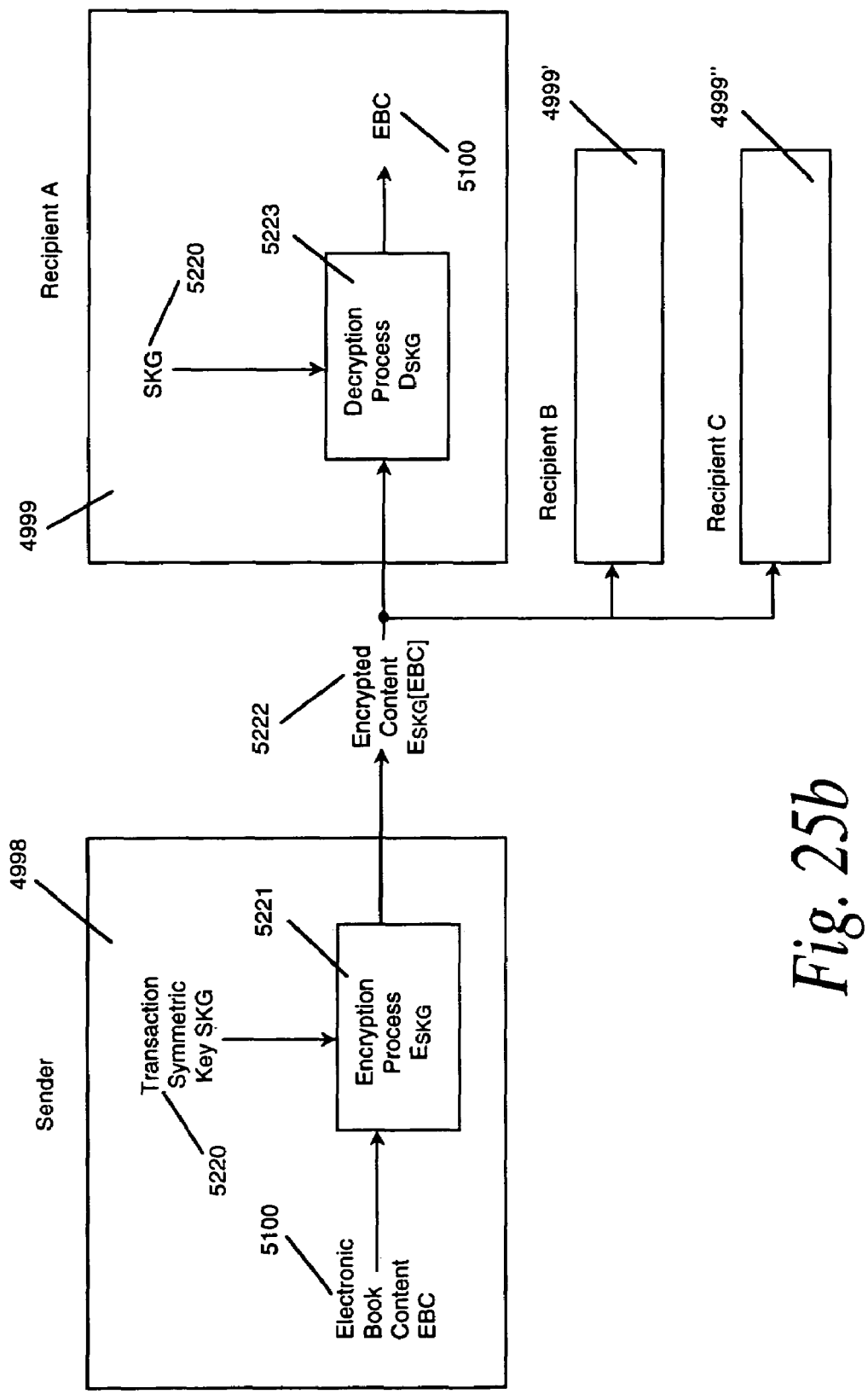
FIG. 25b depicts a secure method for group distribution.

In another embodiment, depicted in FIG. 25b, operations centers 250 may be assigned to predefined groups. Prior to the distribution of electronic book content EBC 5100 by publisher 282, serving as the sender 4998, for each defined group, a group symmetric key SKG 5220 is created and distributed by the publisher 282 to each operations center 250, serving as recipients 4999, 4999' and 4999" within the group.

When the publisher 282 sends the electronic book content EBC 5100 to a pre-defined group of operations centers, the publisher 282 encrypts the electronic book content EBC 5100 using encryption process $E_{SKG}$ 5221 and the group symmetric key SKG 5220 pre-defined for that group and delivers the encrypted content $E_{SKG}$[EBC] to all the operations centers 250 in the group. Recipients 4999, 4999', and 4999" use decryption process $D_{SKG}$ 5223 and the group symmetric key SKG 5220 for that group to which they are assigned to decrypt the encrypted content $E_{SKG}$[EBC].

Figure 26:
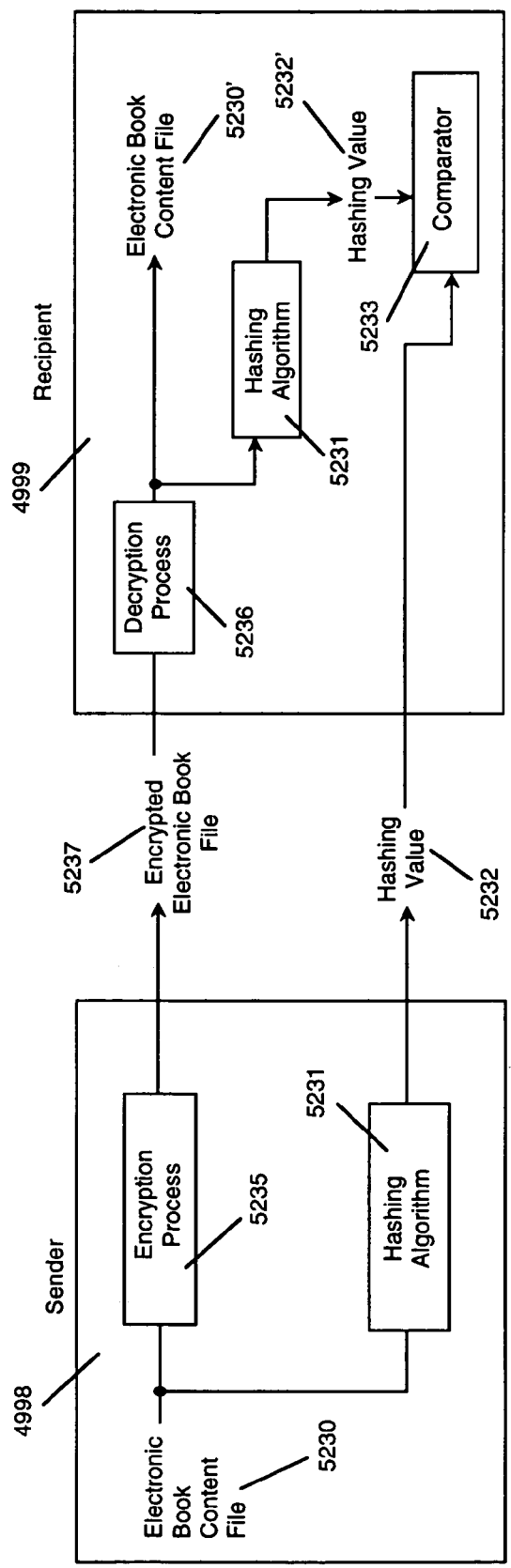
FIG. 26 depicts a hashing function process.

To ensure that the electronic book content delivered by the publisher 282 to the operations center 250 was not altered in route, integrity checking algorithms may be employed. In one embodiment, depicted in FIG. 26, the publisher 282, serving as sender 4998, uses a one-way hashing algorithm 5231, as presented in Applied Cryptography, by Bruce Schneier, published by John Wiley & Sons, Inc. in 1996, and hereby incorporated by reference, where a hashing value 5232 is calculated by the publisher 282 based on the electronic book content file 5230 as an input. This resulting hashing value 5232, along with the actual encrypted electronic book file 5237 that has been encrypted by the publisher 282 via encryption process 5235 is delivered to the operations center 250, serving as the recipient 4999.

The operations center 250 decrypts the encrypted electronic book file 5237 using decryption process 5236 to recover electronic book content file 5230'. The operations center 250 then uses the hashing algorithm 5231 with the electronic book content file 5230' as an input to generate a hashing value 5232'. A comparator 5223 compares the hashing value 5232' and the hashing value 5232 delivered with the encrypted electronic book file 5237. If the hashing value 5232' calculated by the operations center 250 coincides with the hashing value 5232 delivered by the publisher 282, the integrity of the electronic book content file 5230' is ensured.

To identify the publisher 282 delivering the electronic book and to guarantee non-repudiation, i.e., that the publisher 282 cannot deny that the electronic book was sent, the publisher 282 and operations center 250 may use an authentication method. In one embodiment, a Digital Signature Algorithm (DSA) is used, as described in U.S. Pat. No. 5,231,668 to Kravitz, and hereby incorporated by reference. In another embodiment, the publisher 282 uses a password as an identifier. This password may be delivered along with the electronic book content to authenticate the publisher 282 as the sender. The operations center 250 compares this password with the password the operations center 250 has for the publisher 282. If the passwords match, the source of the electronic book content, i.e., the publisher 282, is verified.

In yet another embodiment, public key encryption is used as a digital signature to authenticate the publisher 282. The publisher 282 encrypts the electronic book content using the publisher's private key pKS. When the operations center 250 correctly decrypts the encrypted electronic book content with the publisher's public key PKS, the identity of the publisher 282 is authenticated since only the publisher 282 has access to the publisher's private key pKS used to encrypt the electronic book content.

Figure 27:
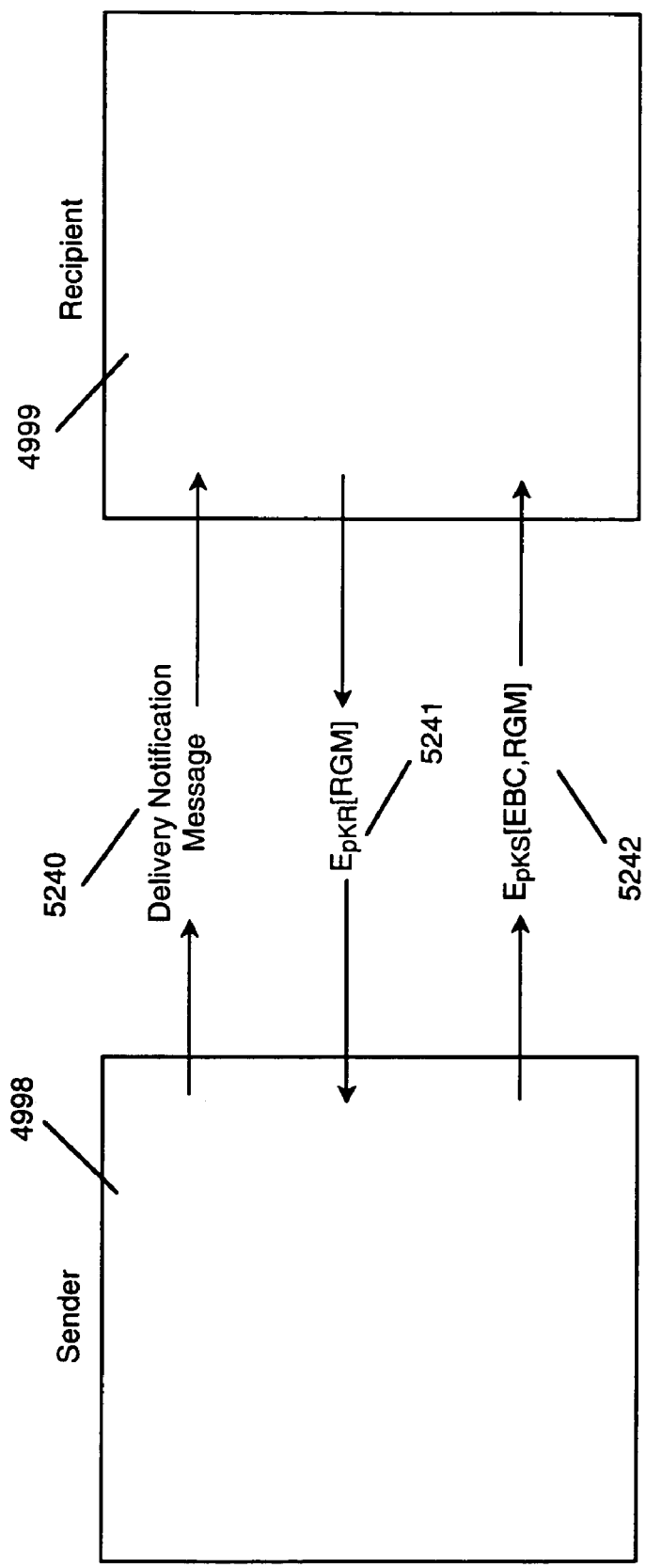
FIG. 27 depicts a sender initiated, sender identification process.

In another embodiment, depicted in FIG. 27, upon initiation of the transaction, the publisher 282, serving as the sender 4998, notifies the operations center 250, serving as the recipient 4999, of the publisher's intention to deliver electronic book content to the operations center 250. This notification may be in the form of delivery notification message 5240. The operations center 250 then encrypts a randomly generated message RGM generated by the operations center 250 using encryption process $E_{PKR}$ and the operations center's private key pKR and sends the resulting $E_{pKR}[RGM]$ 5241 to the publisher 282. The publisher 282 decrypts $E_{pKR}[RGM]$ 5241 using decryption process $D_{PKR}$ and the operations center's public key PKR. The publisher 282 then encrypts the electronic book content EBC, along with the randomly generated message RGM received from the operations center 250 using encryption process $E_{pKS}$ and the publisher's private key pKS and sends the resulting $E_{pKS}[EBC,RGM]$ 5242 to the operations center 250. The operations center 250 decrypts $E_{pKS}[EBC,RGM]$ 5242 using decryption process DPKS and the publisher's public key PKS. If the randomly generated message RGM received from the publisher 282 coincides with the randomly generated message RGM that the operations center 250 originally sent to the publisher 282, the publisher's identity is verified.

In another embodiment, the ISO one-way authentication protocol framework, as defined in ISO standard X.509 is used to provide authentication of the publisher's identity.

The operations center 250 may initiate the transaction with the publisher 282 by requesting that an electronic book be delivered from the publisher 282 to the operations center 250. To validate the identity of the operations center 250, the publisher 282 and operations center 250 may use any of the above authentication method embodiments. In one embodiment, the Digital Signature Algorithm (DSA) is used, as described in U.S. Pat. No. 5,231,668 to Kravitz, and hereby incorporated by reference.

In another embodiment, the operations center 250 uses a password as an identifier. This password is delivered along with the electronic book request to authenticate the operations center 250. The publisher 282 compares this password with the password the publisher 282 has for the operations center 250. If the passwords match, the source of the electronic book request, i.e., the operations center 250, is verified.

In yet another embodiment, public key encryption is used as a digital signature to authenticate the operations center 250. The operations center 250 encrypts the electronic book request using the operations center private key pKR and send the encrypted request to the publisher 282. When the publisher 282 correctly decrypts the encrypted request with the operations center's public key PKR, the identity of the operations center 250 is authenticated since only the operations center 250 has access to the operations center's private key pKR used to encrypt the electronic book request.

Figure 28:
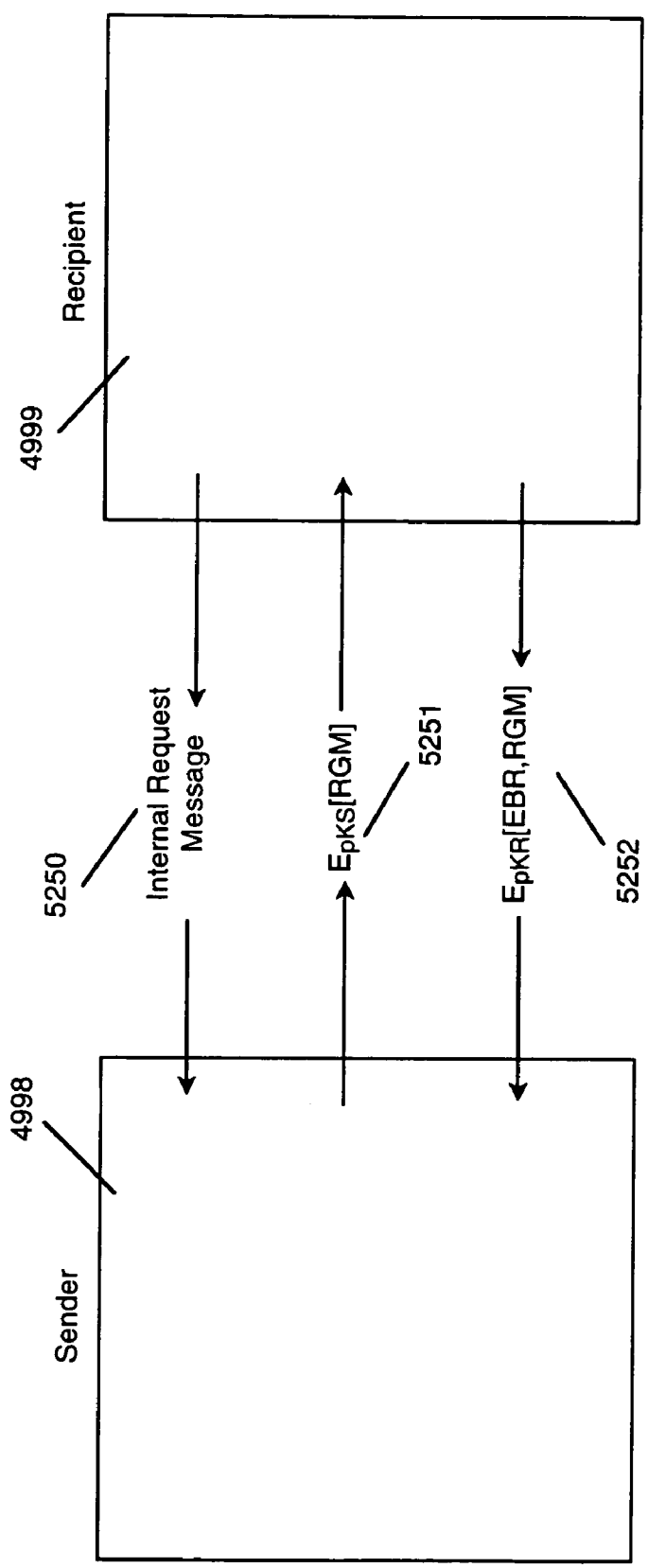
FIG. 28 depicts a recipient initiated, sender identification process.

In another embodiment, depicted in FIG. 28, upon initiation of the transaction, the operations center 250, serving as the recipient 4999, notifies the publisher 282, serving as the sender 4998, of the operations center's intention to request electronic book content from the publisher 282. This notification may be in the form of initial request message 5250. The publisher 282 then encrypts a randomly generated message RGM generated by the publisher 282 using encryption process $E_{pKS}$ and the publisher's private key pKS and sends the resulting $E_{pKS}[RGM]$ 5251 to the operations center 250. The operations center 250 decrypts $E_{pKS}[RGM]$ 5251 using decryption process $D_{PKS}$ and the publisher's public key PKS. The operations center 250 then encrypts the electronic book request EBR, along with the randomly generated message RGM received from the publisher 282 using encryption process $E_{PKR}$ and the operations center's private key pKR, and sends the resulting $E_{pKR}[EBR,RGM]$ 5252 to the publisher 282. The publisher 282 decrypts $E_{pKR}[EBR,RGM]$ 5252 using decryption process $D_{PKR}$ and the operations center's public key PKR. If the randomly generated message RGM received from the operations center 250 coincides with the randomly generated message RGM that the publisher 282 originally sent to the operations center 250, the operations center's identity is verified.

In another embodiment, the ISO one-way authentication protocol framework, as defined in ISO standard X.509 is used to provide authentication of the publisher's identity.

Figure 29:
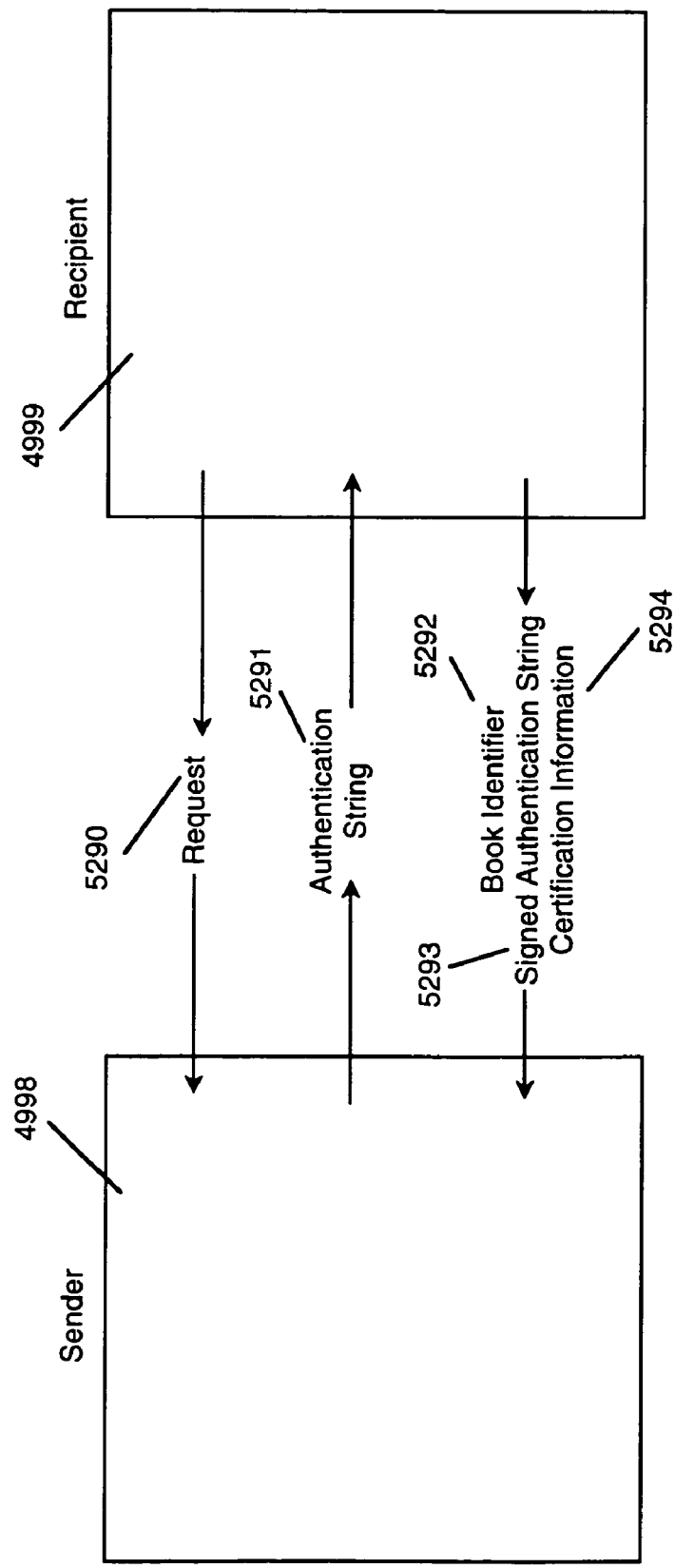
FIG. 29 depicts a recipient authentication sequence.

In yet another embodiment involving delivery of electronic book content from the publisher 282 to the operations center 250, the operations center 250 requests an electronic book from the publisher 282. The publisher 282 first authenticates the requesting operations center 250. An embodiment of the authentication sequence is shown in FIG. 29, where the publisher 282 is serving as the sender 4998 and the operations center 250 is serving as the recipient 4999. To authenticate the operations center 250 requesting an electronic book from the publisher 282, an authentication sequence may be initiated by the operations center 250. The authentication sequence begins with the operations center 250 sending a request 5290 to the publisher 282 for a given electronic book content file 5300. The publisher 282 then responds to the operations center 250 by generating and returning an authentication string 5291 to the operations center 250. The operations center 250 returns a message to the publisher 282 that contains: 1) a book identifier 5292, identifying the requested electronic book; 2) the signed authentication string 5293 that has been signed using a one-way hash function and then encrypted using the private key of the operations center 250; and 3) operations center 250 certification information 5294 that the publisher 282 can authenticate with the certificate authority 4997 (not shown in FIG. 29).

Figure 30:
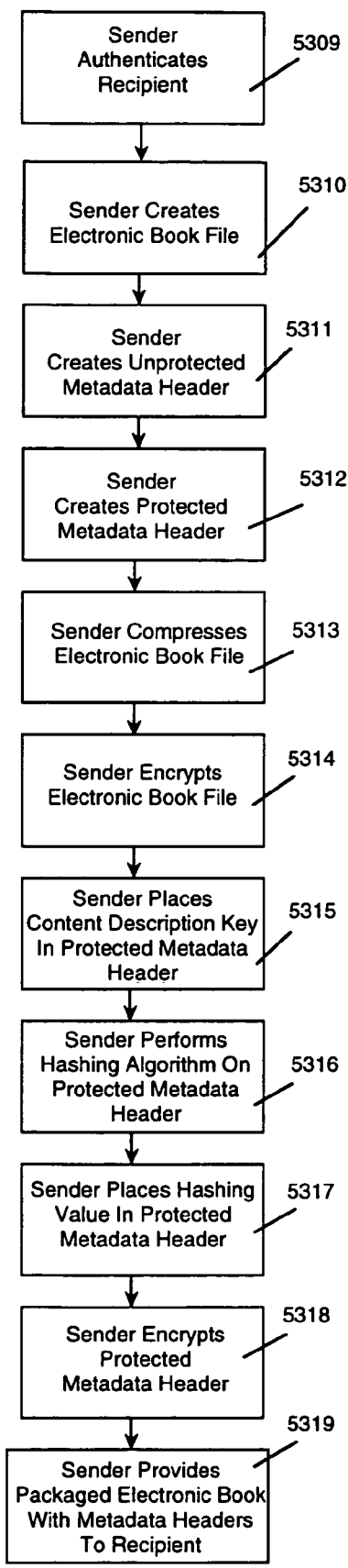
FIG. 30 depicts a secure delivery process.

FIG. 30 presents the remaining steps of a secure delivery process, where the publisher 282 serves as the sender 4998 and the operations center 250 serves as the recipient 4999. First, the publisher 282 authenticates the operations center 250, shown as authentication step 5309. The publisher 282 then creates the requested electronic book file 5300 in file creation step 5310, creates an unprotected metadata header 5301 containing non-secure information about the electronic book in step 5311, and creates a protected metadata header 5302 containing secure information about the electronic book, shown in metadata header step 5312. Secure information about the electronic book may include an electronic book identifier, an identifier of the format being used for the protected metadata header 5302, the content decryption key 5306 and decryption algorithm to be used to decrypt the electronic book content, the number of copies of the electronic book that are allowed to be derived from the original electronic book version, distribution features supported for the electronic book, fair use features associated with the electronic book, and integrity checking information to ensure the protected metadata header 5302 is unaltered since its creation.

Distribution features may include the ability to sell one or more copies of the electronic book at a cost, distribute one or more copies of the electronic book at no cost, or loan one or more copies of the electronic book. Fair use features may include the ability to use the electronic book for a defined time period, the ability to loan or print a number of copies of the entire electronic book or portions of the electronic book, and the ability to define and track the number of copies already loaned or printed. The publisher 282 may then compress the electronic book file 5300, shown in compression step 5313, and the publisher 282 may then perform an encryption process on the electronic book file 5300, shown in encryption step 5314.

Alternatively, the publisher 282 may perform the encryption process on the electronic book file 5300 and then compress the encrypted electronic book file. To encrypt the electronic book, the publisher 282 may use a pre-defined or randomly generated symmetric key or the publisher 282 may use its own private key. The content decryption key 5306 may then be placed in the protected metadata header 5302, shown in decryption key loading step 5315.

The publisher 282 then may calculate and place integrity checking information in the protected metadata header 5302, as shown in integrity checking steps 5316 and 5317, respectively. Integrity checking information may include the results of a one-way hashing algorithm 5304, for example, using an algorithm as presented in Applied Cryptography by Bruce Schneier, performed on all or a portion of the protected metadata header 5302. The hashing function 5304 may be performed using the content decryption key 5306 or another predefined hashing key, resulting in hashing value 5305. The publisher 282 may then encrypt the entire protected metadata header 5302 or some portion of the protected metadata header 5302 using the public key of the operations center 250 or a pre-determined symmetric key known by both the publisher 282 and the operations center 250, as shown in encryption step 5318.

The packaged electronic book with metadata headers may then be delivered to the operations center 250 or the operations center 250 may retrieve the packaged electronic book from the publisher 282, as shown in delivery step 5319. Upon receipt of the packaged electronic book, along with metadata headers 5301 and 5302, by the operations center 250, the operations center 250 may decrypt the protected metadata header 5302, validate that the protected metadata header 5302 has not been altered by performing a one-way hash calculation on the protected metadata header 5302 and comparing the result to the hash value 5305 contained in the protected metadata header 5302, and re-encrypt the protected metadata header 5302 for storage. Alternatively, the operations center 250 may store the received packaged electronic book directly without decrypting the protected metadata header 5302.

Processing and storage of the decryption and encryption keys used on the protected metadata header 5302 at the operations center 250 may be done entirely in software, entirely on a secure smart card or removable device, or some combination of the two.

Figure 31:
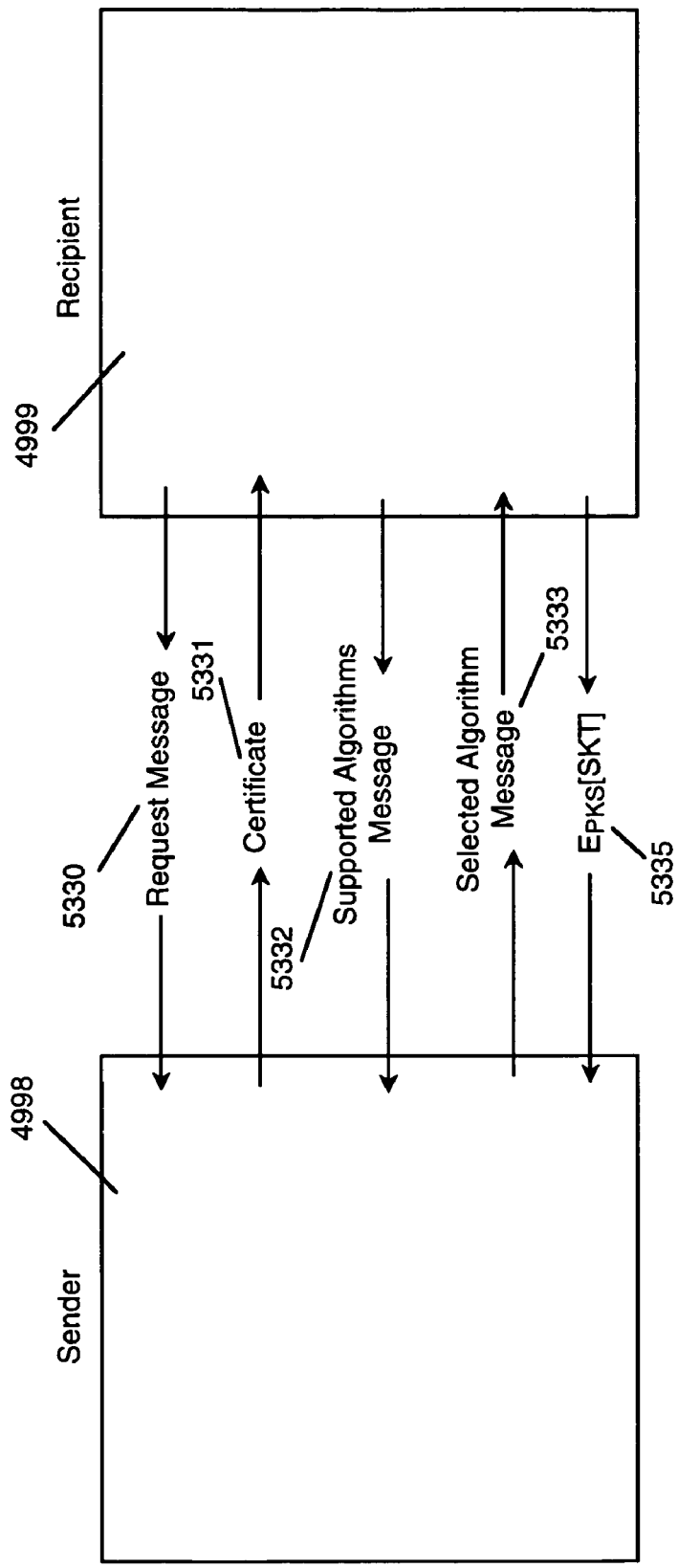
FIG. 31 depicts a recipient initiated, secure socket layer exchange.

In still another embodiment, a publisher 282, or third party electronic book formatter, converts the electronic book content and associated metadata into a deliverable format. The prepared electronic book file is then delivered to the operations center 250, for example over the Internet using a secure socket layer (SSL) protected communication link. This exchange, depicted in FIG. 31, may be initiated by the operations center 250, serving as the recipient 4999, sending a request message 5330 to the publisher 282, serving as the sender 4998, to deliver the requested electronic book content 5100 to the operations center 250.

The request message 5330 may contain a login and password sequence that is used by the publisher 282 to initially validate the operations center 250. Alternatively, or in addition, the publisher 282 may use the specific Internet Protocol (IP) address of the operations center 250, included in the request message 5330, for validation purposes. In response, the publisher 282 may send a certificate 5331, which may include identifying information and the publisher's public key PKS, to the operations center 250. The operations center 250 verifies the certificate 5331 was issued by a trusted third party certificate authority 4997. The operations center 250 compares the information in the certificate that is received from the trusted third party certificate authority 4997, including the publisher's identifying information and public key PKS.

The operations center 250 then notifies the publisher 282 which encryption algorithms that the operations center 250 can support using a supported algorithm message 5332. The publisher 282 selects an algorithm and notifies the operations center 250 of the selection using a selected algorithm message 5333. The operations center 250 generates a transaction symmetric key SKT 5334, encrypts the transaction symmetric key SKT 5334 using the public key PKS of the publisher 282 and the algorithm provided in the selected algorithm message 5333 and sends the resulting $E_{PKS}$[SKT] 5335 to the publisher 282. The publisher 282 decrypts $E_{PKS}$[SKT] 5335 using decryption process $D_{pKS}$ and the publisher's private key pKS. The transaction symmetric key SKT 5334 is then used to encrypt and decrypt the transaction between the publisher 282 and the operations center 250.

Figure 32:
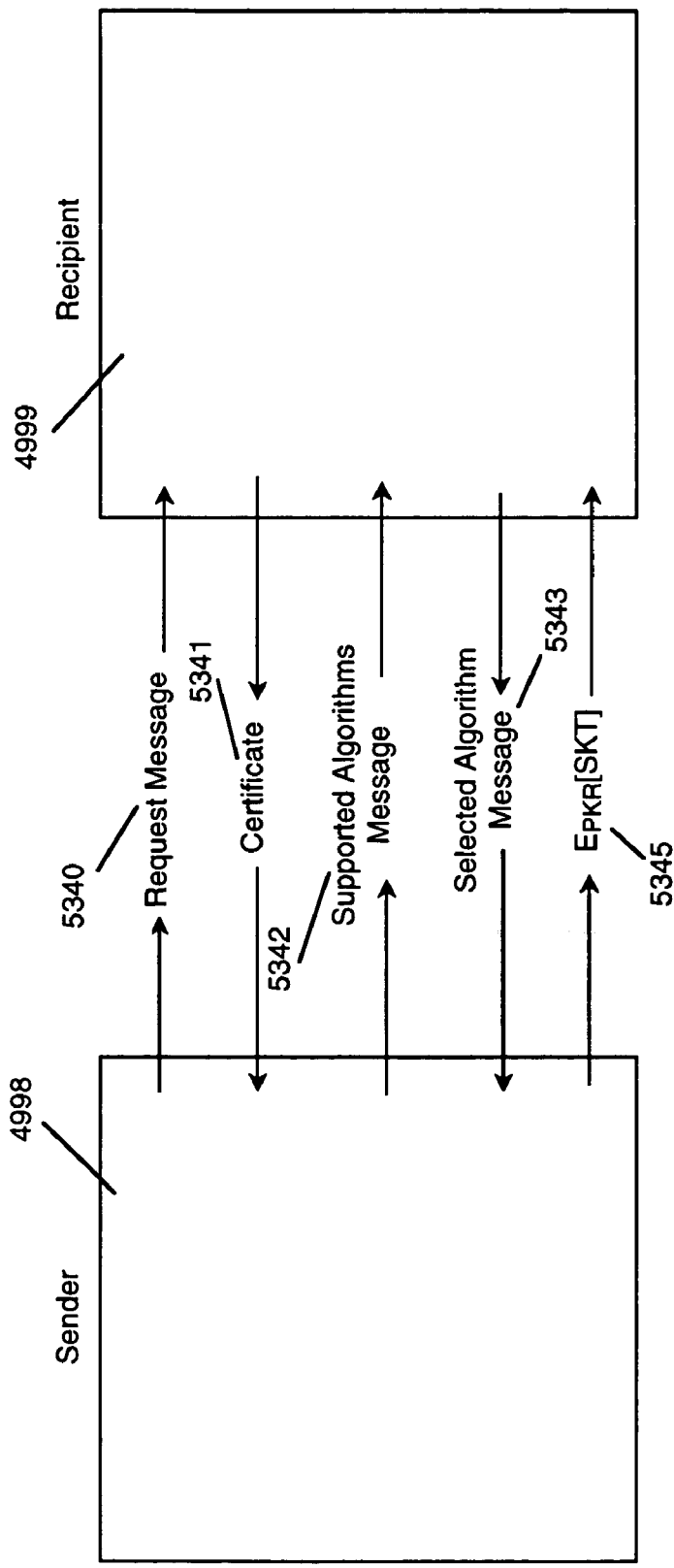
FIG. 32 depicts a sender initiated, secure socket layer exchange.

Alternatively, an exchange, as depicted in FIG. 32, may be initiated by the publisher 282, serving as sender 4998, by sending a request message 5340 to the operations center 250, serving as recipient 4999, that the publisher 282 wishes to deliver electronic book content to the operations center 250.

The request message 5340 may contain a login and password sequence that may be used by the operations center 250 to initially validate the publisher 282. Alternatively, or in addition, the operations center 250 may use the specific IP address of the publisher 282, included in the request message 5340, for validation purposes. In response, the operations center 250 sends a certificate 5341 to the publisher 282 that may include identifying information and the operations center's public key PKR.

The publisher 282 verifies the certificate was issued by a trusted third party certificate authority 4997 (not shown in FIG. 32). The publisher 282 compares the information in the certificate 5341 that is received from the trusted third party certificate authority 4997, including operations center's identifying information and public key PKR. The publisher 282 then notifies the operations center 250 which encryption algorithms the publisher 282 can support using a supported algorithms message 5342. The operations center 250 selects an algorithm and notifies the publisher 282 of the selection via a selected algorithm message 5434. The publisher 282 generates a transaction symmetric key SKT 5344, encrypts the transaction symmetric key SKT 5344 using the public key PKR of the operations center 250 and the algorithm provided in the selected algorithm message 5343 and sends the resulting $E_{PKR}$[SKT] 5345 to the operations center 250. The operations center 250 decrypts $E_{PKR}$[SKT] 5345 using decryption process $D_{pKR}$ and the operations center's private key pKR. The transaction symmetric key SKT 4344 is then used to encrypt and decrypt the transaction between the publisher 282 and the operations center 250.

Once the electronic book content is received and decrypted by the operations center 250, the operations center 250 may store the electronic book file unencrypted or may re-encrypt the electronic book file for storage. Alternatively, the operations center 250 may also compute a hash value of the electronic book file to be used for validation the integrity of the file when recovered from storage for delivery to a home system 258.

Figure 33:
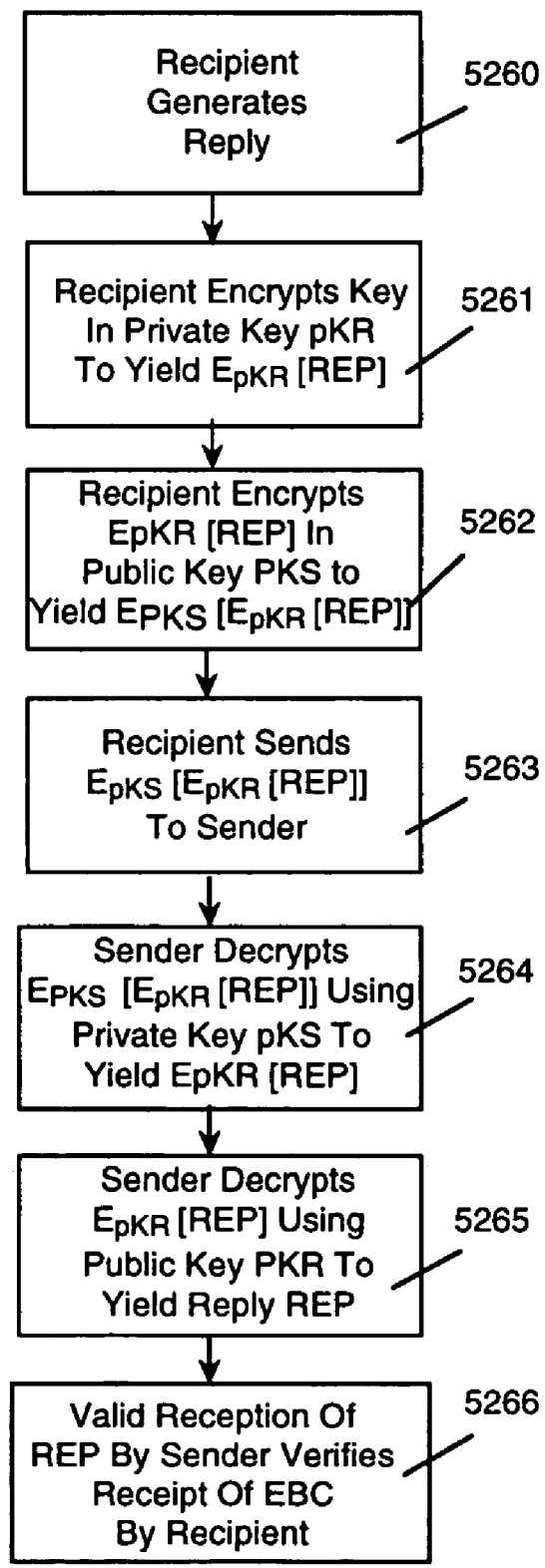
FIG. 33 depicts a reception verification sequence.

To ensure the publisher 282 that the electronic book content delivered to the operations center 250 was received, the operations center 250, serving the recipient 4999 in FIG. 33, may respond to the publisher 282, serving as the sender in FIG. 33, by first generating a reply message REP as shown in reply generation step 5260. The operations center 250 then encrypts reply message REP in the operations center's private key pKR using encryption process $E_{pKR}$, resulting in $E_{pKR}$[REP], as shown in encryption step 5261. The operations center 250 then encrypts $E_{pKR}$[REP] in the publisher's public key PKS using encryption process $E_{PKS}$, resulting in $E_{pKS}$[$E_{PKR}$[REP]], as shown in encryption step 5262. The operations center sends $E_{pKS}$[$E_{PKR}$[REP]] to the publisher, as shown in sending step 5263. The publisher 282 then decrypts $E_{pKS}$[$E_{PKR}$[REP]], using decryption process $D_{pKS}$ and the publisher's private key pKS, resulting in $E_{pKR}$[REP] as shown in decruption step 5264. The publisher 282 then decrypts the resulting $E_{pKR}$[REP] using decryption process $D_{PKR}$ and the operations center's public key PKR, as shown in decryption step 5265. As shown in verification step 5266, the valid reception of reply message REP by publisher 282 serves as verification of receipt of the electronic book content delivered to the operations center 250 by the publisher 282.

In another embodiment, the ISO two-way authentication protocol framework, as defined in ISO standard X.509 is used to provide verification of receipt of electronic book content by the operations center 250.

Exchanging encryption key information between the publisher 282 and the operations center 250 may be done using communication networks. Alternatively, encryption key distribution may be accomplished by storing the encryption key information on a smart card, PCMCIA card device, CD ROM, or other portable memory storage device and delivering the device to the appropriate location for retrieval and use in future encryption and decryption activities. When the key is delivered in physical form, the key may have associated with it a valid time period of use. Once this period has expired, a new key is required. Alternatively, the device may support the capability to be updated remotely via a communication network.

Encryption, decryption, hashing, digital signature processing, formatting, compression, key management, and other security related activities presented herein that are performed by the publisher 282 or the operations center 250 may be done in hardware using a specialized processor. In an alternate embodiment, security related activities may be done in software via a standard or secure processor. In yet another alternative, a portion of security related activities may be done in software using a standard or secure processor while the remaining portion done in hardware via a specialized processor.

Figure 34:
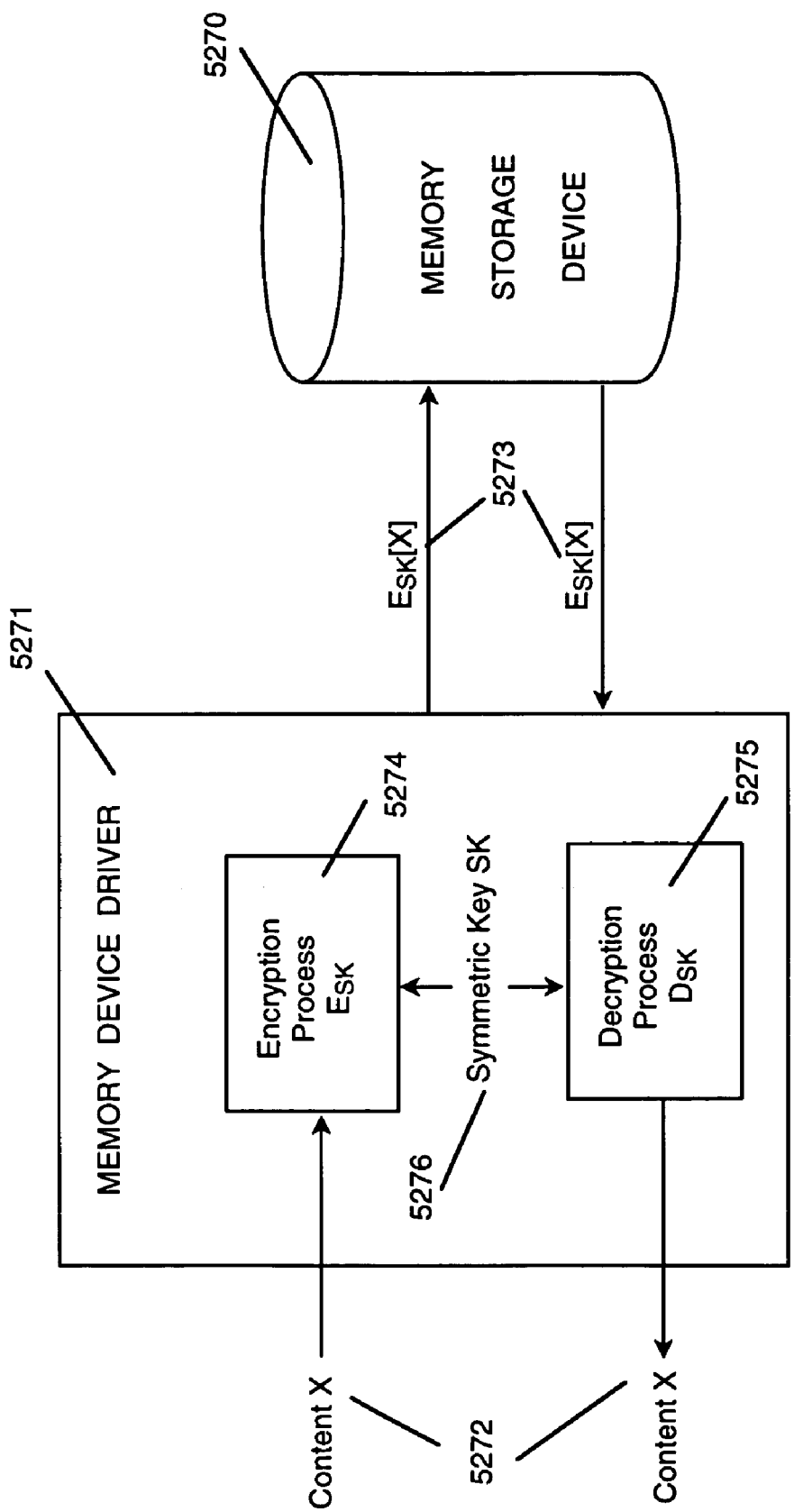
FIG. 34 depicts driver level secure storage.

Once electronic book content is received and decrypted by the operations center 250, the operations center 250 may encrypt the electronic book content EBC with a symmetric key algorithm and store the encrypted electronic book content along with any non-encrypted content associated with the electronic book in storage memory device 5270 at the operations center 250. In one embodiment, depicted in FIG. 34, secure storage is done on a memory device at the driver-level, where all information stored on the memory storage device 5270 is encrypted by a memory device driver prior to being stored on memory storage device 5270, as described in Applied Cryptography, by Bruce Schneier and hereby incorporated by reference. In this embodiment, any content X 5272 to be stored on the memory storage device 5270, including electronic book content, is encrypted using encryption process $E_{SK}$ 5274 in memory device driver 5271 and a symmetric key SK 5276, resulting in encrypted content $E_{SK}$[X] 5273. The encrypted content $E_{SK}$[X] 5273 is then stored on memory storage device 5270. Upon retrieval from the memory storage device 5270, decryption process $D_{SK}$ 5275 decrypts encrypted content $E_{SK}$[X] 5273 with symmetric key SK 5276, resulting in the original content X 5272. In another embodiment, secure storage is done at the file level, also as described in Applied Cryptography, by Bruce Schneier, where each file is encrypted individually with a different symmetric key prior to storage and stored in its encrypted form on memory storage device 5270. The symmetric key SK 5276 can then be stored separate from the stored encrypted content X 5272. In one such embodiment, encryption is done in hardware using a specialized encryption processor. In an alternate embodiment, encryption is done in software using a standard or secure processor.

Figure 35:
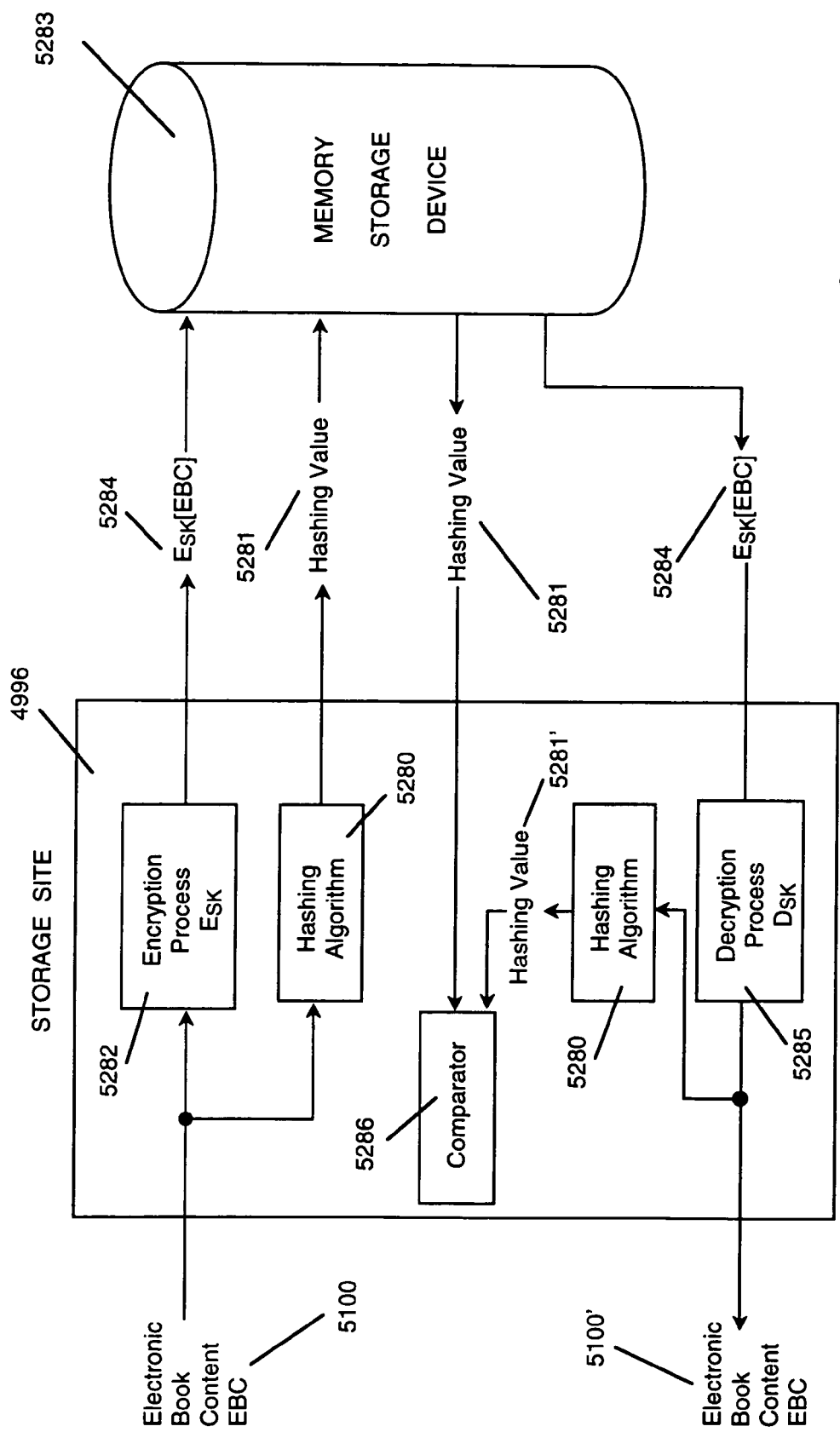
FIG. 35 depicts file level secure storage.

To ensure the electronic book content file has not been modified while it was stored, in one embodiment, depicted in FIG. 35, the operations center 250, serving as the storage site 4996, uses a one-way hashing algorithm 5280, as presented in Applied Cryptography, by Bruce Schneier and hereby incorporated by reference, where a hashing value 5281 is calculated by the operations center 250 based on the electronic book content EBC 5100 prior to encryption process 5282. The hashing value 5281, along with encrypted content $E_{SK}$[EBC] 5284 is then stored on memory storage device 5283. When the encrypted content $E_{SK}$[EBC] 5284 is retrieved from storage, the operations center 250 decrypts encrypted content $E_{SK}$[EBC] 5284 using decryption process DSK 5285 and retrieves the stored hashing value 5281. The operations center 250 then calculates a hashing value 5281', using the hashing algorithm 5280 and the retrieved electronic book content EBC 5100. Comparator 5286 compares the hashing value 5281 to the hashing value 5281' to determine if they coincide. If hashing value 5281 and the hashing value 5281' coincide, the integrity of the electronic book content EBC 5100 retrieved for memory storage device 5283 can be ensured.

B. Operations Center to Home System Security

The operations centers 250 can deliver their electronic book content to home systems 258 via a secured mechanism. In one embodiment, an asymmetric public key encryption technique is used, as described in Contemporary Cryptography, edited by Gustavus Simmons, published by IEEE Press in 1992, and hereby incorporated by reference. Public key algorithms used may include the Merkle-Hellman Knapsacks technique, as described in U.S. Pat. No. 4,218,582, the RSA technique, as described in U.S. Pat. No. 4,405,829, the Pohlig-Hellman technique, as described in U.S. Pat. No. 4,424,414, the Schnorr Signatures technique, as described in U.S. Pat. No. 4,995,082, or any other public key technique.

Figure 20:
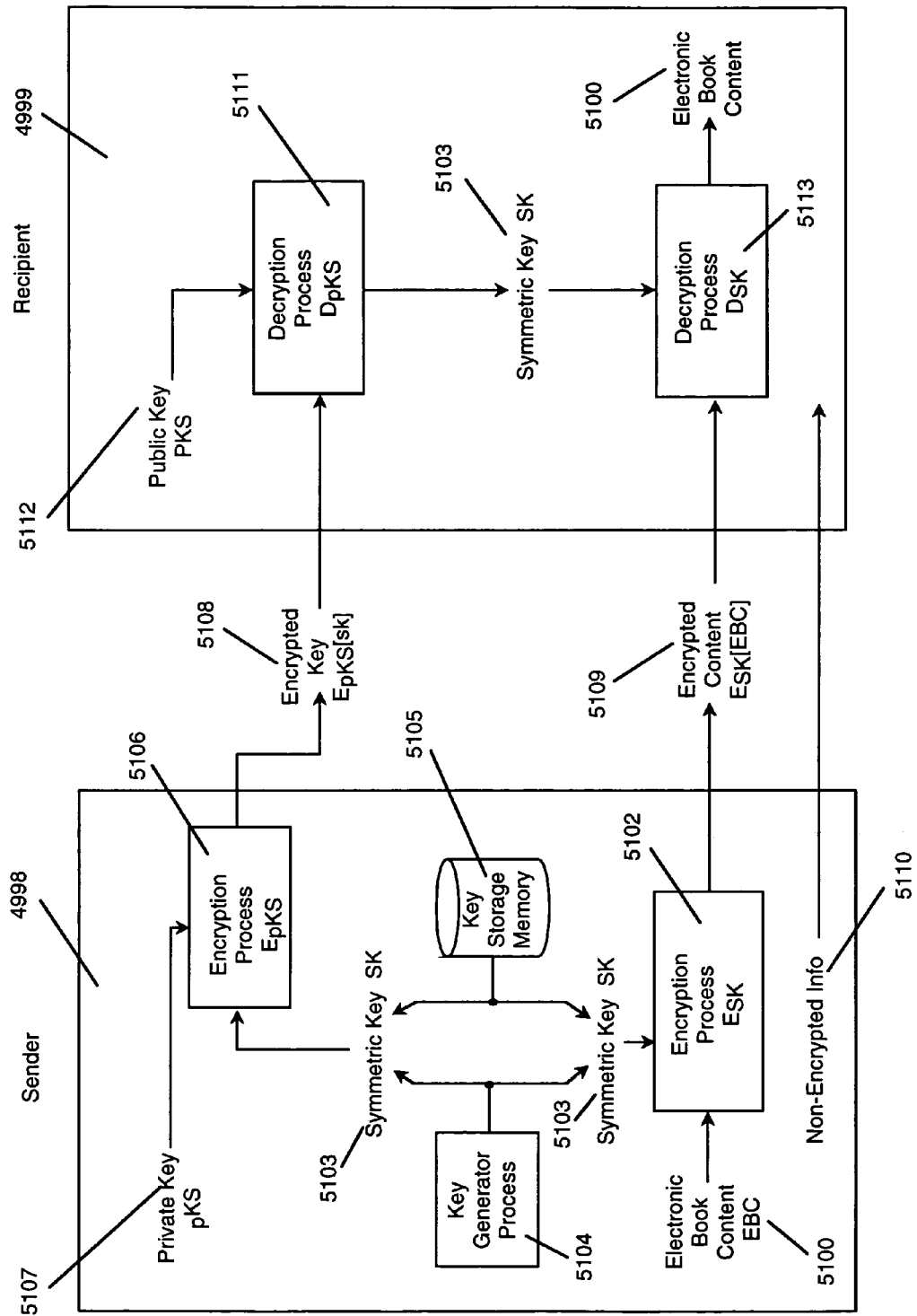
FIG. 20 is a depiction of public key encryption for electronic book distribution.

In this embodiment, depicted in FIG. 20, the operations center 250, serving as the sender 4998, first encrypts the electronic book content EBC 5100 destined for the home system 258, serving as the recipient 4999, and using a symmetric key encryption process $E_{SK}$ 5102, using DES, PKZIP, BLOWFISH, or any other symmetric encryption algorithm, resulting in encrypted content $E_{SK}$[EBC] 5109. The encryption process $E_{SK}$ 5102 uses a symmetric key SK 5103 either randomly generated by a key generator process 5104 or previously defined and retrieved from key storage memory 5105. Then, the operations center 250 encrypts the symmetric key SK 5103 with private key encryption process $E_{pKS}$ 5106 using the operations center's private key pKS 5107, resulting in encrypted key $E_{pKS}$[SK] 5108. Then, the operations center 250 packages encrypted key $E_{pKS}$[SK] 5108, encrypted content $E_{SK}$[EBC] 5109 and non-encrypted information 5110 related to the electronic book or the exchange and delivers the package to the home system 258. Using decryption process $D_{PKS}$ 5111 and the operations center's public key PKS 5112, the home system 258 decrypts the encrypted key $E_{pKS}$[SK] 5108 and uses the recovered symmetric key SK 5103 to decrypt the encrypted content $E_{SK}$[EBC] 5109 using decryption process $D_{SK}$ 5113.

In an alternate embodiment, depicted in FIG. 21, only symmetric key encryption is used, with a certificate authority 4997. The certificate authority 4997, a trusted source, provides a symmetric key to the operations center 250, serving as the sender 4998, and to the home system 258, serving as the recipient 4999. The certificate authority 4997 may be an existing commercial entity such as Entrust or Verisign or a private entity established for the sole purpose of electronic book secure distribution. The operations center 250 contacts the certificate authority 4997, sending the request 5120 for the transaction symmetric key SKT 5121 to be used during the transaction. The certificate authority 4997 either randomly generates the transaction symmetric key SKT 5121 by using the key generator process 5124 or retrieves the previously defined transaction symmetric key SKT 5121 from key storage memory 5125. The transaction symmetric key SKT 5121 is encrypted by the certificate authority 4997 using the symmetric key encryption process $E_{SKS}$ 5123 using the operations center's symmetric key SKS 5122.

The resulting encrypted symmetric key $E_{SKS}$[SKT] 5126 is delivered by the certificate authority 4997 to the operations center 250. The operations center 250 decrypts the encrypted symmetric key $E_{SKS}$[SKT] 5126 using decryption process $D_{SKS}$ 5127 and using the operations center's symmetric key SKS 5122 to recover the transaction symmetric key SKT 5121. The operations center 250 then uses the recovered transaction symmetric key SKT 5121 received from the certificate authority 4997 to encrypt the electronic book content EBC 5100 using encryption process $E_{SKT}$ 5128, resulting in encrypted content $E_{SKT}$[EBC] 5129. The operations center 250 delivers the encrypted content $E_{SKT}$[EBC] 5129 to the home system 258. The transaction symmetric key SKT 5121 is also encrypted by the certificate authority 4997 using symmetric key encryption process $E_{SKR}$ 5131 and the home system's symmetric key SKR 5130. The resulting encrypted symmetric key $E_{SKR}$[SKT] 5132 is delivered by the certificate authority 4997 to the home system 258. The home system 258 decrypts the encrypted symmetric key $E_{SKR}$[SKT] 5132 using decryption process $D_{SKR}$ 5133 and using the home system's symmetric key SKR 5130 to recover the transaction symmetric key SKT 5121. The home system 258 then uses the recovered transaction symmetric key SKT 5121 received from the certificate authority 4997 to decrypt the encrypted content $E_{SKT}$[EBC] 5129 using decryption process $D_{SKT}$ 5134, resulting in the unencrypted electronic book content 5100.

In yet another embodiment, depicted in FIG. 22, the operations center 250, acting as the sender 4998, generates a transaction symmetric key SKT 5140. The operations center 250 either randomly generates the transaction symmetric key SKT 5140 by using the key generator process 5141 or retrieves the previously defined transaction symmetric key SKT 5140 from key storage memory 5142. The operations center 250 encrypts the electronic book content EBC 5100 using encryption process $E_{SKT}$ 5143 and the transaction symmetric key SKT 5140, and delivers the encrypted content $E_{SKT}$[EBC] 5144 to the home system 258, acting as the recipient 4999.

The operations center 250 encrypts the transaction symmetric key SKT 5140 using encryption process $E_{SKS}$ 5145 and the operations center's symmetric key SKS 5146 that the operations center 250 shares with a third party certificate authority 4997 and delivers the encrypted transaction symmetric key $E_{SKS}$[SKT] 5147 to the third party certificate authority 4997. The certificate authority 4997 decrypts the encrypted transaction symmetric key $E_{SKS}$[SKT] 5147 using decryption process $D_{SKS}$ 5148 and the operations center's symmetric key SKS 5146. The home system 258 may contact the certificate authority 4997 using request 5149 to obtain the transaction symmetric key SKT 5140. Prior to the certificate authority 4997 delivering the needed transaction symmetric key 5140 to the home system 258, the home system 258 may be required to complete a financial transaction with the certificate authority 4997, paying for the electronic book content first. The certificate authority 4997 then encrypts the transaction symmetric key SKT 5140 using encryption process $E_{SKR}$ 5150 and the home system's symmetric key SKR 5151 that the certificate authority 4997 shares with the home system 258, and delivers the encrypted symmetric key $E_{SKR}$[SKT] 5152 to the home system 258. The home system 258 decrypts the encrypted symmetric key $E_{SKR}$[SKT] 5152 using decryption process $D_{SKR}$ 5153 and the home system's symmetric key SKR 5151, and uses the recovered transaction symmetric key SKT 5140 to decrypt the encrypted content $E_{SKT}$[EBC] using decryption process $D_{SKT}$ 5154, resulting in electronic book content EBC 5100.

In another embodiment, depicted in FIG. 23a, the operations center 250, serving as the sender 4998, encrypts the entire transaction stream TS 5165 between the operations center 250 and the home system 258, serving as the recipient 4999. To do so, the operations center 250 may use the sender private key pKS 5160 and encryption process $E_{pKS}$ 5161 to encrypt the transaction stream TS 5165, resulting in encrypted transaction stream $E_{pKS}$[TS] 5162. In this embodiment, the home system 258 uses decryption process $D_{PKS}$ 5164 and sender public key PKS 5163 to decrypt the encrypted transaction stream $E_{pKS}$[TS] 5162.

Figure 23B:
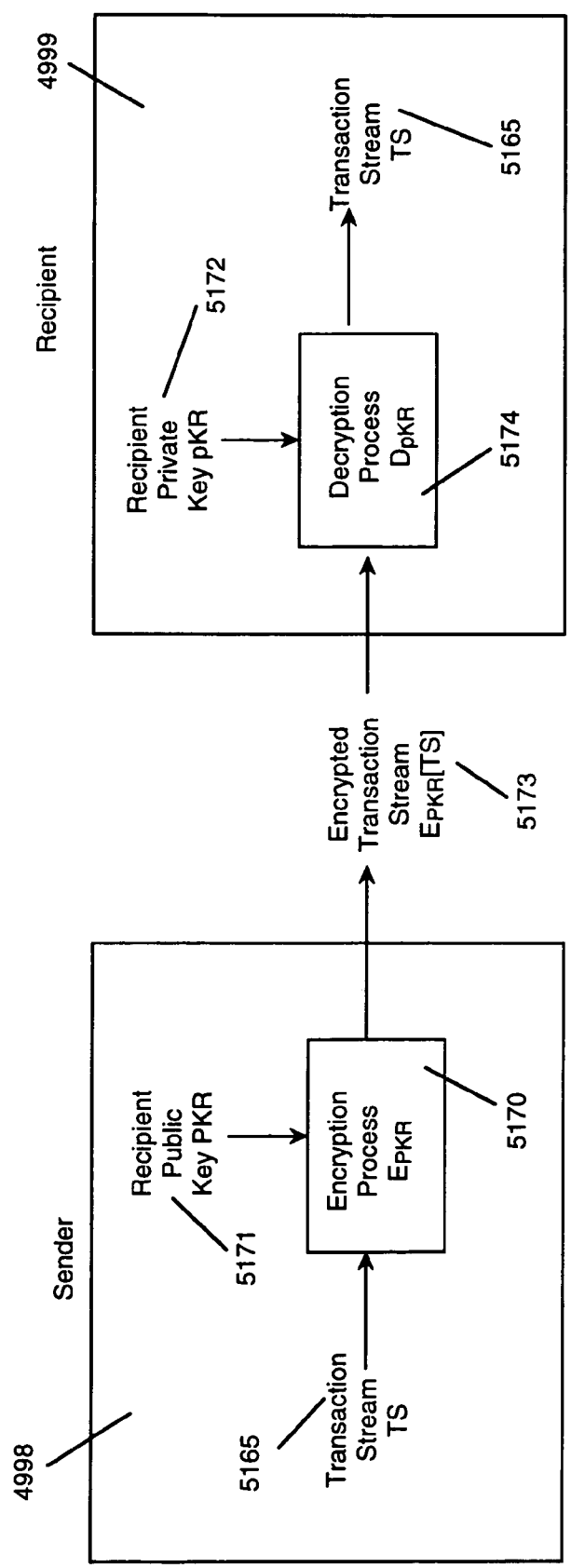
FIG. 23b is a diagram depicting asymmetric encryption using a public key for an entire transaction stream.

In another embodiment, depicted in FIG. 23b, the operations center 250, serving as sender 4998, may use the public key of the home system 258, serving as the recipient 4999, to encrypt the transaction stream TS 5165. To do so, the operations center 250 may use the recipient public key PKR 5171 and encryption process $E_{PKR}$ 5170 to encrypt the transaction stream TS 5165, resulting in encrypted transaction stream $E_{PKR}$[TS] 5173. In this embodiment, the home system 258 uses decryption process $D_{PKR}$ 5174 and recipient private key pKR 5172 to decrypt the encrypted transaction stream $E_{PKR}$[TS] 5173. In another embodiment, depicted in FIG. 23c, the operations center 250, serving as sender 4998, may use a transaction symmetric key SKT 5181 that both the operations center 250 and the home system 258 have stored in advance of the transaction to encrypt the transaction stream TS 5165. In this embodiment, the operations center 250 uses encryption process $E_{SKT}$ 5180 and transaction symmetric key SKT 5181 to generate encrypted transaction stream $E_{SKT}$[TS] 5182. The home system 258 uses decryption process $D_{SKT}$ 5183 and transaction symmetric key SKT 5181 to decrypt encrypted transaction stream $E_{SKT}$[TS] 5182, resulting in transaction stream TS 5165.

In another embodiment, depicted in FIG. 24a, the operations center 250, serving as the sender 4998, and the home system 258, serving as the recipient 4999, initiate the transaction by negotiating a shared key to use for the transaction, using, for example, the Elliptic Curve Diffie-Hellman key exchange algorithm, as described in U.S. Pat. No. 4,200,700, to generate the shared transaction symmetric key. Key negotiation information 5190 is exchanged between key generation algorithms 5191 operated by both the operations center 250 and the home system 258. As a result of the negotiation process, the operations center's key generator algorithm 5191 generates the transaction symmetric key SKT 5193 and the home system's key generator algorithm 5192 generates the transaction symmetric key SKT 5193.

The operations center 250 encrypts the electronic book content EBC 5100 using encryption process $E_{SKT}$ 5194 and the shared transaction symmetric key SKT 5193 and delivers the resulting encrypted content $E_{SKT}$[EBC] 5195 to the home system 258. The home system 258 uses the shared transaction symmetric key SKT 5193 and decryption process DSKT 5196 to decrypt the encrypted content $E_{SKT}$[EBC] 5195.

Figure 24B:
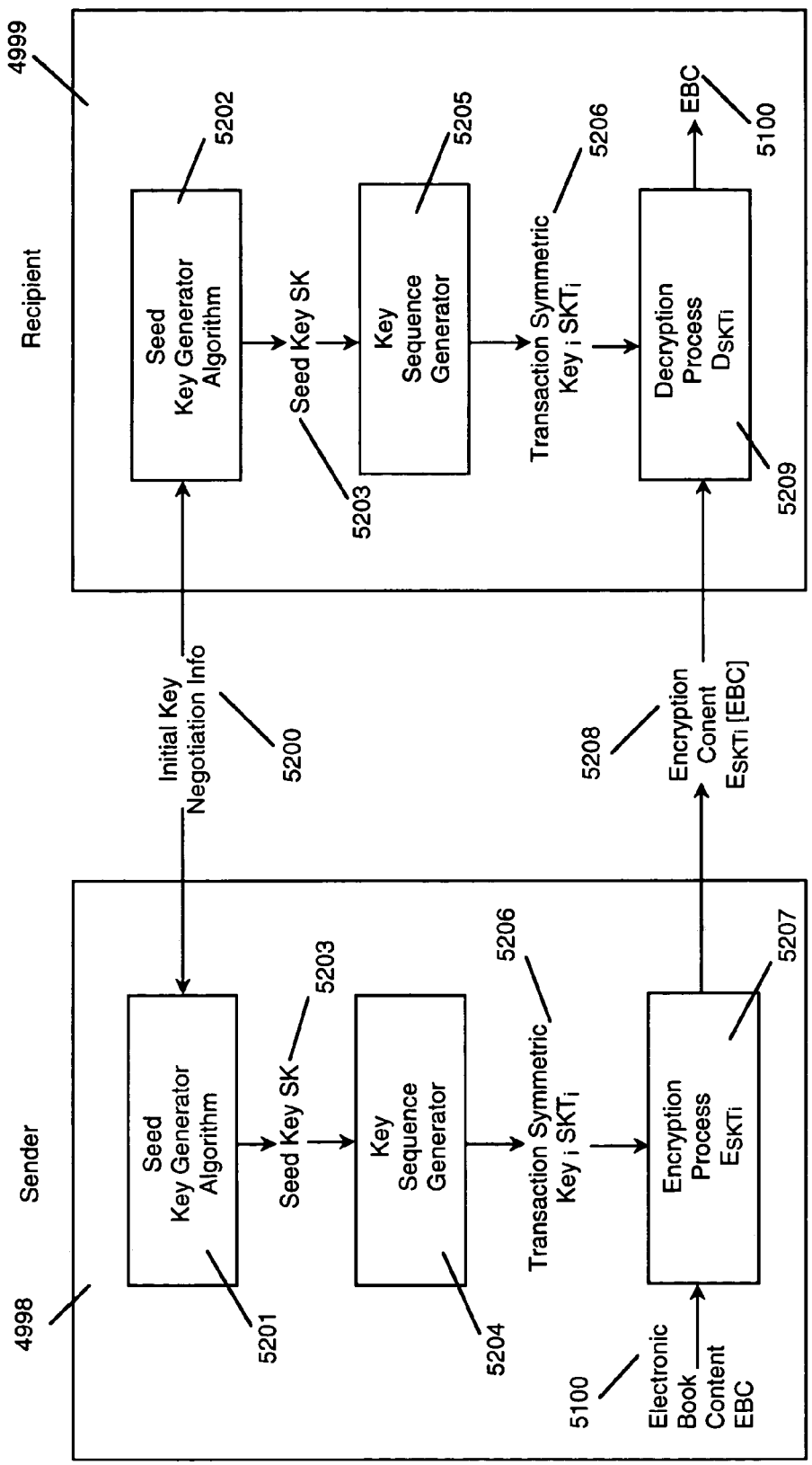
FIG. 24b depicts seed key negotiation process.

In a different embodiment, depicted in FIG. 24b, the operations center 250 serves as the sender 4998 and home system 258 serves as the recipient 4999. Initial key negotiation information 5200 is exchanged between the seed key generation algorithm 5201 at the operations center 250 and the seed key generation algorithm 5202 at the home system 258. As a result, the seed key generation algorithm 5201 at the operations center 250 and the seed key generation algorithm 5202 at the home system 258 each generate seed key SK 5203 using, for example, the Elliptic Curve Diffie-Hellman key exchange algorithm, as described in U.S. Pat. No. 4,200,700. Seed key 5203 is then used by key sequence generator 5204 at the operations center 250 site to generate the first in a sequence of keys, transaction symmetric key $S_{KTi}$ 5206. Similarly, seed key 5203 is used by key sequence generator 5205 at the home system 258 to generate the identical sequence of keys, beginning with transaction symmetric key $S_{KTi}$ 5206.

The operations center 250 encrypts the electronic book content EBC 5100 using encryption process $E_{SKTi}$ 5207 and the shared transaction symmetric key $S_{KTi}$ 5206 and delivers the resulting encrypted content $E_{SKTi}$[EBC] 5208 to the home system 258. The home system 258 uses the transaction symmetric key $S_{KTi}$ 5206 and decryption process DSKTi 5209 to decrypt the encrypted content $E_{SKTi}$[EBC] 5206. The operations center 250 key sequence generator 5204 and home system 258 key sequence generator 5205 continue to generate matching transaction symmetric keys for use in encrypting each subsequent transaction between the operations center 250 and the home system 258.

The operations center 250 may deliver the electronic book content to multiple home systems. In one embodiment, the operations center 250 delivers the electronic book content to each home system 258 independently using one of the embodiments contained herein. In an alternative embodiment, the operations center 250 may broadcast the electronic book content to multiple home systems simultaneously.

In one embodiment used for broadcasting, depicted in FIG. 25a, the operations center 250, serving as the sender 4998, encrypts the electronic book content EBC 5100 using encryption process $E_{SKT}$ 5211 and transaction symmetric key SKT 5210, resulting in encrypted content $E_{SKT}$[EBC] 5217. The transaction symmetric key SKT 5210 is then encrypted using public key encryption process $E_{PKA}$ 5212 and public key PKA 5213 for recipient A 4999, the first home system 258 to receive the electronic book content, resulting in encrypted key $E_{PKA}$[SKT] 5218. The transaction symmetric key SKT 5210 is then encrypted using public key encryption process $E_{PKB}$ 5212' and public key PKB 5213' for recipient B 4999', the second home system 258 to receive the electronic book content, resulting in encrypted key $E_{PKB}$[SKT] 5218'. This is repeated for each of the home systems 258 receiving the electronic book content. The encrypted content $E_{SKT}$[EBC] 5217, along with the encrypted keys 5218, 5218', and 5218", are delivered to all the receiving home systems 258. Each home system 258 uses its own private key to decrypt the transaction symmetric key SKT 5210. For example, recipient A 4999 uses decryption process $D_{pKA}$ 5214 and private key pKA 5216 to decrypt the encrypted key $E_{PKA}$[SKT] 5218, recovering the transaction symmetric key SKT 5210. Decryption process $D_{SKT}$ 5215 is then used to decrypt encrypted content $E_{SKTi}$[EBC] 5217 using transaction symmetric key SKT 5210.

In another embodiment, depicted in FIG. 25b, home systems may be assigned to predefined groups. Prior to the distribution of electronic book content EBC 5100 by operations center 250, serving as the sender 4998, for each defined group, a group symmetric key SKG 5220 is created and distributed by the operations center 250 to each home system 258, serving as recipients 4999, 4999' and 4999" within the group.

When the operations center 250 sends electronic book content EBC 5100 to a pre-defined group of home systems 258, the operations center 250 encrypts the electronic book content EBC 5100 using encryption process $E_{SKG}$ 5221 and the group symmetric key SKG 5220 pre-defined for that group and delivers the encrypted content $E_{SKG}$[EBC] to all the home systems in the group. Recipients 4999, 4999', and 4999" use decryption process $D_{SKG}$ 5223 and the group symmetric key SKG 5220 for that group to which they are assigned to decrypt the encrypted content $E_{SKG}$[EBC].

To ensure that the electronic book content delivered by the operations center 250 to the home system 258 was not altered in route, integrity checking algorithms may be employed. In one embodiment, depicted in FIG. 26, the operations center 250, serving as the sender 4998, uses a one-way hashing algorithm 5231, as presented in Applied Cryptography, by Bruce Schneier, published by John Wiley & Sons, Inc. in 1996, and hereby incorporated by reference, where a hashing value 5232 is calculated by the operations center 250 based on the electronic book content file 5230 as an input. This resulting hashing value 5232, along with the actual encrypted electronic book file 5237 that has been encrypted by the operations center 250 via encryption process 5235 is delivered to the home system 258, serving as the recipient 4999.

The home system 258 decrypts the encrypted electronic book file 5237 using decryption process 5236 to recover the electronic book content file 5230'. The home system 258 then uses the hashing algorithm 5231 with the electronic book content file 5230' as input to generate a hashing value 5232', which is compared to the hashing value 5232 delivered with the encrypted electronic book file 5237. If the hashing value 5232' calculated by the home system 258 coincides with the hashing value 5232 delivered by the operations center 250 as determined by comparator 5233, the integrity of the electronic book content file 5230' can be ensured.

To identify the operations center 250 delivering the electronic book and to guarantee non-repudiation, i.e., that the operations center 250 cannot deny that the electronic book was sent, the operations center 250 and home system 258 may use an authentication method. In one embodiment, the Digital Signature Algorithm (DSA) is used, as described in U.S. Pat. No. 5,231,668, and hereby incorporated by reference. In another embodiment, the operations center 250 uses a password as an identifier. This password may be delivered along with the electronic book content to authenticate the operations center 250. The home system 258 compares this password with the password the home system 258 has for the operations center 250. If the passwords match, the source of the electronic book content, i.e., the operations center 250, is verified.

In yet another embodiment, public key encryption is used as a digital signature to authenticate the operations center 250 as the sender. The operations center 250 encrypts the electronic book content using the operations center's private key pKS. When the home system 258 correctly decrypts the encrypted electronic book content with the operations center's public key PKS, the identity of the operations center 250 is authenticated since only the operations center 250 has access to the operations center's private key pKS used to encrypt the electronic book content.

In another embodiment, depicted in FIG. 27, upon initiation of the transaction, the operations center 250, serving as the sender 4998, notifies the home system 258, serving as the recipient 4999, of the operations center's intention to deliver electronic book content to the home system 258. This notification may be in the form of delivery notification message 5240. The home system 258 then encrypts a randomly generated message RGM generated by the home system 258 using encryption process EpKR and the home system's private key pKR and sends the resulting $E_{pKR}$[RGM] 5241 to the operations center 250. The operations center 250 decrypts $E_{pKR}$[RGM] 5241 using decryption process $D_{PKR}$ and the home system's public key PKR. The operations center 250 then encrypts the electronic book content EBC, along with the randomly generated message RGM received from the home system 258 using encryption process $E_{pKS}$ and the operations center's private key pKS and sends the resulting $E_{pKS}$[EBC,RGM] 5242 to the home system 258. The home system 258 decrypts $E_{pKS}$[EBC, RGM] 5242 using decryption process $D_{PKS}$ and the operations center's public key PKS. If the randomly generated message RGM received from the operations center 250 coincides with the randomly generated message RGM that the home system 258 originally sent to the operations center 250, the operations center's identity is verified.

In another embodiment, the ISO one-way authentication protocol framework, as defined in ISO standard X.509 is used to provide authentication of the operations center's identity.

The home system 258 may initiate the transaction with the operations center 250 by requesting that an electronic book be delivered from the operations center 250 to the home system 258. To validate the identity of the home system 258, the operations center 250 and home system 258 may use any of the above authentication method embodiments. In one embodiment, the Digital Signature Algorithm (DSA) is used, as described in U.S. Pat. No. 5,231,668, and hereby incorporated by reference.

In another embodiment, the home system 258 uses a password as an identifier. This password is delivered along with the electronic book request to authenticate the home system 258. The operations center 250, or the billing and collection system 278 operating on behalf of the operations center 250, compares this password with the password it has for the home system 258. If the password matches, the source of the electronic book request, i.e., the home system 258, is verified.

In yet another embodiment, public key encryption is used as a digital signature to authenticate the home system 258. The home system 258 encrypts the electronic book request using the home system's private key pKR and sends the encrypted request to the operations center 250, or the billing and collection system 278 operating on behalf of the operations center 250. When the operations center 250, or the billing and collection system 278 operating on behalf of the operations center 250 correctly decrypts the encrypted request with the home system's public key PKR, the identity of the home system 258 is authenticated since only the home system 258 has access to the home system's private key pKR used to encrypt the electronic book request.

In another embodiment, depicted in FIG. 28, upon initiation of the transaction, the home system 258, serving as the recipient 4999, notifies the operations center 250, serving as the sender 4998, of the home system's intention to request electronic book content from the operations center 250. This notification may be in the form of initial request message 5250. The operations center 250 then encrypts a randomly generated message RGM generated by the operations center 250 using encryption process EPKs and the operations center's private key pKS and sends the resulting $E_{pKS}$[RGM] 5251 to the home system 258. The home system 258 decrypts $E_{pKS}$[RGM] 5251 using decryption process DPKS and the operations center's public key PKS. The home system 258 then encrypts the electronic book request EBR, along with the randomly generated message RGM received from the operations center 250 using encryption process EpKR and the home system's private key pKR, and sends the resulting $E_{pKR}$[EBR,RGM] 5252 to the operations center 250. The operations center 250 decrypts $E_{pKR}$[EBR,RGM] 5252 using decryption process DPKR and the home system's public key PKR. If the randomly generated message RGM received from the home system 258 coincides with the randomly generated message RGM that the operations center 250 originally sent to the home system 258, the home system's identity is verified.

In another embodiment, the ISO one-way authentication protocol framework, as defined in ISO standard X.509 is used to provide authentication of the operations center's identity.

In yet another embodiment of electronic book content delivery from the operations center 250 to the home system 258, the home system 258 requests an electronic book from the operations center 250. The operations center 250 first authenticates the requesting home system 258. An embodiment of the authentication sequence is shown in FIG. 29, where the operations center 250 is serving as the sender 4998 and the home system 258 is serving as the recipient 4999. To authenticate a home system 258 requesting an electronic book from the operations center 250, an authentication sequence may be initiated by the home system 258. The authentication sequence begins with the home system 258 sending a request 5290 to the operations center 250 for a given electronic book content file 5300. The operations center 250 then responds to the home system 258 by generating and returning an authentication string 5291 to the home system 258. The home system 258 returns a message to the operations center 250 that contains: 1) a book identifier 5292, identifying the requested electronic book; 2) the signed authentication string 5293 that has been signed using a one-way hash function and then encrypted using the private key of the home system 258; and 3) home system 258 certification information 5294 that the operations center 250 can authenticate with the certificate authority 4997 (not shown in FIG. 29).

The operations center 250 then retrieves the requested encrypted electronic book, along with its associated unprotected metadata header 5301 and protected metadata header 5302 from storage. The operations center 250 decrypts the protected metadata header 5302 and validates that the protected metadata header 5302 has not been altered by performing a one-way hash function on the protected metadata header 5302 and comparing the result to the hash value contained in the protected metadata header 5302. If the protected metadata header 5302 was stored unencrypted, the operations center 250 retrieves the encrypted electronic book, along with its associated unprotected metadata header 5301 and protected metadata header 5302 from storage and validates the protected metadata header 5302 using a one-way hashing function. The operations center 250 then modifies the fields of the unprotected metadata header 5301 and protected metadata header 5302 based on the home system 258 request and the rules established by the publisher 282 and the operations center 250 for electronic book use. The operations center 250 may then encrypt the entire protected metadata header 5302 or some portion of the protected metadata header 5302 using the public key of the home system 258 or a predetermined symmetric key known by both the operations center 250 and the home system 258. The packaged electronic book with metadata headers may then be delivered to home system 258 or the home system 258 may retrieve the packaged electronic book from the operations center 250.

Upon receipt of the packaged electronic book, along with metadata headers 5301 and 5302, by the home system 258, the home system 258 may decrypt the protected metadata header 5302, validate that the protected metadata header 5302 has not been altered by performing a one-way hash calculation on the protected metadata header 5302 and comparing the result to the hash value 5305 contained in the protected metadata header 5302, and re-encrypt the protected metadata header 5302 for storage, or store the received packaged electronic book directly without decrypting the protected metadata header 5302. When the electronic book is opened for display on the viewer 266, the viewer 266 decrypts the protected metadata header 5302 using the decryption key, recovers the content decryption key, and decrypts the electronic book content for display on the viewer. Processing and storage of the decryption and encryption keys used on the protected metadata header 5302 at the home system 258 may be done entirely via software, entirely on a secure smart card or removable device, or some combination of the two.

In still another embodiment, an operations center 250, or third party electronic book formatter, converts the electronic book content and associated metadata into a deliverable format. The prepared electronic book file is then delivered to the home system 258, for example over the Internet using a secure socket layer (SSL) protected communication link. This exchange, depicted in FIG. 31, may be initiated by the home system 258, serving as the recipient 4999, sending a request message 5330 to the operations center 250, serving as the sender 4998, to deliver the requested electronic book content 5100 to the home system 258.

The request message 5330 may contain a login and password sequence that is used by the operations center 250 to initially validate the home system 258. Alternatively, or in addition, the operations center 250 may use the specific Internet Protocol (IP) address of the home system 258, included in the request message 5330, for validation purposes. In response, the operations center 250 may send a certificate 5331, which may include identifying information and the operations center's public key PKS, to the home system 258. The home system 258 verifies the certificate 5331 was issued by a trusted third party certificate authority 4997. The home system 258 compares the information in the certificate that is received from the trusted third party certificate authority 4997, including the operations center's identifying information and public key PKS.

The home system 258 then notifies the operations center 250 which encryption algorithms that the home system 258 can support using a supported algorithm message 5332. The operations center 250 selects an algorithm and notifies the home system 258 of the selection using a selected algorithm message 5333. The home system 258 generates a transaction symmetric key SKT 5334, encrypts the transaction symmetric key SKT 5334 using the public key PKS of the operations center 250 and the algorithm provided in the selected algorithm message 5333 and sends the resulting $E_{PKS}$[SKT] 5335 to the operations center 250. The operations center 250 decrypts $E_{PKS}$[SKT] 5335 using decryption process $D_{pKS}$ and the operations center's private key pKS. The transaction symmetric key SKT 5334 is then used to encrypt and decrypt the transaction between the operations center 250 and the home system 258.

Alternatively, an exchange, as depicted in FIG. 32, may be initiated by the operations center 250, serving as the sender 4998, by sending a request message 5340 to the home system 258, serving as the recipient 4999, that the operations center 250 wishes to deliver electronic book content to the home system 258.

The request message 5340 may contain a login and password sequence that may be used by the home system 258 to initially validate the operations center 250. Alternatively, or in addition, the home system 258 may use the specific IP address of the operations center 250, included in the request message 5340, for validation purposes. In response, the home system 258 sends a certificate 5341 to the operations center 250 that may include identifying information and the home system's public key PKR.

The operations center 250 verifies the certificate was issued by a trusted third party certificate authority 4997 (not shown in FIG. 32). The operations center 250 compares the information in the certificate 5341 which is received from the trusted third party certificate authority 4997, including home system's identifying information and public key PKR. The operations center 250 then notifies the home system 258 which encryption algorithms the operations center 250 can support using a supported algorithms message 5342. The home system 258 selects an algorithm and notifies the operations center 250 of the selection using a selected algorithm message 5434. The operations center 250 generates a transaction symmetric key SKT 5344, encrypts the transaction symmetric key SKT 5344 using the public key PKR of the home system 258 and the algorithm provided in the selected algorithm message 5343 and sends the resulting $E_{PKR}[SKT]$ 5345 to the home system 258. The home system 258 decrypts $E_{PKR}[SKT]$ 5345 using decryption process $D_{pKR}$ and the home system's private key pKR. The transaction symmetric key SKT 4344 is then used to encrypt and decrypt the transaction between the operations center 250 and the home system 258.

Once the electronic book content is received and decrypted by the home system 258, the home system 258 may store the electronic book file unencrypted or may re-encrypt the electronic book file for storage. Alternatively, the home system 258 may also compute a hash value of the electronic book file to be used for validation the integrity of the file when recovered from storage for delivery to a home system 258.

Figure 36:
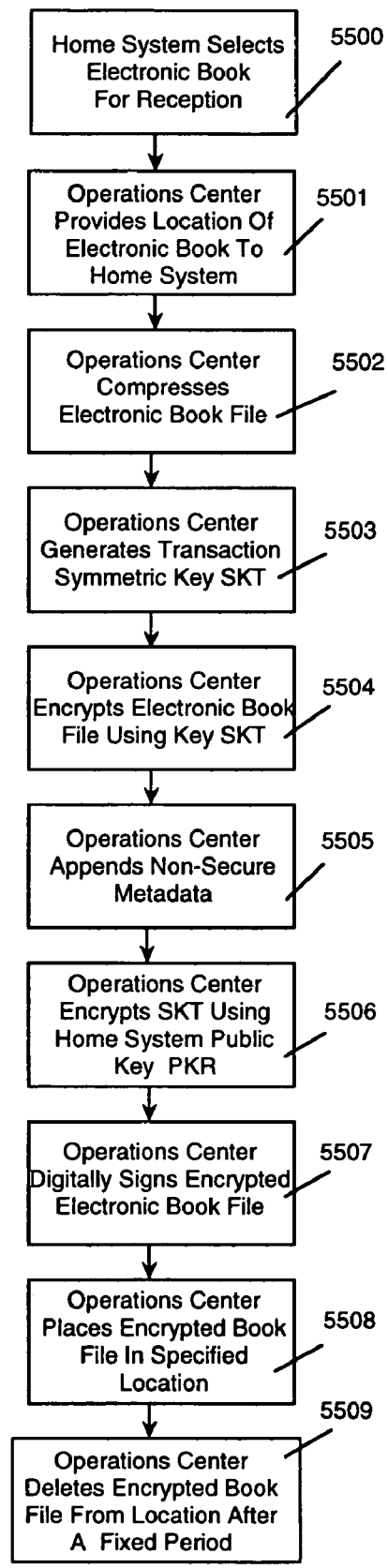
FIG. 36 depicts an operations center to home system delivery process.

In still another embodiment, depicted in FIG. 36, once an electronic book is selected by the home system 258, as shown in selection step 5500 and paid for, the operations center 250 is requested to initiate the delivery of the electronic book to the requesting home system 258. The home system 258, which may be a dedicated library 262 and viewer 266, or alternatively a personal computer serving the functions of the library system 262, along with a dedicated electronic book viewer 266, is provided with the location to obtain the requested electronic book file by the operations center 250, as shown in location step 5501. This location may be an Internet website or any other location accessible by the home system 258. The operations center 250 compresses the requested electronic book file, as shown in compression step 5502. The operations center 250 then generates a random transaction symmetric key SKT, as shown in key generation step 5503 and encrypts the compressed electronic book file using encryption process $E_{SKT}$ and the transaction symmetric key SKT, as shown in encryption step 5504. Non secure metadata is then appended to the compressed, encrypted electronic book file, as shown in appending step 5505. The transaction symmetric key SKT is then encrypted using the public key PKR of the requesting home system 258 and encryption process $E_{PKR}$, as shown in encryption step 5506. The encrypted electronic book file is then digitally signed as shown in signature step 5507, for example, using the algorithm presented in Applied Cryptography by Bruce Schneier, and the private key of the operations center 250 pKS and is placed in the location provided to the home system 258 for retrieval in distribution step 5508. The operations center 250 removes the electronic book file from the location after a fixed period if the electronic book file is not retrieved by the home system 258, as shown in removal step 5509.

The home system 258 retrieves the compressed, encrypted electronic book file from the specified location and stores the retrieved encrypted electronic book file for future viewing. Non secure metadata information is stored and used to identify and manage the encrypted electronic book files residing on the home system 259 for use by the viewer 266. The operations center 250 generates a public and private key pair PKR and pKR for the home system 258 and provides the home system 258 the generated private key pKR during an initial home system 258 registration process. During this initial home system 258 registration process, the operations center 250 also provides the home system 258 with the public key of the operations center 250, PKS.

In another embodiment, encrypted electronic book content $E_{SK}[EBC]$ 5515 is stored in compressed and encrypted format at the operations center 250 for access by requesting home systems 258. The symmetric key SK 5510 used to encrypt the electronic book content EBC 5512 is stored in protected memory at the operations center 250. In this embodiment, a home system 258, which may consist of a library 262 and viewer 266 or a standalone viewer 266, contacts the operations center 250 using any one of a number of communication means as presented in the co-pending U.S. patent application Ser. No. 09/289,957 titled ALTERNATIVE ELECTRONIC BOOK DELIVERY SYSTEMS and incorporated herein by reference, including direct dial-in by the viewer 266 using a PSTN.

Access to the operations center 250 by the home system 258 may be password protected where the home system 258 presents a password to the operations center 250 upon accessing the operations center 250. The password provided by the home system 258 must match a password the operations center 250 is expecting from a specific home system 258 for before the operations center 250 allows for the purchase of any electronic book content. A request message 5511 is sent by the home system 258 to the operations center 250 to purchase a specific electronic book EBC 5512. In this request message 5511, the home system 258 provides unique identifying information, including the home system 258 internal serial number. Once the requesting home system 258 is verified using the provided password and the identifying information provided in the request message 5511, the operations center 250 retrieves the stored symmetric key SK 5510 used to encrypt the requested electronic book from protected memory and encrypts symmetric key SK 5510 using encryption process $E_{SKS}$ 5512 and shared key SKS 5513.

The shared key SKS 5513 is obtained from the home system 258 during an initial home system 258 registration process and is stored by the operations center 250 after this initial registration process. The encrypted electronic book content $E_{SK}[EBC]$ 5515 and the encrypted key $E_{SKS}[SK]$

5514 are then moved to a location assigned to the requesting home system 258. Any encrypted electronic book and associated encrypted key residing in the home system's assigned location can then be selected and downloaded to the requesting home system 258 at any time. Other information shared by the operations center 250 and the home system 258, including the home system 258 unique internal serial number, is used to authenticate the validity of a requesting home system 258 prior to initiating the download of encrypted electronic book content to the home system 258. The operations center 250 obtains information about the home system 258, including the shared key SKS 5513 and internal serial number during an initial home system 258 registration process. Also, the operations center 250 provides the assigned location for the home system 258 to retrieve future electronic book content during this registration process.

Once the encrypted electronic book content $E_{SK}[EBC]$ 5515 and the encrypted key $E_{SKS}[SK]$ 5514 are downloaded to a home system 258, the home system 258 uses shared key SKS 5513 and decryption process $D_{SKS}$ to decrypt the encrypted key $E_{SKS}[SK]$ 5514 to recover the symmetric key SK 5510. The encrypted electronic book content $E_{SK}[EBC]$ 5515 or a portion thereof is then decrypted using the recovered symmetric key SK 5510 and decryption process $D_{SK}$ and the resulting electronic book content EBC 5512 is then decompressed for display on the viewer 266.

To ensure the operations center 250 that the electronic book content delivered to the home system 258 was received, the home system 258, serving as the recipient 4999 in FIG. 33, may respond to the operations center 250, serving as the sender in FIG. 33, by first generating a reply message REP as shown in step 5260. The home system 258 then encrypts reply message REP in the home system's private key pKR using encryption process $E_{pKR}$, resulting in $E_{pKR}[REP]$, as shown in step 5261. The home system 258 then encrypts $E_{pKR}[REP]$ in the operations center's public key PKS using encryption process $E_{PKS}$, resulting in $E_{pKS}[E_{pKR}[REP]]$, as shown in step 5262. The home system 250 sends $E_{PKS}[E_{pKR}[REP]]$ to the operations center 250, as shown in step 5263. The operations center 250 then decrypts $E_{pKS}[E_{PKR}[REP]]$, using decryption process $D_{pKS}$ and the operations center's private key pKS, resulting in $E_{pKR}[REP]$ as shown in step 5264. The operations center 250 then decrypts the resulting $E_{pKR}[REP]$ using decryption process $D_{PKR}$ and the home system's public key PKR, as shown in step 5265. As shown in step 5266, the valid reception of reply message REP by operations center 250 serves as verification of receipt of the electronic book content delivered to the home system 258 by the operations center 250.

In another embodiment, the ISO two-way authentication protocol framework, as defined in ISO standard X.509 is used to provide verification of receipt of electronic book content by the home system 258.

Exchanging encryption key information between the operations center 250 and home system 258 may be done using communication networks. Alternatively, encryption key distribution may be accomplished by storing the encryption key information on a smart card, PCMCIA card device, CD ROM, or other portable memory storage device and delivering the device to the appropriate location for retrieval and use in future encryption and decryption activities. When the key is delivered in physical form, the key may have associated with it a valid time period of use. Once this period has expired, a new key is required. Alternatively, the device may support the capability to be updated remotely via a communication network.

Encryption, decryption, hashing, digital signature processing, formatting, compression, key management, and other security related activities presented herein that are performed by the operations center 250 or the home system 258 may be done in hardware using a specialized processor. In an alternate embodiment, security related activities may be done in software using a standard or secure processor. In yet another alternative, a portion of security related activities may be done in software using a standard or secure processor while the remaining portion done in hardware via a specialized processor.

Once electronic book content is received and decrypted by the home system 258, the home system 258 may encrypt the electronic book content EBC 5100 with a symmetric key algorithm and may store the encrypted electronic book content along with any non-encrypted content associated with the electronic book in storage memory device 5270 at the home system 258. In one embodiment, depicted in FIG. 34, secure storage is done on a memory device at the driver-level, where all information stored on the memory storage device 5270 is encrypted by a memory device driver prior to being stored on memory storage device 5270, as described in Applied Cryptography, by Bruce Schneier and hereby incorporated by reference. In this embodiment, any content X 5272 to be stored on the memory storage device 5270, including electronic book content, is encrypted using encryption process ESK 5274 in the memory device driver 5271 and a symmetric key SK 5276, resulting in encrypted content $E_{SK}[X]$ 5273. The encrypted content $E_{SK}[X]$ 5273 is then stored on the memory storage device 5270. Upon retrieval from memory storage device 5270, decryption process $D_{SK}$ 5275 decrypts encrypted content $E_{SK}[X]$ 5273 with symmetric key SK 5276, resulting in the original content X 5272. In another embodiment, secure storage is done at the file level, also as described in Applied Cryptography, by Bruce Schneier, where each file is encrypted individually with a different symmetric key prior to storage and stored in its encrypted form on memory storage device 5270. The symmetric key SK 5276 can then be stored separate from the stored encrypted content X 5272. In one such embodiment, encryption is done in hardware using a specialized encryption processor. In an alternate embodiment, encryption is done in software using a standard or secure processor.

To ensure the electronic book content file has not been modified while it was stored, in one embodiment, depicted in FIG. 35, the home system 258, serving as the storage site 4996, uses a one-way hashing algorithm 5280, as presented in Applied Cryptography, by Bruce Schneier and hereby incorporated by reference, where a hashing value 5281 is calculated by the home system 258 based on the electronic book content EBC 5100 prior to encryption process 5282. The hashing value 5281, along with encrypted content $E_{SK}[EBC]$ 5284 is then stored on memory storage device 5283. When the encrypted content $E_{SK}[EBC]$ 5284 is retrieved from storage, the home system 258 decrypts encrypted content $E_{SK}[EBC]$ 5284 using decryption process $D_{SK}$ 5285 and retrieves the stored hashing value 5281. The home system 258 then calculates a hashing value 5281', using the hashing algorithm 5280 and the retrieved electronic book content EBC 5100. Comparator 5286 compares the hashing value 5281 to the hashing value 5281' to determine if they coincide. If the hashing value 5281 and the hashing value 5281' coincide, the integrity of the electronic book content EBC 5100 retrieved for memory storage device 5283 can be ensured.

The security methods described above may also be applied to the communications between an operations center 250 or cable headend and an upgraded cable set-top converter 601 that is configured to function as a library 262.

C. Library to Viewer Security

In one embodiment, the home system 258 combines the library 262 and viewer 266 functions into a single device. In another embodiment, the home system 258 includes two separate devices, a library 262 and a viewer 266. For this two device embodiment, all security processing required with the viewer 266 may be done entirely in the viewer 266. Alternatively, all security processing required with the viewer 266 may be done entirely in the library 262. When security processing between the home system 258 and the viewer 266 is done by the library 262, separate security processing may be implemented between the library 262 and the viewer 266. The library 262 can deliver electronic book content to the viewer 266 via a secured mechanism.

In one embodiment, an asymmetric public key encryption technique is used, as described in Contemporary Cryptography, edited by Gustavus Simmons, published by IEEE Press in 1992, and hereby incorporated by reference. Public key algorithms used may include the Merkle-Hellman Knapsacks technique, as described in U.S. Pat. No. 4,218,582, the RSA technique, as described in U.S. Pat. No. 4,405,829, the Pohlig-Hellman technique, as described in U.S. Pat. No. 4,424,414, the Schnorr Signatures technique, as described in U.S. Pat. No. 4,995,082, or any other public key technique.

In this embodiment, depicted in FIG. 20, the library 262, serving as the sender 4998, first encrypts the electronic book content EBC 5100 destined for the viewer 266, serving as the recipient 4999, using a symmetric key encryption process $E_{SK}$ 5102, and using DES, PKZP, BLOWFISH, or any other symmetric encryption algorithm, resulting in encrypted content $E_{SK}$[EBC] 5109. The encryption process $E_{SK}$ 5102 uses a symmetric key SK 5103 either randomly generated by a key generator process 5104 or previously defined and retrieved from key storage memory 5105. Then, the library 262 encrypts the symmetric key SK 5103 with private key encryption process $E_{pKS}$ 5106 using the library's private key pKS 5107, resulting in encrypted key EPKs[SK] 5108. Then, the library 262 packages encrypted key $E_{pKS}$ [SK] 5108, encrypted content $E_{SK}$[EBC] 5109 and non-encrypted information 5110 related to the electronic book or the exchange and delivers the package to the viewer 266. Using decryption process $D_{PKS}$ 5111 and the library's public key PKS 5112, the viewer 266 decrypts the encrypted key $E_{pKS}$[SK] 5108 and uses the recovered symmetric key SK 5103 to decrypt the encrypted content $E_{SK}$[EBC] 5109 using decryption process $D_{SK}$ 5113.

In another embodiment, depicted in FIG. 23a, the library 262, serving as the sender 4998, encrypts the entire transaction stream TS 5165 between the library 262 and the viewer 266, serving as the recipient 499. To do so, the library 262 may use the sender private key pKS 5160 and encryption process $E_{pKS}$ 5161 to encrypt the transaction stream TS 5165, resulting in encrypted transaction stream $E_{pKs}$[TS] 5162. In this embodiment, the viewer 266 uses decryption process $D_{PKS}$ 5164 and sender public key PKS 5163 to decrypt the encrypted transaction stream $E_{pKs}$[TS] 5162.

In another embodiment, depicted in FIG. 23b, the library 262, serving as the sender 4998, may use the public key of the viewer 266, serving as the recipient 4999, to encrypt the transaction stream TS 5165. To do so, the library 262 may use the recipient public key PKR 5171 and encryption process $E_{PKR}$ 5170 to encrypt the transaction stream TS 5165, resulting in encrypted transaction stream $E_{PKR}$[TS] 5173. In this embodiment, the viewer 266 uses decryption process $D_{pKR}$ 5174 and recipient private key pKR 5172 to decrypt the encrypted transaction stream $E_{PKR}$[TS] 5173. In another embodiment, depicted in FIG. 23c, the library 262, serving as sender 4998, may use a transaction symmetric key SKT 5181 that both the library 262 and the viewer 266 have stored in advance of the transaction to encrypt the transaction stream TS 5165. In this embodiment, the library 262 uses encryption process $E_{SKT}$ 5180 and transaction symmetric key SKT 5181 to generate encrypted transaction stream $E_{SKT}$[TS] 5182. The viewer 266 uses decryption process $D_{SKT}$ 5183 and transaction symmetric key SKT 5181 to decrypt encrypted transaction stream $E_{SKT}$[TS] 5182, resulting in transaction stream TS 5165.

In another embodiment, depicted in FIG. 24a, the library 262, serving as the sender 4998, and the viewer 266, serving as the recipient 4999, initiate the transaction by negotiating a shared key to use for the transaction, using, for example, the Elliptic Curve Diffie-Hellman key exchange algorithm, as described in U.S. Pat. No. 4,200,700, to generate the shared transaction symmetric key. Key negotiation information 5190 is exchanged between key generation algorithms 5191 operated by both the library 262 and the viewer 266. As a result of the negotiation process, the library's key generator algorithm 5191 generates the transaction symmetric key SKT 5193 and the viewer's key generator algorithm 5192 generates the transaction symmetric key SKT 5193.

The library 262 encrypts the electronic book content EBC 5100 using encryption process $E_{SKT}$ 5194 and the shared transaction symmetric key SKT 5193 and delivers the resulting encrypted content $E_{SKT}$[EBC] 5195 to the viewer 266. The viewer 266 uses the shared transaction symmetric key SKT 5193 and decryption process $D_{SKT}$ 5196 to decrypt the encrypted content $E_{SKT}$[EBC] 5195. In a different embodiment, depicted in FIG. 24b, the library 262 serves as the sender 4998 and viewer 266 serves as the recipient 4999. Initial key negotiation information 5200 is exchanged between the seed key generation algorithm 5201 at the library 262 and the seed key generation algorithm 5202 at the viewer 266. As a result, the seed key generation algorithm 5201 at the library 262 and the seed key generation algorithm 5202 at the viewer 266 each generate seed key SK 5203 using, for example, the Elliptic Curve Diffie-Hellman key exchange algorithm, as described in U.S. Pat. No. 4,200,700. Seed key 5203 is then used by key sequence generator 5204 at the library 262 site to generate the first in a sequence of keys, transaction symmetric key SKTi 5206.

Similarly, seed key 5203 is used by key sequence generator 5205 at the viewer 266 to generate the identical sequence of keys, beginning with transaction symmetric key $S_{KTi}$ 5206. The library 262 encrypts the electronic book content EBC 5100 using encryption process $E_{SKTi}$ 5207 and the shared transaction symmetric key $S_{KTi}$ 5206 and delivers the resulting encrypted content $E_{SKTi}$[EBC] 5208 to the viewer 266. The viewer 266 uses the transaction symmetric key $S_{KTi}$ 5206 and decryption process $D_{SKTi}$ 5209 to decrypt the encrypted content $E_{SKTi}$[EBC] 5206. The library 262 key sequence generator 5204 and viewer 266 key sequence generator 5205 continue to generate matching transaction symmetric keys for use in encrypting each subsequent transaction between the library 262 and the viewer 266.

To ensure that the electronic book content delivered by the library 262 to the viewer 266 was not altered in route, integrity checking algorithms may be employed. In one embodiment, depicted in FIG. 26, the library 262, serving as the sender 4998, uses a one-way hashing algorithm 5231, as presented in Applied Cryptography, by Bruce Schneier, published by John Wiley & Sons, Inc. in 1996, and hereby incorporated by reference, where a hashing value 5232 is calculated by the library 262 based on the electronic book content file 5230 as an input. This resulting hashing value 5232, along with the actual encrypted electronic book file 5237 that has been encrypted by the library 262 via encryption process 5235 is delivered to the viewer 266, serving as the recipient 4999.

The viewer 266 decrypts the encrypted electronic book file 5237 using decryption process 5236 to recover the electronic book content file 5230'. The viewer 266 then uses the hashing algorithm 5231 with the electronic book content file 5230' as input to generate a hashing value 5232', which is compared to the hashing value 5232 delivered with the encrypted electronic book file 5237. If the hashing value 5232' calculated by the viewer 266 coincides with the hashing value 5232 delivered by the library 262 as determined by comparator 5233, the integrity of the electronic book content file 5230' can be ensured.

To identify the library 262 delivering the electronic book, the library 262 and viewer 266 may use an authentication method. In one embodiment, the Digital Signature Algorithm (DSA) is used, as described in U.S. Pat. No. 5,231,668, and hereby incorporated by reference. In another embodiment, the library 262 uses a password as an identifier. This password may be delivered along with the electronic book content to authenticate the library 262 as the sender. The viewer 266 compares this password with the password the viewer 266 has for the library 262. If the passwords match, the source of the electronic book content, i.e., the library 262, is verified.

In yet another embodiment, public key encryption is used as a digital signature to authenticate the library 262. The library 262 encrypts the electronic book content using the library's private key pKS. When the viewer 266 correctly decrypts the encrypted electronic book content with the library's public key PKS, the identity of the library 262 is authenticated since only the library 262 has access to the library's private key pKS used to encrypt the electronic book content. In another embodiment, the ISO one-way authentication protocol framework, as defined in ISO standard X.509 is used to provide authentication of the library's identity.

A viewer 266 may initiate the transaction with the library 262 by requesting that an electronic book be delivered from the library 262 to the viewer 266. To validate the identity of the viewer 266, the library 262 and viewer 266 may use the above authentication method embodiments. In another embodiment, the Digital Signature Algorithm (DSA) is used, as described in U.S. Pat. No. 5,231,668, and hereby incorporated by reference. In another embodiment, the viewer 266 uses a password as an identifier. This password may be delivered along with the electronic book request to authenticate the viewer 266. The library 262 compares this password with the password the library unit 266 has for the viewer 266. If the passwords match, the source of the electronic book request, i.e., the viewer 266, is verified.

In yet another embodiment, public key encryption is used as a digital signature to authenticate the viewer 266. The viewer 266 encrypts the electronic book request using the viewer 266 private key pKR and send the encrypted request to the publisher 282. When the publisher 282 correctly decrypts the encrypted request with the viewer's public key PKR, the identity of the viewer 266 is authenticated since only the viewer 266 has access to the viewer's private key pKR used to encrypt the electronic book request.

In another embodiment, depicted in FIG. 28, upon initiation of the transaction, the viewer 266, serving as the recipient 4999, notifies the library 262, serving as the sender 4998, of the viewer's intention to request electronic book content from the library 262. This notification is in the form of initial request message 5250. The library 262 then encrypts a randomly generated message RGM generated by the library 262 using encryption process $E_{pKS}$ and the library's private key pKS and sends the resulting $E_{pKS}$[RGM] 5251 to the viewer 266. The viewer 266 decrypts $E_{pKS}$[RGM] 5251 using decryption process $D_{PKS}$ and the library's public key PKS. The viewer 266 then encrypts the electronic book request EBR, along with the randomly generated message RGM received from the library 262 using encryption process $E_{PKR}$ and the viewer's private key pKR and sends the resulting $E_{pKR}$[EBR,RGM] 5252 to the library 262. The library 262 decrypts $E_{pKR}$[EBR,RGM] 5252 using decryption process $D_{PKR}$ and the viewer's public key PKR. If the randomly generated message RGM received from the viewer 266 coincides with the randomly generated message RGM that the library 262 originally sent to the viewer 266, the viewer's identity is verified.

In another embodiment, the ISO one-way authentication protocol framework, as defined in ISO standard X.509 is used to provide authentication of the library's identity.

In yet another embodiment, the compressed and encrypted electronic book content file $E_{SKT}$[EBC] is stored on the library system 262. Once the electronic book is ready to be displayed on the viewer 266, the entire compressed and encrypted electronic book file $E_{SKT}$[EBC] is downloaded to the viewer 266 from the library system 262. The viewer 266 verifies the source of the electronic book by using the public key of the viewer 266 PKS to decrypt the digital signature provided. The viewer 266 then decrypts the symmetric key using decryption process $D_{pKR}$ and the viewer's private key pKR. The viewer 266 then uses decryption process $D_{SKT}$ and the transaction symmetric key SKT to decrypt all or a portion of the electronic book file prior to display. The viewer 266 then decompresses the electronic book file and displays a page of the electronic book on the viewer 266 display.

Exchanging encryption key information between the library 262 and viewer 266 may be done using communication networks. Alternatively, encryption key distribution may be accomplished by storing the encryption key information on a smart card, PCMCIA card device, CD ROM, or other portable memory storage device and delivering the device to the appropriate location for retrieval and use in future encryption and decryption activities. When the key is delivered in physical form, the key may have associated with it a valid time period of use. Once this period has expired, a new key may be required. Alternatively, the device may support the capability to be updated remotely via a communication network.

Encryption, decryption, hashing, digital signature processing, formatting, compression, key management, and other security related activities presented herein that are performed by the library 262 or the viewer 266 may be done in hardware using a specialized processor. In an alternate embodiment, security related activities may be done in software using a standard or secure processor. In yet another alternative, a portion of security related activities may be done in software using a standard or secure processor while the remaining portion done in hardware using a specialized processor.

Once the electronic book content EBC 5100 is received and decrypted by the viewer 266, the viewer 266 may encrypt the electronic book content EBC 5100 with a symmetric key algorithm and store the encrypted electronic book content along with any non-encrypted content associated with the electronic book in storage memory device 5270 at the viewer 266. In one embodiment, depicted in FIG. 34, secure storage is done on a memory device at the driver-level, where all information stored on the memory storage device 5270 is encrypted by memory device driver prior to being stored on memory storage device 5270, as described in Applied Cryptography, by Bruce Schneier and hereby incorporated by reference. In this embodiment, any content X 5272 to be stored on the memory storage device 5270, including electronic book content, is encrypted using encryption process $E_{SK}$ 5274 in memory device driver 5271 and symmetric key SK 5276, resulting in encrypted content $E_{SK}[X]$ 5273. The resulting encrypted content $E_{SK}[X]$ 5273 is then stored on memory storage device 5270. Upon retrieval from memory storage device 5270, decryption process DSK 5275 decrypts encrypted content $E_{SK}[X]$ 5273 with symmetric key SK 5276, resulting in the original content X 5272. In another embodiment, secure storage is done at the file level, also as described in Applied Cryptography, by Bruce Schneier, where each file is encrypted individually with a different symmetric key prior to storage and stored in its encrypted form on memory storage device 5270. The symmetric key SK 5276 can then be stored separate from the stored encrypted content X 5272. In one such embodiment, encryption is done in hardware using a specialized encryption processor. In an alternate embodiment, encryption is done in software using a standard or secure processor.

To ensure the electronic book content file has not been modified while it was stored, in one embodiment, depicted in FIG. 35, the viewer 266, serving as the storage site 4996, uses a one-way hashing algorithm 5280, as presented in Applied Cryptography, by Bruce Schneier and hereby incorporated by reference, where a hashing value 5281 is calculated by the viewer 266 based on the electronic book content EBC 5100 prior to encryption process 5282. The hashing value 5281, along with the encrypted content $E_{SK}[EBC]$ 5284 is then stored on the memory storage device 5283. When the encrypted content $E_{SK}[EBC]$ 5284 is retrieved from storage, the viewer 266 decrypts encrypted content $E_{SK}[EBC]$ 5284 using decryption process $D_{SK}$ 5285 and retrieves the stored hashing value 5281. The viewer 266 then calculates hashing value 5281', using hashing algorithm 5280 and the retrieved electronic book content EBC 5100. Comparator 5286 compares the hashing value 5281 to the hashing value 5281' to determine if they coincide. If the hashing value 5281 and the hashing value 5281' coincide, the integrity of the electronic book content EBC 5100 retrieved for memory storage device 5283 can be ensured and the viewer 266 displays the retrieved content.

The security methods described above may also be applied to the communications between an upgraded cable set-top converter 601 that is configured to function as a library unit 262 and a viewer 266.

D. Kiosk to Viewer Security

Kiosks, public libraries, schools, and bookstore systems can deliver electronic book content to a viewer 266 or public viewer 912 using a secured mechanism. In one embodiment, an asymmetric public key encryption technique is used, as described in Contemporary Cryptography, edited by Gustavus Simmons, published by IEEE Press in 1992, and hereby incorporated by reference. Public key algorithms used may include the Merkle-Hellman Knapsacks technique, as described in U.S. Pat. No. 4,218,582, the RSA technique, as described in U.S. Pat. No. 4,405,829, the Pohlig-Hellman technique, as described in U.S. Pat. No. 4,424,414, the Schnorr Signatures technique, as described in U.S. Pat. No. 4,995,082, or any other public key technique.

In this embodiment, depicted in FIG. 20, a kiosk, serving as the sender 4998, first encrypts the electronic book content EBC 5100 destined for the viewer 266 or the public viewer 912 (see FIG. 15), serving as the recipient 4999, using a symmetric key encryption process $E_{SK}$ 5102, and using DES, PKZIP, BLOWFISH, or any other symmetric encryption algorithm, resulting in encrypted content $E_{SK}[EBC]$ 5109. The encryption process $E_{SK}$ 5102 uses a symmetric key SK 5103 either randomly generated by a key generator process 5104 or previously defined and retrieved from key storage memory 5105. Then, the kiosk encrypts the symmetric key SK 5103 with private key encryption process $E_{pKS}$ 5106 using the kiosk's private key pKS 5107, resulting in encrypted key $E_{pKS}[SK]$ 5108. The kiosk packages encrypted key $E_{pKS}[SK]$ 5108, encrypted content $E_{SK}[EBC]$ 5109 and non-encrypted information 5110 related to the electronic book or the exchange and delivers the package to the viewer 266 or public viewer 912. Using decryption process $D_{PKS}$ 5111 and the kiosk's public key PKS 5112, the viewer 266 or public viewer 912 decrypts the encrypted key $E_{pKS}[SK]$ 5108 and uses the recovered symmetric key SK 5103 to decrypt the encrypted content $E_{SK}[EBC]$ 5109 using decryption process DSK 5113.

In an alternate embodiment, depicted in FIG. 21, only symmetric key encryption is used, using a certificate authority 4997. The certificate authority 4997, a trusted source, provides a symmetric key to each kiosk, serving as the sender 4998, and the viewer 266 or public viewer 912, serving as the recipient 4999. The certificate authority 4997 may be an existing commercial entity such as Entrust or Verisign or a private entity established for the sole purpose of electronic book secure distribution. The kiosk contacts the certificate authority 4997, sending a request 5120 for a transaction symmetric key SKT 5121 to be used during the transaction. The certificate authority 4997 either randomly generates the transaction symmetric key SKT 5121 by using a key generator process 5124 or retrieves the previously defined transaction symmetric key SKT 5121 from key storage memory 5125. The transaction symmetric key SKT 5121 is encrypted by the certificate authority 4997 using symmetric key encryption process $E_{SKS}$ 5123 and the kiosk's symmetric key SKS 5122.

The resulting encrypted symmetric key $E_{SKS}[SKT]$ 5126 is delivered by the certificate authority 4997 to the kiosk. The kiosk decrypts the encrypted symmetric key $E_{SKS}[SKT]$ 5126 using decryption process $D_{SKS}$ 5127 and using the kiosk's symmetric key SKS 5122 to recover the transaction symmetric key SKT 5121. The kiosk then uses the recovered transaction symmetric key SKT 5121 received from the certificate authority 4997 to encrypt the electronic book content EBC 5100 using encryption process $E_{SKT}$ 5128, resulting in encrypted content $E_{SKT}[EBC]$ 5129. The kiosk delivers the encrypted content $E_{SKT}[EBC]$ 5129 to the viewer 266 or public viewer 912. The transaction symmetric key SKT 5121 is also encrypted by the certificate authority 4997 using symmetric key encryption process $E_{SKR}$ 5131 using the viewer's symmetric key SKR 5130. The resulting encrypted symmetric key $E_{SKR}[SKT]$ 5132 is delivered by the certificate authority 4997 to the viewer 266 or public viewer 912. The viewer 266 or public viewer 912 decrypts the encrypted symmetric key $E_{SKR}[SKT]$ 5132 using decryption process DSKR 5133 and the viewer's symmetric key SKR 5130 to recover the transaction symmetric key SKT 5121. The viewer 266 or public viewer 912 then uses the recovered transaction symmetric key SKT 5121 received from the certificate authority 4997 to decrypt the encrypted content $E_{SKT}$[EBC] 5129 using decryption process $D_{SKT}$ 5134, resulting in the unencrypted electronic book content 5100.

In yet another embodiment, depicted in FIG. 22, the kiosk, acting as the sender 4998, generates a transaction symmetric key SKT 5140. The kiosk either randomly generates the transaction symmetric key SKT 5140 by using the key generator process 5141 or retrieves the previously defined transaction symmetric key SKT 5140 from key storage memory 5142. The kiosk encrypts the electronic book content EBC 5100 using encryption process $E_{SKT}$ 5143 and the transaction symmetric key SKT 5140, and delivers the encrypted content $E_{SKT}$[EBC] 5144 to the viewer 266 or public viewer 912, acting as the recipient 4999.

The kiosk encrypts the transaction symmetric key SKT 5140 using encryption process $E_{SKS}$ 5145 and the kiosk's symmetric key SKS 5146 that the kiosk shares with a third party certificate authority 4997 and delivers the encrypted symmetric key $E_{SKS}$[SKT] 5147 to the third party certificate authority 4997. The certificate authority 4997 decrypts the encrypted symmetric key $E_{SKS}$[SKT] 5147 using decryption process $D_{SKS}$ 5148 and the kiosk's symmetric key SKS 5146. The viewer 266 or public viewer 912 may contact the certificate authority 4997 using the request 5149 to obtain the transaction symmetric key 5140. Prior to the certificate authority 4997 delivering the needed transaction symmetric key 5140 to the viewer 266 or public viewer 912, the viewer 266 or public viewer 912 may be required to complete a financial transaction with the certificate authority 4997, paying for the electronic book content first. The certificate authority 4997 then encrypts the transaction symmetric key SKT 5140 using encryption process EsKR 5150 and the viewer's symmetric key SKR 5151 that the certificate authority 4997 shares with the viewer 266 or public viewer 912, and delivers the encrypted symmetric key $E_{SKR}$[SKT] 5152 to the viewer 266 or public viewer 912. The viewer 266 or public viewer 912 decrypts the encrypted symmetric key $E_{SKR}$[SKT] 5152 using decryption process $D_{SKR}$ 5153 and the viewer's symmetric key SKR 5151, and uses the recovered transaction symmetric key SKT 5140 to decrypt the encrypted content $E_{SKT}$[EBC] using decryption process $D_{SKT}$ 5154, resulting in electronic book content EBC 5100.

In another embodiment, depicted in FIG. 23a, the kiosk, serving as the sender 4998, encrypts the entire transaction stream TS 5165 between the kiosk and the viewer 266 or public viewer 912, serving as the recipient 499. To do so, the kiosk may use the sender private key pKS 5160 and encryption process $E_{pKS}$ 5161 to encrypt the transaction stream TS 5165, resulting in encrypted transaction stream $E_{pKS}$[TS] 5162. In this embodiment, the viewer 266 or public viewer 912 uses decryption process $D_{PKS}$ 5164 and sender public key PKS 5163 to decrypt the encrypted transaction stream $E_{pKS}$[TS] 5162.

In another embodiment, depicted in FIG. 23b, the kiosk, serving as the sender 4998, may use the public key of the viewer 266 or public viewer 912, serving as the recipient 4999, to encrypt the transaction stream TS 5165. To do so, the kiosk may use the recipient public key PKR 5171 and encryption process $E_{PKR}$ 5170 to encrypt the transaction stream TS 5165, resulting in encrypted transaction stream $E_{PKR}$[TS] 5173. In this embodiment, the viewer 266 or public viewer 912 uses decryption process $D_{pKR}$ 5174 and recipient private key pKR 5172 to decrypt the encrypted transaction stream $E_{PKR}$[TS] 5173.

Figure 23C:
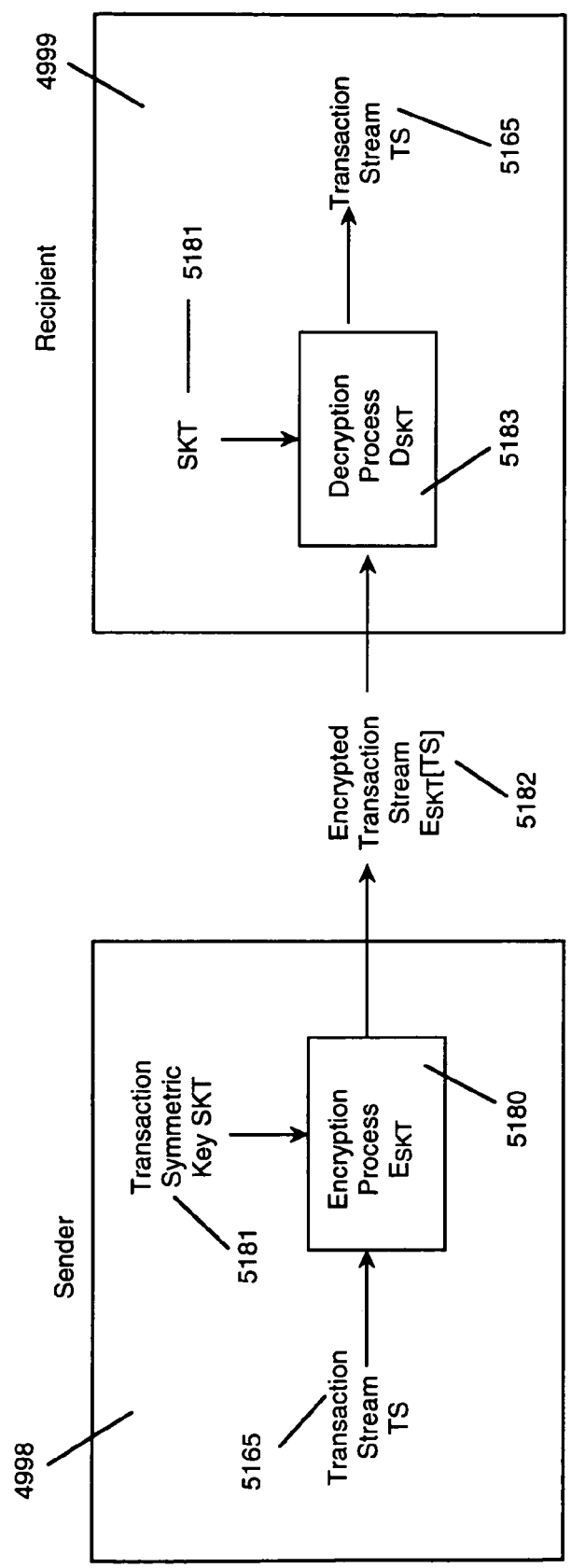
FIG. 23c is a diagram of symmetric key encryption for an entire transaction stream.

In another embodiment, depicted in FIG. 23c, the kiosk, serving as the sender 4998, may use a transaction symmetric key SKT 5181 that both the kiosk and the viewer 266 or public viewer 912 have stored in advance of the transaction to encrypt the transaction stream TS 5165. In this embodiment, the kiosk uses encryption process $E_{SKT}$ 5180 and transaction symmetric key SKT 5181 to generate encrypted transaction stream $E_{SKT}$[TS] 5182. The viewer 266 or public viewer 912 uses decryption process $D_{SKT}$ 5183 and transaction symmetric key SKT 5181 to decrypt encrypted transaction stream $E_{SKT}$[TS] 5182, resulting in transaction stream TS 5165.

In another embodiment, depicted in FIG. 24a, the kiosk, serving as the sender 4998, and viewer 266 or public viewer 912, serving as the recipient 4999, initiate the transaction by negotiating a shared key to use for the transaction, using, for example, the Elliptic Curve Diffie-Hellman key exchange algorithm, as described in U.S. Pat. No. 4,200,700, to generate the shared transaction symmetric key. Key negotiation information 5190 is exchanged between key generation algorithms 5191 operated by both the kiosk and the viewer 266 or public viewer 912. As a result of the negotiation process, the kiosk's key generator algorithm 5191 generates the transaction symmetric key SKT 5192 and the viewer's key generator algorithm 5192 generates the transaction symmetric key SKT 5193.

The kiosk encrypts the electronic book content EBC 5100 using encryption process $E_{SKT}$ 5194 and the shared transaction symmetric key SKT 5193 and delivers the resulting encrypted content $E_{SKT}$[EBC] 5195 to the viewer 266 or public viewer 912. The viewer 266 or public viewer 912 uses the shared transaction symmetric key SKT 5193 and decryption process $D_{SKT}$ 5196 to decrypt the encrypted content $E_{SKT}$[EBC] 5195.

In a different embodiment, depicted in FIG. 24b, the kiosk serves as the sender 4998 and viewer 266 or public viewer 912 serves as the recipient 4999. Initial key negotiation information 5200 is exchanged between the seed key generation algorithm 5201 at the kiosk and the seed key generation algorithm 5202 at the viewer 266 or public viewer 912.

As a result, the seed key generation algorithm 5201 at the kiosk and the seed key generation algorithm 5202 at the viewer 266 or public viewer 912 each generate seed key SK 5203 using, for example, the Elliptic Curve Diffie-Hellman key exchange algorithm, as described in U.S. Pat. No. 4,200,700. Seed key 5203 is then used by key sequence generator 5204 at the kiosk site to generate the first in a sequence of keys, transaction symmetric key $S_{KTi}$ 5206. Similarly, seed key 5203 is used by key sequence generator 5205 at the viewer 266 or public viewer 912 to generate the identical sequence of keys, beginning with transaction symmetric key SKTi 5206.

The kiosk encrypts the electronic book content EBC 5100 using encryption process $E_{SKTi}$ 5207 and the shared transaction symmetric key $S_{KTi}$ 5206 and delivers the resulting encrypted content $E_{SKTi}$[EBC] 5208 to the viewer 266 or public viewer 912. The viewer 266 or the public viewer 912 uses the transaction symmetric key $S_{KTi}$ 5206 and decryption process $D_{SKTi}$ 5209 to decrypt the encrypted content $E_{SKTi}$[EBC] 5206. The kiosk key sequence generator 5204 and viewer 266 or public viewer 912 key sequence generator 5205 continue to generate matching transaction symmetric keys for use in encrypting each subsequent transaction between the kiosk and the viewer 266 or public viewer 912.

To ensure that the electronic book content delivered by the kiosk to the viewer 266 or public viewer 912 was not altered in route, integrity checking algorithms may be employed. In one embodiment, depicted in FIG. 26, the kiosk, serving as sender 4998, uses a one-way hashing algorithm 5231, as presented in Applied Cryptography, by Bruce Schneier, published by John Wiley & Sons, Inc. in 1996, and hereby incorporated by reference, where a hashing value 5232 is calculated by the kiosk based on the electronic book content file 5230 as input. This resulting hashing value 5232, along with the actual encrypted electronic book file 5237 that has been encrypted by the kiosk via encryption process 5235 is delivered to the viewer 266 or public viewer 912, serving as recipient 4999.

The viewer 266 or public viewer 912 decrypts the encrypted electronic book file 5237 using decryption process 5236 to recover the electronic book content file 5230'. The viewer 266 or public viewer 912 then uses the hashing algorithm 5231 with the electronic book content file 5230' as input to generate a hashing value 5232', which is compared to the hashing value 5232 delivered with the encrypted electronic book file 5237. If the hashing value 5232' calculated by the viewer 266 or public viewer 912 coincides with the hashing value 5232 delivered by the kiosk as determined by comparator 5233, the integrity of the electronic book content file 5230' can be ensured.

To identify the kiosk of the electronic book, the kiosk and viewer 266 or the public viewer 912 may use an authentication method. In one embodiment, the Digital Signature Algorithm (DSA) is used, as described in U.S. Pat. No. 5,231,668, and hereby incorporated by reference.

In another embodiment, the kiosk uses a password as an identifier. This password is delivered along with the electronic book content to authenticate the kiosk. The viewer 266 or the public viewer 912 compares this password with the password the viewer 266 or the public viewer 912 has for the kiosk. If the passwords match, the source of the electronic book content, i.e., the kiosk, is verified.

In yet another embodiment, public key encryption is used as a digital signature to authenticate the kiosk. The kiosk encrypts the electronic book content using the kiosk's private key. When the viewer 266 or the public viewer 912 correctly decrypts the encrypted electronic book content with the kiosk's public key, the identity of the kiosk is authenticated since only the kiosk has access to the kiosk's private key used to encrypt the electronic book content.

In another embodiment, depicted in FIG. 27, upon initiation of the transaction, the kiosk, serving as the sender 4998, notifies the viewer 266 or the public viewer 912, serving as the recipient 4999, of the kiosk's intention to deliver electronic book content to the viewer 266 or public viewer 912. This notification may be in the form of delivery notification message 5240. The viewer 266 or the public viewer 912 then encrypts a randomly generated message RGM generated by the viewer 266 or the public viewer 912 using encryption process $E_{pKR}$ and the viewer's private key pKR and sends the resulting $E_{pKR}$[RGM] 5241 to the kiosk. The kiosk decrypts $E_{pKR}$[RGM] 5241 using decryption process $D_{PKR}$ and the viewer's public key PKR. The kiosk then encrypts the electronic book content EBC 5100, along with the randomly generated message RGM received from the viewer 266 or the public viewer 912 using encryption process $E_{pKS}$ and the kiosk's private key pKS and sends the resulting $E_{pKS}$[EBC,RGM] 5242 to the viewer 266 or the public viewer 912. The viewer 266 or the public viewer 912 decrypts $E_{pKS}$[EBC,RGM] 5242 using decryption process $D_{PKS}$ and the kiosk's public key PKS. If the randomly generated message RGM received from the kiosk coincides with the randomly generated message RGM that the viewer 266 or public viewer 912 originally sent to the kiosk, the kiosk's identity is verified. In another embodiment, the ISO one-way authentication protocol framework, as defined in ISO standard X.509 is used to provide authentication of the kiosk's identity.

A viewer 266 or public viewer 912 may initiate the transaction with the kiosk by requesting that an electronic book be delivered from the kiosk to the viewer 266 or the public viewer 912. To validate the identity of the viewer 266 or the public viewer 912, the kiosk and viewer 266 or the public viewer 912 may use the above authentication method embodiments. In another embodiment, the Digital Signature Algorithm (DSA) is used, as described in U.S. Pat. No. 5,231,668, and hereby incorporated by reference. In another embodiment, the viewer 266 or the public viewer 912 uses a password as an identifier.

This password is delivered along with the electronic book request to authenticate the viewer 266 or the public viewer 912. The kiosk compares this password with the password it has for the viewer 266 or the public viewer 912. If the password matches, the source of the electronic book request, i.e., the viewer 266 or the public viewer 912 is verified. In yet another embodiment, public key encryption is used as a digital signature to authenticate the viewer 266 or the public viewer 912. The viewer 266 or the public viewer 912 encrypts the electronic book request using the viewer 266 or the public viewer 912 private key pKR and send the encrypted request to the kiosk. When the kiosk correctly decrypts the encrypted request with the viewer's public key PKR, the identity of the viewer 266 or the public viewer 912 is authenticated since only the viewer 266 or the public viewer 912 has access to the viewer's private key pKR used to encrypt the electronic book request.

In another embodiment, depicted in FIG. 28, upon initiation of the transaction, the viewer 266 or the public viewer 912, serving as the recipient 4999, notifies the kiosk, serving as the sender 4998, of the viewer's intention to request electronic book content from the kiosk. This notification is in the form of initial request message 5250. The kiosk then encrypts a randomly generated message RGM generated by the kiosk using encryption process $E_{pKS}$ and the kiosk's private key pKS and sends the resulting $E_{pKS}$[RGM] 5251 to the viewer 266 or public viewer 912. The viewer 266 or the public viewer 912 decrypts $E_{pKS}$[RGM] 5251 using decryption process $D_{PKS}$ and the kiosk's public key PKS. The viewer 266 or the public viewer 912 then encrypts the electronic book request EBR, along with the randomly generated message RGM received from the kiosk using encryption process $E_{PKR}$ and the viewer's private key pKR and sends the resulting $E_{pKR}$[EBR,RGM] 5252 to the kiosk. The kiosk decrypts $E_{pKR}$[EBR,RGM] 5252 using decryption process $D_{PKR}$ and the viewer's public key PKR. If the randomly generated message RGM received from the viewer 266 or the public viewer 912 coincides with the randomly generated message RGM that the kiosk originally sent to the viewer 266 or the public viewer 912, the viewer's identity is verified.

In another embodiment, the ISO one-way authentication protocol framework, as defined in ISO standard X.509 is used to provide authentication of the kiosk's identity.

In yet another embodiment, where the kiosk is functioning as a public library, a viewer 266 or the public viewer 912 requests an electronic book to be borrowed from the kiosk. The kiosk must first authenticate the viewer 266 or the public viewer 912. An embodiment of the authentication sequence is depicted in FIG. 29, where the kiosk is serving as sender 4998 and the viewer 266 or the public viewer 912 is serving as recipient 4999. To authenticate an viewer 266 or the public viewer 912 requesting an electronic book from the kiosk, an authentication sequence may be initiated by the viewer 266 or the public viewer 912. The authentication sequence begins with the viewer 266 or the public viewer 912 sending a request 5290 to the kiosk for a given electronic book content file 5300. The kiosk then responds to the viewer 266 or the public viewer 912 by generating and returning an authentication string 5291 to the viewer 266 or the public viewer 912.

The viewer 266 or the public viewer 912 returns a message to the kiosk that contains: 1) a book identifier 5292, identifying the requested electronic book; 2) the signed authentication string 5293 that has been signed using a one-way hash function and then encrypted using the private key of the viewer 266 or public viewer 912; and 3) viewer 266 or the public viewer 912 certification information 5294 that the kiosk can authenticate with a certificate authority 4997. The kiosk retrieves the encrypted electronic book, along with its associated unprotected metadata header 5301 and protected metadata header 5302 from storage. The kiosk decrypts the protected metadata header 5302 using the decryption key and validates that the protected metadata header 5302 has not been altered by performing a one-way hash function on the protected metadata header 5302 and comparing the result to the hash value contained in the protected metadata header 5302.

If the protected metadata header 5302 was stored unencrypted, the kiosk retrieves the encrypted electronic book, along with its associated unprotected metadata header 5301 and protected metadata header 5302 from storage and validates the protected metadata header using a one-way hashing function. The kiosk then modifies the fields of the unprotected metadata header 5301 and protected metadata header 5302 based on the viewer 266 or the public viewer 912 request and the rules established by the kiosk and the public library for electronic book uses and the loan duration time. The kiosk may then encrypt the entire protected metadata header 5302 or some portion of the protected metadata header 5302 using the public key of the viewer 266 or the public viewer 912 or a pre-determined symmetric key known by both the kiosk and the viewer 266 or the public viewer 912.

The packaged electronic book with metadata headers may then be delivered to viewer 266 or the public viewer 912 or the viewer 266 or the public viewer 912 may retrieve the packaged electronic book from the kiosk. Upon receipt of the packaged electronic book, along with metadata headers 5301 and 5302, by the viewer 266 or the public viewer 912, the viewer 266 or the public viewer 912 may decrypt the protected metadata header 5302, validate that the protected metadata header 5302 has not been altered by performing a one-way hash calculation on the protected metadata header 5302 and comparing the result to the hash value 5305 contained in the protected metadata header 5302, and re-encrypt the protected metadata header 5302 for storage, or store the received packaged electronic book directly without decrypting the protected metadata header 5302.

When the electronic book is opened for display on the viewer 266 or the public viewer 912, the viewer decrypts the protected metadata header 5302 using the appropriate decryption key, recovers the content decryption key, and decrypts the electronic book content for display on the viewer. To return a borrowed electronic book to a kiosk, the viewer 266 or the public viewer 912 sends a return request to the kiosk. To authenticate a kiosk and to obtain the public key of the kiosk if not already known by the viewer 266 or the public viewer 912, an authentication sequence may be initiated by the viewer 266 or the public viewer 912. The authentication sequence begins with the viewer 266 or the public viewer 912 sending a request to the kiosk to return a given electronic book content file. The viewer 266 or the public viewer 912 generates and inserts an authentication string in the request sent to the kiosk. The kiosk returns a message to the viewer 266 or the public viewer 912 that contains an authentication string that has been signed using a one-way hash function and then encrypted using the private key of the kiosk. The protected metadata header 5302 or some portion of the header may then be encrypted in the public key of the kiosk or the private key of the viewer.

Once the kiosk has been authenticated by the viewer 266 or the public viewer 912, the packaged electronic book with metadata headers may then be returned to the kiosk and deleted from the viewer. The kiosk decrypts the protected metadata header 5302, modifies the protected metadata header 5302 to reflect that the electronic book is no longer being borrowed, and stores the modified protected metadata header 5302. This return process may also be used to return an electronic book to a kiosk for a refund. Processing of and storage of the decryption and encryption keys used on the protected metadata header 5302 at the viewer 266 or the public viewer 912 may be done entirely via software, entirely on a secure smart card or removable device, or some combination of the two.

To ensure the kiosk that the electronic book content delivered to the viewer 266 or the public viewer 912 was received, the viewer 266 or the public viewer 912, serving a recipient 4999 in FIG. 33 may respond to the kiosk, serving as the sender in FIG. 33, by first generating a reply message REP as shown in step 5260. The viewer 266 or the public viewer 912 then encrypts reply message REP in the viewer's private key pKR using encryption process $E_{pKR}$, resulting in $E_{pKR}[REP]$, as shown in step 5261. The viewer 266 or the public viewer 912 then encrypts $E_{pKR}[REP]$ in the kiosk's public key PKS using encryption process $E_{PKS}$, resulting in $E_{PKS}[E_{pKR}[REP]]$, as shown in step 5262. The viewer 266 or the public viewer 912 sends $E_{pKS}[E_{PKR}[REP]]$ to the kiosk, as shown in step 5263. The kiosk then decrypts $E_{pKS}[E_{PKR}[REP]]$, using decryption process $D_{pKS}$ and the kiosk's private key pKS, resulting in $E_{PKR}[REP]$ as shown in step 5264. The kiosk then decrypts the resulting $E_{pKR}[REP]$ using decryption process $D_{PKR}$ and the viewer's public key PKR, as shown in step 5265. As shown in step 5266, the valid reception of reply message REP by kiosk serves as verification of receipt of the electronic book content delivered to the viewer 266 or the public viewer 912 by the kiosk.

In another embodiment, the ISO two-way authentication protocol framework, as defined in ISO standard X.509 is used to provide verification of receipt of electronic book content by the viewer 266 or the public viewer 912. Exchanging encryption key information between the kiosk and viewer 266 or the public viewer 912 may be done via communication networks. Alternatively, encryption key distribution may be accomplished by storing the encryption key information on a smart card, PCMCIA card device, CD ROM, or other portable memory storage device and delivering the device to the appropriate location for retrieval and use in future encryption and decryption activities. When the key is delivered in physical form, the key may have associated with it a valid time period of use. Once this period has expired, a new key is required. Alternatively, the device may support the capability to be updated remotely using a communication network.

Encryption, decryption, hashing, digital signature processing, formatting, compression, key management, and other security related activities presented herein that are performed by the kiosk or the viewer 266 or the public viewer 912 may be done in hardware using a specialized processor. In an alternate embodiment, security related activities may be done in software using a standard or secure processor. In yet another alternative, a portion of security related activities may be done in software using a standard or secure processor while the remaining portion done in hardware using a specialized processor.

Once electronic book content is received and decrypted by the viewer 266 or the public viewer 912, the viewer 266 or the public viewer 912 may encrypt the electronic book content EBC 5100 with a symmetric key algorithm and store the encrypted electronic book content along with any non-encrypted content associated with the electronic book in storage memory device 5270 at the viewer 266 or the public viewer 912. In one embodiment, depicted in FIG. 34, secure storage is done on a memory device at the driver-level, where all information stored on the memory storage device 5270 is encrypted by memory device driver prior to being stored on memory storage device 5270, as described in Applied Cryptography, by Bruce Schneier and hereby incorporated by reference. In this embodiment, any content X 5272 to be stored on the memory storage device 5270, including electronic book content, is encrypted using encryption process $E_{SK}$ 5274 in memory device driver 5271 and symmetric key SK 5276, resulting in encrypted content $E_{SK}[X]$ 5273. The resulting encrypted content $E_{SK}[X]$ 5273 is then stored on memory storage device 5270. Upon retrieval from memory storage device 5270, decryption process $D_{SK}$ 5275 decrypts encrypted content $E_{SK}[X]$ 5273 with symmetric key SK 5276, resulting in the original content X 5272. In another embodiment, secure storage is done at the file level, also as described in Applied Cryptography, by Bruce Schneier, where each file is encrypted individually with a different symmetric key prior to storage and stored in its encrypted form on memory storage device 5270. The symmetric key SK 5276 can then be stored separate from the stored encrypted content X 5272. In one such embodiment, encryption is done in hardware using a specialized encryption processor. In an alternate embodiment, encryption is done in software using a standard or secure processor.

To ensure the electronic book content file has not been modified while it was stored, in one embodiment, depicted in FIG. 35, the viewer 266 or the public viewer 912, serving as storage site 4996, uses a one-way hashing algorithm 5280, as presented in Applied Cryptography, by Bruce Schneier and hereby incorporated by reference, where a hashing value 5281 is calculated by the viewer 266 or the public viewer 912 based on the electronic book content EBC 5100 prior to encryption process 5282. This hashing value 5281, along with the encrypted content $E_{SK}[EBC]$ 5284 is then stored on memory storage device 5283. When the encrypted content $E_{SK}[EBC]$ 5284 is retrieved from storage, the viewer 266 or the public viewer 912 decrypts encrypted content $E_{SK}[EBC]$ 5284 using decryption process DSK 5285 and retrieves the stored hashing value 5281. The viewer 266 or the public viewer 912 then calculates hashing value 5281', using hashing algorithm 5280 and the retrieved electronic book content EBC 5100. Comparator 5286 compares hashing value 5281 to hashing value 5281' to determine if they coincide. If the hashing value 5281 and the hashing value 5281' coincide, the integrity of the electronic book content EBC 5100 retrieved for memory storage device 5283 can be ensured.

The security methods described above may also be applied to the communications between a public library system and a viewer, between a school or school library system and a viewer, and between a bookstore system and a viewer.

E. Viewer to Viewer Security

In an embodiment where an electronic book is being lent by one viewer to another, the borrowing viewer requests an electronic book to be borrowed from the lending viewer. The lending viewer may first authenticate the borrowing viewer. An embodiment of the authentication sequence is depicted in FIG. 29, where the lending viewer is serving as the sender 4998 and the viewer 266 or the public viewer 912 is serving as the recipient 4999. To authenticate a borrowing viewer requesting an electronic book from the lending viewer, an authentication sequence may be initiated by the borrowing viewer. The authentication sequence begins with the borrowing viewer sending a request 5290 to the lending viewer for a given electronic book content file 5300.

The lending viewer then responds to the borrowing viewer by generating and returning an authentication string 5291 to the borrowing viewer. The borrowing viewer returns a message to the lending viewer that contains: 1) a book identifier 5292; identifying the requested electronic book; 2) the signed authentication string 5293 that has been signed using a one-way hash function and then encrypted using the private key of the borrowing viewer; and 3) borrowing viewer certification information 5294 that the lending viewer can authenticate with a certificate authority 4997. The lending viewer retrieves the encrypted electronic book, along with its associated unprotected metadata header 5301 and protected metadata header 5302 from storage. The lending viewer decrypts the protected metadata header 5302 using the decryption key and validates that the protected metadata header 5302 has not been altered by performing a one-way hash function on the protected metadata header 5302 and comparing the result to the hash value contained in the protected metadata header 5302. If the protected metadata header 5302 was stored unencrypted, the lending viewer retrieves the encrypted electronic book, along with its associated unprotected metadata header 5301 and protected metadata header 5302 from storage and validates the protected metadata header using a one-way hashing function. The lending viewer then modifies the fields of the unprotected metadata header 5301 and protected metadata header 5302 based on the borrowing viewer request and the rules established by the lending viewer and the public library for electronic book uses and the loan duration time. The lending viewer may then encrypt the entire protected metadata header 5302 or some portion of the protected metadata header 5302 using the public key of the borrowing viewer or a predetermined symmetric key known by both the lending viewer and the borrowing viewer.

The packaged electronic book with metadata headers may then be delivered to borrowing viewer or the borrowing viewer may retrieve the packaged electronic book from the lending viewer. Upon receipt of the packaged electronic book, along with metadata headers 5301 and 5302, by the borrowing viewer, the borrowing viewer may decrypt the protected metadata header 5302, validate that the protected metadata header 5302 has not been altered by performing a one-way hash calculation on the protected metadata header 5302 and comparing the result to the hash value 5305 contained in the protected metadata header 5302, and reencrypt the protected metadata header 5302 for storage, or store the received packaged electronic book directly without decrypting the protected metadata header 5302. When the electronic book is opened for display on the borrowing viewer, the viewer decrypts the protected metadata header 5302 using the appropriate decryption key, recovers the content decryption key, and decrypts the electronic book content for display on the viewer. To return a borrowed electronic book to a lending viewer, the borrowing viewer sends a return request to the lending viewer. To authenticate a lending viewer and to obtain the public key of the lending viewer if not already known by the borrowing viewer, an authentication sequence may be initiated by the borrowing viewer.

The authentication sequence begins with the borrowing viewer sending a request to the lending viewer to return a given electronic book content file. The borrowing viewer generates and inserts an authentication string in the request sent to the lending viewer. The lending viewer returns a message to the borrowing viewer that contains an authentication string that has been signed using a one-way hash function and then encrypted using the private key of the lending viewer. The protected metadata header 5302 or some portion of the header may then be encrypted in the public key of the lending viewer or the private key of the viewer.

Once the lending viewer has been authenticated by the borrowing viewer, the packaged electronic book with metadata headers may then be returned to the lending viewer and deleted from the viewer. The lending viewer decrypts the protected metadata header 5302, modifies the protected metadata header 5302 to reflect that the electronic book is no longer being borrowed, and stores the modified protected metadata header 5302. Processing of and storage of the decryption and encryption keys used on the protected metadata header 5302 at the borrowing viewer may be done entirely using software, entirely on a secure smart card or removable device, or some combination of the two.

F. Copyright Protection

A number of mechanisms may be implemented in the electronic book delivery system to support copyright protection. In one embodiment, all transactions between the publisher 282 and the operations center 250, the operations center 250 and home systems 258, the library 262 and the viewer 266, or a kiosk and the viewer 266 or the public viewer 912, may make use of the protocol defined in the 5C Digital Transmission Content Protection Specification, developed by Hitachi, Ltd., Intel Corporation, Matsushita Electric Industrial Co., Ltd., Sony Corporation, and Toshiba Corporation, available from the Digital Transmission Licensing Administrator, at www.dtcp.com and hereby incorporated by reference. Alternate embodiments to support copyright protection in the distribution of electronic books are addressed below.

Visible copyright notifications may be applied to electronic book content, establishing the rights holder's legal claim to copyright protection. Copyright holder information, electronic book source information, and/or copyright disclaimer information may be embedded as a visible watermark within the electronic book. This copyright information may be associated with the electronic book and delivered with the electronic book when the electronic book is distributed from one entity to another or the electronic book is copied. The copyright information may be displayed the first time an electronic book is viewed. The copyright information may be displayed initially, each time an electronic book is viewed. Alternatively, the information may always be displayed whenever an electronic book is being viewed. This copyright information may be inserted as actual text, overlaid on electronic book text, or inserted as background graphical information in the electronic book.

Associated with a delivered electronic book may be an indication of an electronic book's printing rights. Printing rights information may be applied to all users of an electronic book title, or printing rights may apply to a specific user of an electronic book. Printing rights information may be delivered with an electronic book by the operations center 250 and used by the home system 258 in determining what printing capabilities are allowed. An electronic book may be allowed to be printed an unlimited number of times. An electronic book may be allowed to be printed one time only. An electronic book may not be allowed to be printed at all.

Finally, an electronic book may be allowed to be printed, but the electronic version of the electronic book title may be deleted after this one printing. If the electronic book viewer 266 or library 262 has a printing capability, the copyright information may be applied to the printed content. The copyright information may be applied on the first page printed, on several pages printed, or on all pages printed. The software running on the secure processor in the home system 258 performs the print management function.

The electronic book distribution system can make use of steganography to further protect electronic books from copyright violation attempts. Steganography serves to hide secret messages in other messages, concealing the existence of the secret message. The most familiar form of steganographic technique is invisible ink. Steganographic techniques can allow for hidden identifiers to be inserted into electronic books for identifying and tracking purposes.

In one embodiment, the source and various intermediate handlers of electronic book content can insert their identifying marker within an electronic book. This identifier may be a message signed with the private key of the entity inserting the identifier. In another embodiment, an identification value representing the purchasing viewer 266 or the public viewer 912 may be inserted in the electronic book using steganographic techniques. The operations center 250 may insert the purchasing viewer's identifier, or alternatively, the home system 258 may insert the purchasing viewer's identifier. In one embodiment, the steganographic technique of modifying graphics on a pixel basis is used to encode hidden identifying information. In another embodiment, non-obvious markings are added to the text of an electronic book. In yet another embodiment, modification of line spacings is used to encode hidden identifying information.

Audio watermarking techniques can be used to encode identifying information into audio provided with electronic books. Graphic watermarking, using HighWater Designs' fingerprinted binary information technique or Digimarc Corporation's DigiMarc technology, as defined in U.S. Pat. No. 5,721,788, Method and System for Digital Image Signature, to Powell, hereby incorporated by reference, may be used. In yet another embodiment, video watermarking techniques may be used to encode identifying information into video provided with electronic books.

Prior to the delivery of the electronic book containing steganographic identifiers, a hashing value may be calculated and also delivered with the electronic book. The hashing value may be recalculated and compared with the hashing value calculated prior to delivery of the electronic book to the home system 258. If the hashing values match, the steganographic identifiers can be assured to be unaltered.

Steganographics may be incorporated into a security and validation system. Embedded steganographic information, including the electronic book publisher 282, rightholders, the originating operations center 250, and other intermediate sources and the purchasing home system 258 identifier, may be delivered within each electronic book sold to a home system 258. Whenever a home system 258 requests the purchase of a new electronic book, the operations center 250 or billing and collection subsystem 278 may query the home system 258 to determine the sources of all resident electronic books and to ensure that the books are assigned to that specific home system 258. This query may include the operations center 250 or billing and collection subsystem 278 accessing and retrieving the steganographically-hidden information from within each electronic book stored at the home system 258. If the home system 258 contains an electronic book from a source that is not valid or an electronic book for which the home system 258 was not the valid recipient, the operations center 250 or billing and collection subsystem 278 may not allow the transaction to proceed and may send a disable command that disables the home system 258 from operation until the issue can be resolved with the operations center 250. Alternatively, the home system 258, under the control of the secure processor, may only display electronic books that are watermarked with that home system's unique identifier.

Critical to the security of electronic book distribution system is the ability to modify the security algorithms in case of a security breach.

In one embodiment, the security algorithms operating on the electronic book home system 258 are updated by software downloaded using a communication network. In an alternative embodiment, the security algorithms operating on the electronic book home system 258 are updated using software downloaded from a smart card, PC-MCIA device, or other memory device attached to the home system 258.

The invention claimed is:

1. A method for encrypting, sending and receiving electronic books upon demand, comprising:
   creating a list of titles of available electronic books;
   transmitting the list of titles of available electronic books;
   selecting a title from the transmitted list of titles;
   communicating the selected title to an electronic book source;
   supplying a selected electronic book corresponding to the selected title to be encrypted;
   supplying an encryption key;
   encrypting the selected electronic book using the encryption key;
   supplying the encrypted selected electronic book;
   supplying a decryption key; and
   decrypting the encrypted selected electronic book using the decryption key.

2. The method of claim 1, wherein the encryption key and the decryption key are a symmetric key.

3. The method of claim 2, further comprising generating the symmetric key.

4. The method of claim 3, wherein the symmetric key is generated randomly.

5. The method of claim 3, wherein the symmetric key is generated using a key generator.

6. The method of claim 2, further comprising retrieving the symmetric key from a key storage memory.

7. The method of claim 2, wherein the symmetric key is a transaction symmetric key, the transaction symmetric key supplied by a certificate authority.

8. The method of claim 7, further comprising:
   sending a transaction symmetric key request to the certificate authority;
   encrypting the transaction symmetric key using a first party symmetric key to produce a first encrypted transaction symmetric key;
   delivering the first encrypted transaction symmetric key to a first party;
   decrypting the first encrypted transaction symmetric key, wherein the electronic book is encrypted by the first party using the transaction symmetric key;
   encrypting the transaction symmetric key using a second party symmetric key to produce a second encrypted transaction symmetric key;
   delivering the second encrypted transaction symmetric key to a second party; and
   decrypting the second encrypted transaction symmetric key, wherein the electronic book is decrypted using the transaction symmetric key.

9. The method of claim 2, wherein electronic book content and a transaction symmetric key are encrypted by a first party and wherein the encrypted electronic book content is supplied to a second party and the encrypted transaction symmetric key is supplied to a third party.

10. The method of claim 9, wherein the second party requests the encrypted transaction symmetric key from the third party.

11. The method of claim 10, wherein the third party decrypts the encrypted transaction symmetric key using a first party symmetric key.

12. The method of claim 11, further comprising:
   encrypting the decrypted transaction symmetric key using a second party symmetric key;
   supplying the encrypted transaction key to the second party; and
   decrypting the encrypted transaction symmetric key using the second party symmetric key.

13. The method of claim 12, further comprising completing a financial transaction between the first party and the second party before supplying the encrypted electronic book.

14. The method of claim 12, wherein the first party is an electronic book publisher, the second party is an operations center of an electronic book distribution system and the third party is a certificate authority.

15. The method of claim 12, wherein the first party is an electronic book distributor, the second party is an electronic book viewer and the third party is a certificate authority.

16. The method of claim 2, further comprising:
   encrypting the symmetric key with a private key and a private key encryption process;
   packaging the encrypted symmetric key and the encrypted electronic book; and
   delivering the package to an electronic book viewer.

17. The method of claim 16, further comprising:
   decrypting the encrypted symmetric key using a public key and a public key decryption process; and
   decrypting the encrypted electronic book using the decrypted symmetric key.

18. The method of claim 17, wherein the encryption method is one of a Merkle-Hellman Knapsack technique, a RSA technique, a Pohlig-Hellman technique and a Schnorr Signature technique.

19. The method of claim 8, further comprising completing a financial transaction between the first party and the second party prior to delivery of the encrypted selected electronic book.

20. The method of claim 8, further comprising completing a financial transaction between the first party and the second party prior to delivery of the encrypted transaction symmetric key to the second party.

21. The method of claim 8, wherein the symmetric key is a shared transaction symmetric key, further comprising negotiating the shared transaction symmetric key between a first party and a second party, wherein the first party supplies the encrypted selected electronic book to the second party.

22. The method of claim 21, wherein the shared transaction symmetric key is generated by first party and second party key negotiation algorithms.

23. The method of claim 21, further comprising:
encrypting the electronic book using the shared transaction symmetric key;
delivering the encrypted electronic book to the second party; and
decrypting the encrypted electronic book using the shared transaction symmetric key.

24. The method of claim 2, further comprising:
supplying the encrypted electronic book using a first communications path; and
supplying the symmetric key using a second communications path.

25. The method of claim 2, further comprising supplying the encrypted electronic book and the symmetric key using a same communications path.

26. The method of claim 25, wherein the encrypted electronic book and the symmetric key are supplied simultaneously.

27. The method of claim 1, wherein the encryption key is generated by a first seed key generation algorithm and the decryption key is generated by a second seed key generation algorithm.

28. The method of claim 27, wherein the first and the second key generation algorithms generate a seed key.

29. The method of claim 28, further comprising:
using the seed key at a first party location to generate a first shared transaction symmetric key in a sequence of keys;
encrypting the electronic book using the first shared transaction symmetric key;
delivering the encrypted electronic book to a second party;
using the seed key at a second party location to generate a shared transaction symmetric key corresponding to the first shared transaction symmetric key generated at the first party location;
decrypting the encrypted electronic book using the shared transaction symmetric key; and
repeating the process to generate a second and subsequent shared transaction keys to encrypt and decrypt subsequent electronic books.

30. The method of claim 1, wherein the encryption key and the decryption key are asymmetric.

31. The method of claim 30, wherein the electronic book is encrypted using one of a Merkle-Hellman Knapsack technique, a RSA technique, a Pohlig-Hellman technique and a Schnorr Signatures technique.

32. The method of claim 30, wherein the encryption key is a public key and the decryption key is a private key.

33. The method of claim 30, wherein the encryption key is a private key and the decryption key is a public key.

34. The method of claim 1, further comprising providing the decryption key with the encrypted electronic book.

35. The method of claim 34, further comprising encrypting the decryption key.

36. The method of claim 1, further comprising using a first cryptographic algorithm with the encryption key to encrypt the electronic book.

37. The method of claim 36, wherein the first cryptographic algorithm is one of DES, PKZIP and BLOWFISH.

38. The method of claim 1, further comprising using a second cryptographic algorithm with the decryption key to decrypt the encrypted electronic book.

39. The method of claim 1, wherein encrypted electronic books are delivered to home systems individually.

40. The method of claim 1, further comprising:
providing multiple electronic books to a home system; and
supplying the decryption key upon request for a particular electronic book by the home system.

41. The method of claim 1, wherein the encrypted electronic book is broadcast to multiple home systems simultaneously.

42. The method of claim 41, wherein the encryption key is a transaction symmetric key.

43. The method of claim 42, further comprising:
encrypting the transaction symmetric key using a first public key corresponding to a first home system;
encrypting the transaction symmetric key using second and subsequent public keys corresponding to second and subsequent home systems, respectively;
delivering the first through the subsequent encrypted transaction symmetric keys to the multiple home systems;
decrypting the delivered first encrypted transaction symmetric key at the first home system using a first private key;
decrypting the second and subsequent encrypted transaction symmetric keys at one or more of corresponding ones of the multiple home systems using second and subsequent private keys, respectively; and
decrypting the delivered encrypted electronic book at one or more of the multiple home systems using the decrypted transaction symmetric key.

44. The method of claim 43, further comprising:
assigning one or more of the multiple home systems to one or more predefined groups;
generating a group symmetric key for each of the one or more groups of home systems; and
distributing the corresponding group symmetric key to each home system in the one or more groups of home systems.

45. The method of claim 1, wherein the encrypted electronic book is delivered to a home system, the home system comprising:
a library; and
a viewer.

46. The method of claim 45, wherein security processing is completed in the library.

47. The method of claim 45, wherein security processing in completed in the viewer.

48. The method of claim 45, further comprising completing security processing between the viewer and the library.

49. The method of claim 48, further comprising:
receiving the encrypted electronic book at the library;
decrypting the received electronic book;
storing the decrypted electronic book in a memory;
retrieving the stored electronic book;
encrypting the retrieved electronic book using a symmetric key;
encrypting the symmetric key using a library private key;

delivering the encrypted electronic book and the encrypted symmetric key to the viewer;

decrypting the encrypted symmetric key using a viewer public key; and decrypting the encrypted electronic book using the decrypted symmetric key.

50. The method of claim 49, wherein the symmetric key is randomly generated.

51. The method of claim 49, wherein the symmetric key is generated by a key generator process.

52. The method of claim 49, wherein the symmetric key is previously defined, further comprising retrieving the previously-defined symmetric key.

53. The method of claim 1, further comprising performing integrity checking of the electronic book.

54. The method of claim 53, wherein the step of integrity checking, comprises:
calculating a first hashing value based on content of the electronic book and a hashing algorithm;
associating the first hashing value with the electronic book;
calculating a second hashing value using the decrypted electronic book and the hashing algorithm;
comparing the first and the second hashing values; and
storing the decrypted electronic book when the first and the second hashing values match.

55. The method of claim 53, wherein a digital signature algorithm is used to identify a party sending the electronic book.

56. The method of claim 1, further comprising verifying an identity of a party sending the electronic book.

57. The method of claim 56, wherein the verifying step, comprises:
delivering a password with the electronic book;
comparing the delivered password with a pre-defined password; and
storing the delivered electronic book when the delivered password and the predefined password match.

58. The method of claim 56, wherein the verifying step comprises decrypting the delivered electronic book using the decryption key.

59. The method of claim 56, wherein the verifying step, comprises:
sending a delivery notification message from a sending party to a receiving party receiving the electronic book
encrypting a randomly generated message;
returning the randomly generated message to the sending party sending the delivery notification message; and
decrypting the randomly generated message;
re-encrypting the randomly generated message; and
returning the re-encrypted randomly generated message to the receiving party with the encrypted electronic book.

60. The method of claim 56, wherein the verifying step comprises using an ISO standard X.509 one-way authentication protocol.

61. The method of claim 1, further comprising verifying an identity of a first party requesting the electronic book.

62. The method of claim 61, wherein the verifying step, comprises:
receiving an electronic book request from the first party;
generating an authentication string;
sending the authentication string to the first party; and
returning a response message, wherein the response message, comprises:
an identifier that identifies the requested electronic book,
a signed authentication string, wherein the signed authentication string is signed using a one-way hash function and wherein the signed authentication string is encrypted, and
a first party certification information.

63. The method of claim 1, further comprising:
creating a non-secure metadata header for the electronic book;
creating a secure metadata header for the electronic book, wherein the secure metadata header includes one or more of an electronic book identifier, the decryption key, a decryption algorithm, a number of copies of the electronic book that are allowed to be derived from an original electronic book file, distribution and fair use features and integrity checking information; and
packaging the non-secure and the secure headers with the electronic book to create an electronic book distribution file.

64. The method of claim 63, further comprising:
compressing the electronic book distribution file; and
sending the electronic book distribution file to a receiving party.

65. The method of claim 64, wherein the receiving party is an operations center of a television distribution system.

66. The method of claim 64, wherein the receiving party is an electronic book home system.

67. The method of claim 64, wherein the receiving party is a library.

68. The method of claim 64, wherein the receiving party is a kiosk.

69. The method of claim 64, wherein the electronic book distribution file is distributed by a publisher.

70. The method of claim 64, wherein the electronic book distribution file is distributed by an operations center.

71. The method of claim 64, wherein the electronic book distribution file is distributed by a library.

72. The method of claim 64, wherein the electronic book distribution file is distributed by an electronic book home system.

73. The method of claim 64, wherein the electronic book distribution file is distributed at a kiosk.

74. The method of claim 64, wherein the electronic book distribution file is delivered from a first viewer to a second viewer.

75. The method of claim 64, wherein the electronic book distribution file is distributed over an Internet using a secure socket layer protected communication link.

76. The method of claim 75, wherein the receiving party sends an electronic book request message to request the electronic book, the request message including an Internet Protocol address of the receiving party.

77. The method of claim 76, wherein the request message includes a login and password sequence.

78. The method of claim 76, further comprising:
sending a certificate to the receiving party, the certificate including information identifying a sending party and a sending party public key;
verifying the certificate by comparing the information included in the certificate to expected values for the information;
sending an algorithms supported message to the sending party; returning a selected algorithm to the receiving party; generating a transaction symmetric key; encrypting the transaction symmetric key using the sending party public key and the selected algorithm;
sending the encrypted transaction symmetric key to the sending party;

decrypting the encrypted transaction symmetric key using a sending party private key; and using the transaction symmetric key to encrypt and to decrypt a transaction between the sending party and the receiving party.

79. The method of claim 75, wherein a sending party sends an electronic book distribution message to the receiving party, the distribution message including Internet Protocol address of the sending party.

80. The method of claim 79, wherein the distribution message further comprises a login and password sequence.

81. The method of claim 80, further comprising:

sending a certificate to the sending party, the certificate including information identifying a sending party and a receiving party public key;

verifying the certificate by comparing the information included in the certificate to expected values for the information;

sending an algorithms supported message to the receiving party;

returning a selected algorithm to the sending party;

generating a transaction symmetric key;

encrypting the transaction symmetric key using the receiving party public key and the selected algorithm;

sending the encrypted transaction symmetric key to the receiving party; decrypting the encrypted transaction symmetric key using a receiving party private key; and using the transaction symmetric key to encrypt and to decrypt a transaction between the sending party and the receiving party.

82. The method of claim 1, wherein the electronic book is delivered to a receiving party by a sending party, the method further comprising verifying that the receiving party received the electronic book.

83. The method of claim 82, wherein the verifying step, comprises:

generating a reply message;

encrypting the reply message using a private key of the receiving party; encrypting the encrypted reply message using a public key of the sending party:

sending the doubly encrypted reply message to the sending party; and decrypting the doubly encrypted reply message using a private key of the sending party and a public key of the receiving party.

84. The method of claim 82, wherein the verifying step comprises using an ISO standard X.509 two-way authentication protocol framework.

85. The method of claim 1, wherein encryption key information is supplied between a sending party and a receiving party using a telecommunications network.

86. The method of claim 85, wherein the telecommunications network comprises one or more of a television delivery system, a wired telephone network, a wireless telephone network, a personal communications network (PCS), an Internet, an intranet, a local area network, a radio communications network, and an optical fiber network.

87. The method of claim 1, wherein encryption key information is supplied between a sending party and a receiving party using a portable memory storage device.

88. The method of claim 87, wherein the portable memory storage device includes one or more of a PCMCIA card, a CD ROM, a memory stick, and a smart card.

89. The method of claim 88, wherein the encryption key includes a valid time period of use.

90. The method of claim 88, wherein the portable memory storage device is updated remotely using a telecommunications network.

91. The method of claim 1, further comprising:

receiving the encrypted electronic book at a receiving party; and storing the electronic book in an encrypted format in a memory storage device.

92. The method of claim 91, wherein the encrypted storage is performed at a driver level, comprising:

encrypting the electronic book using a memory storage device driver level; and storing the encrypted electronic book at the memory storage device.

93. The method of claim 92, wherein the electronic book is encrypted using a symmetric key.

94. The method of claim 91, wherein the encrypted storage is performed at a file level, further comprising:

encrypting the electronic book using a unique symmetric key;

storing the encrypted electronic book in the memory storage device; and storing the symmetric key, wherein the symmetric key is stored in a memory location apart from a memory location for the electronic book.

95. The method of claim 91, further comprising:

computing a first hashing value, using a one-way hashing algorithm and the electronic book, prior to encrypting the electronic book and storing the encrypted electronic book in the memory storage device;

storing the first hashing value;

retrieving the encrypted electronic book and the first hashing value; decrypting the retrieved encrypted electronic book;

computing a second hashing value using the retrieved decrypted electronic book and the one-way hashing algorithm; and comparing the first and the second hashing values, wherein when the first and the second hashing values coincide, an integrity of the stored encrypted electronic book is assured.

96. An electronic book viewer for receiving an electronic book from a sending party, and for storing and displaying the electronic book, comprising: a receiver, wherein the receiver:

receives a created, transmitted list of titles of available electronic books, wherein an electronic book is available if text associated with the electronic book is available for transmission;

selects a title from the transmitted list of titles;

communicates the selected title; and receives transmitted text associated with the selected title as encrypted electronic books and encryption information;

a memory coupled to the receiver that stores the encrypted electronic books and the encryption information;

a processor coupled to the memory that processes the encryption information using an encryption/decryption algorithm, wherein the processor comprises:

a key generator that generates encryption and decryption keys; and a transmitter coupled to the processor that sends encryption information to the sending party, wherein the encryption information includes information that allows encryption and decryption of the electronic book and encryption and decryption of encryption and decryption keys.

97. The electronic book viewer of claim 96, wherein the encryption keys and the decryption keys are symmetric keys.

98. The electronic book viewer of claim 97, wherein the symmetric keys are generated randomly.

99. The electronic book viewer of claim 97, wherein the memory stores the symmetric keys, and wherein the processor retrieves a stored symmetric key from the memory.

100. The electronic book viewer of claim 97, wherein the receiver receives a transaction symmetric key from a certificate authority, and the memory stores the transaction symmetric key.

101. The electronic book viewer of claim 100, wherein the processor generates a transaction symmetric key request, the transmitter sends the request to the certificate authority and the receiver receives an encrypted transaction symmetric key, and wherein the processor uses the encrypted transaction symmetric key to decrypt the encrypted received electronic book.

102. The electronic book viewer of claim 97, wherein the symmetric key is encrypted with a private key and a private encryption algorithm and wherein the processor decrypts the encrypted symmetric key using a public key and a public key decryption algorithm.

103. The electronic book viewer of claim 97, wherein the processor further comprises a shared key negotiation algorithm, wherein the symmetric key is a shared transaction symmetric key, and wherein the processor negotiates with the sending party to generate the shared transaction symmetric key.

104. The electronic book viewer of claim 96, wherein the processor further comprises a first seed key generation algorithm and a second seed key generation algorithm, the processor using the first seed key generation algorithm to generate an encryption key and using the second seed key generation algorithm to generate a decryption key.

105. The electronic book viewer of claim 96, wherein an encryption key is a public key and a decryption key is a private key.

106. The electronic book viewer of claim 96, wherein the encryption key is a private key and the decryption key is a public key.

107. The electronic book viewer of claim 96, wherein the receiver receives a decryption key with the electronic book.

108. The electronic book viewer of claim 107, wherein the decryption key is encrypted before shipment to the electronic book viewer.

109. The electronic book viewer of claim 96, wherein the electronic book is encrypted using one of DES, PKZIP and BLOWFISH encryption algorithms.

110. The electronic book viewer of claim 96, wherein the encrypted electronic books are broadcast to the electronic book viewer.

111. The electronic book viewer of claim 110, wherein the electronic book is encrypted using a first public key system corresponding to the electronic book viewer.

112. The electronic book viewer of claim 96, wherein the electronic book viewer is assigned to one or more predefined groups of electronic book viewers.

113. The electronic book viewer of claim 96, further comprising a library unit coupled to the electronic book viewer, wherein the library unit completes security processing.

114. The electronic book viewer of claim 96, wherein the processor includes an integrity checking algorithm.

115. The electronic book viewer of claim 96, wherein the processor includes a verification algorithm that verifies an identity of the sending party.

116. The electronic book of claim 96, wherein the processor includes an authentication algorithm.

117. The electronic book of claim 96, wherein the sending party is a book publisher.

118. The electronic book viewer of claim 96, wherein the sending party is an operations center of a cable television delivery system.

119. The electronic book viewer of claim 96, wherein the sending party sends electronic books using an Internet web site.

120. The electronic book viewer of claim 96, wherein the sending party is a kiosk.

121. The electronic book viewer of claim 96, wherein the sending party is another electronic book viewer.

122. The electronic book viewer of claim 96, wherein the electronic book viewer receives encrypted electronic books and encryption information using a telecommunications network.

123. The electronic book viewer of claim 122, wherein the telecommunications network includes one or more of a television delivery system, a wired telephone system, a wireless telephone network, a personal communications network, a wired Internet system, a wireless Internet system, an intranet, a local area network, a radio communications network, and an optical fiber network.

124. The electronic book viewer of claim 96, further comprising a data entry port, wherein the electronic book viewer receives encryption key information using the data entry port and a portable memory storage device.

125. The electronic book viewer of claim 124, wherein the portable memory storage device includes one or more of a PCMCIA card, a CD ROM, a smart card and a memory stick.

126. The electronic book viewer of claim 125, wherein the encryption key includes a valid time period of use.

127. The electronic book viewer of claim 125, wherein the encryption key includes a valid time period of use.

128. The electronic book viewer of claim 124, wherein the portable memory storage device is updated remotely using a telecommunications network.

129. A method for secure distribution of electronic books, comprising:
- creating a list of titles of available electronic books, wherein an electronic book is available if text associated with the electronic book is available for transmission;
- transmitting the list of titles of available electronic books to multiple home systems simultaneously, the multiple home systems including a first, a second, and subsequent home systems;
- selecting a title from the transmitted list of titles of available electronic books;
- communicating the selected title to a text source;
- selecting an electronic book corresponding to the selected title;
- obtaining an encryption key;
- processing the selected electronic book using the encryption key and an encryption algorithm wherein the encryption key is a transaction symmetric key;
- broadcasting the encrypted electronic book to multiple home systems simultaneously;
- obtaining a decryption key;
- encrypting the transaction symmetric key using a first public key corresponding to the second and subsequent home systems, respectively, to create a first, a second, and subsequent encrypted transaction symmetric keys;

delivering the first through the subsequent encrypted transaction symmetric keys to the multiple home systems;

decrypting the delivered first encrypted transaction symmetric key at the first home system using a first private key;

decrypting the second and subsequent encrypted transaction symmetric keys at one or more of corresponding ones of the multiple home systems using second and subsequent private keys, respectively; and decrypting the delivered encrypted electronic book at one or more of the multiple home systems using the decrypted transaction symmetric key.

130. The method of claim 129, further comprising:

assigning one or more of the multiple home systems to one or more predefined groups;

generating a group symmetric key for each of the one or more groups of home systems; and distributing the corresponding group symmetric key to each home system in the one or more groups of home systems.

131. The method of claim 129, further comprising storing the electronic book in memory as an encrypted file.

132. The method of claim 129, wherein the encrypted electronic book is sent by a publisher and the recipient is an operations center of an electronic book distribution system.

133. The method of claim 129, wherein the encrypted electronic book is sent by an operations center and the recipient is a home system.

134. The method of claim 129, wherein the encrypted electronic book is sent by a lending facility and the recipient is a home system.

135. The method of claim 129, wherein the encrypted electronic book is sent by a home system library and the recipient is a home system viewer.

136. The method of claim 129, wherein the encrypted electronic book is sent by a first home system viewer and the recipient is a second home system viewer.

137. The method of claim 129, further comprising creating a protected metadata header related to the electronic book, wherein the protected metadata header comprises an electronic book identifier, a metadata format identifier, the decryption key, and a decryption algorithm.

138. The method of claim 137, wherein the protected metadata header is provided with the encrypted electronic book.

139. The method of claim 137, wherein the protected metadata header is provided separate from the encrypted electronic book.

140. The method of claim 137, wherein the protected metadata header further comprises a number of allowed copies of the encrypted electronic book, distribution features supported for the electronic book, fair use features and integrity checking information.

141. The method of claim 140, wherein the fair use features comprise using the electronic book for a specified time.

142. The method of claim 141, wherein the fair use features comprise a print enable function.

143. The method of claim 142, wherein the print enable function enables a specified number of copies of the electronic book to be printed.

144. The method of claim 140, wherein the distribution features comprise a loan enable feature, the loan enable feature allowing a sending party to send the electronic book to one or more recipients.

145. The method of claim 129, further comprising compressing the encrypted electronic book before sending to the recipient.

146. The method of claim 129, further comprising authenticating an identity of the recipient.

147. The method of claim 146, wherein the authenticating step comprises using a digital signature algorithm.

148. The method of claim 146, wherein the authenticating step comprises using a password.

149. The method of claim 129, wherein the step of sending the encrypted electronic book comprises sending the encrypted electronic book to a remote location, wherein the recipient retrieves the encrypted electronic book from the remote location.

150. The method of claim 149, wherein the remote location is an Internet website.

151. The method of claim 149, wherein the remote location is a computer, and wherein the recipient is coupled to the computer.

152. The method of claim 151, wherein the recipient and the computer are coupled by a communications network.

153. The method of claim 151, wherein the communications network is an infra red network.

154. The method of claim 151, wherein the communications network is a radio frequency network.

155. The method of claim 149, wherein the sending party removes the encrypted electronic book from the remote location after a specified time.

156. The method of claim 129, wherein the recipient is a home system, further comprising:

registering the home system with the sending party;

assigning the home party an electronic book deposit location; and sending electronic books for the home system to the deposit location.

157. The method of claim 156, further comprising sending decryption information to the deposit location.

158. The method of claim 156, wherein the sending party obtains information from the home system during the registering step, and wherein the information includes an internal serial number of the home system.

159. The method of claim 129, further comprising:

generating a reply message upon receipt of the encrypted electronic book; and returning the reply message to the sending party, the reply message indicating receipt of the encrypted electronic book.

160. The method of claim 129, further comprising:

generating a reply message upon decrypting the encrypted electronic book; and returning the reply message to the sending party.

161. The method of claim 129, wherein the recipient is a public viewer.

162. The method of claim 129, further comprising sending a data header with the encrypted electronic book, wherein the data header comprises a time duration for retention of the electronic book by the recipient.

163. The method of claim 129, wherein a first part of the electronic book is encrypted and a second part of the electronic book is not encrypted.

164. The method of claim 129, further comprising applying a copyright notice to the electronic book.

165. The method of claim 129, wherein stenographic information is embedded in the electronic book.

166. The method of claim 165, wherein the stenographic information identifies a valid recipient viewer.

167. The method of claim 166, wherein a viewer displays only electronic books for which the stenographic information matches the displaying viewer.

168. The method of claim 129, wherein the encryption and the decryption algorithms are updated using a software download over a distribution network.

169. The method of claim 129, wherein the encryption and the decryption algorithms are updated using physical media.

170. The method of claim 169, wherein the physical media comprises one of a PCMCIA card, a smart card, a memory stick and a memory device.

171. The method of claim 129, wherein the electronic book comprises one or more pages and wherein a viewer decrypts the electronic book page by page, each page of the one or more pages of the electronic book being decrypted just before viewing.

* * * * *